US006430696B1

(12) United States Patent
Keeth

(10) Patent No.: US 6,430,696 B1
(45) Date of Patent: *Aug. 6, 2002

(54) METHOD AND APPARATUS FOR HIGH SPEED DATA CAPTURE UTILIZING BIT-TO-BIT TIMING CORRECTION, AND MEMORY DEVICE USING SAME

(75) Inventor: Brent Keeth, Boise, ID (US)

(73) Assignee: Micron Technology, Inc., Boise, ID (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/201,519

(22) Filed: Nov. 30, 1998

(51) Int. Cl.[7] .............................................. G06F 1/04
(52) U.S. Cl. .................. 713/503; 365/233; 395/522; 713/400; 713/401; 713/500
(58) Field of Search ................. 713/401, 500, 713/503; 714/700; 395/552; 365/233

(56) References Cited

U.S. PATENT DOCUMENTS 3,633,174 A  1/1972  Griffin ...................... 340/172.5

(List continued on next page.)

FOREIGN PATENT DOCUMENTS

| EP | 0 171 720 A2 | 8/1985 |
| EP | 0 295 515 A1 | 12/1988 |
| EP | 0 406 786 A1 | 1/1991 |
| EP | 0 450 871 A2 | 10/1991 |

(List continued on next page.)

OTHER PUBLICATIONS

Alvarez, J. et al. "A Wide–Bandwidth Low Voltage PLL for PowerPC™ Microprocessors".
Anonymous, "Programmable Pulse Generator", IBM Technical Disclosure Bulletin, vol. 17, No. 12, May 1975, pp.3553–3554.
Anonymous, "Pulse Combinig Network", IBM Technical Disclosure Bulletin, vol. 32, No. 12, May 1990, pp. 149–151.

(List continued on next page.)

Primary Examiner—Robert Beausoleil
Assistant Examiner—Bryce P. Bonzo
(74) Attorney, Agent, or Firm—Dorsey & Whitney LLP

(57) ABSTRACT

A bus capture circuit captures digital signals applied on respective lines of a bus. The bus capture circuit includes a clock delay circuit that generates an internal clock signal responsive to an external clock signal. The internal clock signal has a fixed delay relative to the external clock signal and is applied to clock a plurality of latches. Each latch latches a digital signal applied at the input terminal responsive to the internal clock signal from the clock delay circuit. The bus capture circuit further includes a plurality of signal delay circuits, each being coupled between a respective bus line and the input terminal of a respective latch. Each signal delay circuit develops a delayed digital signal having a delay time relative to the digital signal applied on the corresponding bus line, and applies the delayed digital signal to the input terminal of the corresponding latch. A control circuit adjusts the delay time of each signal delay circuit as a function of the data eye of the digital signal applied on the input of the signal delay circuit. The corresponding latch successfully latches the delayed digital signal output from the corresponding signal delay circuit. The bus capture circuit may also operate in a monitoring mode during normal operation of a packetized memory device to detect shifts in the data eye of an external command clock signal applied to the packetized memory device and adjust the delay time of all signal delay circuits when such a shift is detected.

33 Claims, 19 Drawing Sheets

U.S. PATENT DOCUMENTS

| | | | | |
|---|---|---|---|---|
| 4,077,016 A | 2/1978 | Sanders et al. ............... 331/4 |
| 4,096,402 A | 6/1978 | Schroeder et al. .......... 307/362 |
| 4,404,474 A | 9/1983 | Dingwall ..................... 307/260 |
| 4,481,625 A | 11/1984 | Roberts et al. ............... 370/85 |
| 4,508,983 A | 4/1985 | Allgood et al. ............. 307/577 |
| 4,511,846 A | 4/1985 | Nagy et al. ................. 328/164 |
| 4,514,647 A | 4/1985 | Shoji .......................... 307/269 |
| 4,524,448 A * | 6/1985 | Hullwegen .................. 375/118 |
| 4,573,017 A | 2/1986 | Levine ....................... 328/155 |
| 4,600,895 A | 7/1986 | Landsman ................. 331/1 A |
| 4,603,320 A | 7/1986 | Farago ....................... 340/347 |
| 4,638,187 A | 1/1987 | Boler et al. ................. 307/451 |
| 4,638,451 A | 1/1987 | Hester et al. ............... 364/900 |
| 4,687,951 A | 8/1987 | McElroy ..................... 307/269 |
| 4,773,085 A | 9/1988 | Cordell ....................... 375/120 |
| 4,789,796 A | 12/1988 | Foss ............................ 307/443 |
| 4,818,995 A * | 4/1989 | Takahashi et al. ............. 341/94 |
| 4,893,087 A | 1/1990 | Davis .......................... 328/14 |
| 4,902,986 A | 2/1990 | Lesmeister ................... 331/25 |
| 4,953,128 A | 8/1990 | Kawai et al. ............... 365/194 |
| 4,958,088 A | 9/1990 | Farah-Bakhsh et al. ..... 307/443 |
| 4,972,470 A | 11/1990 | Farago .......................... 380/3 |
| 4,984,204 A | 1/1991 | Sato et al. ............. 365/189.11 |
| 5,020,023 A | 5/1991 | Smith ......................... 364/900 |
| 5,038,115 A | 8/1991 | Myers et al. ................... 331/2 |
| 5,075,569 A | 12/1991 | Branson ..................... 307/270 |
| 5,086,500 A | 2/1992 | Greub ......................... 395/550 |
| 5,087,828 A | 2/1992 | Sato et al. ................... 307/269 |
| 5,122,690 A | 6/1992 | Bianchi ....................... 307/475 |
| 5,128,560 A | 7/1992 | Chern et al. ................. 307/475 |
| 5,128,563 A | 7/1992 | Hush et al. .................. 307/482 |
| 5,134,311 A | 7/1992 | Biber et al. ................. 307/270 |
| 5,150,186 A | 9/1992 | Pinney et al. ................. 357/42 |
| 5,165,046 A | 11/1992 | Hesson ....................... 307/270 |
| 5,179,298 A | 1/1993 | Hirano et al. ................ 307/443 |
| 5,194,765 A | 3/1993 | Dunlop et al. ............... 307/443 |
| 5,212,601 A | 5/1993 | Wilson ......................... 360/51 |
| 5,220,208 A | 6/1993 | Schenck ...................... 307/443 |
| 5,223,755 A | 6/1993 | Richley ...................... 327/158 |
| 5,233,314 A | 8/1993 | McDermott et al. .......... 331/17 |
| 5,233,564 A | 8/1993 | Ohshima et al. ....... 365/230.05 |
| 5,239,206 A | 8/1993 | Yanai ....................... 307/272.2 |
| 5,243,703 A | 9/1993 | Farmwald et al. .......... 395/325 |
| 5,254,883 A | 10/1993 | Horowitz et al. ........... 307/443 |
| 5,256,989 A | 10/1993 | Parker et al. ............... 331/1 A |
| 5,257,294 A | 10/1993 | Pinto et al. .................. 375/120 |
| 5,268,639 A | 12/1993 | Gasbarro et al. ........ 324/158 R |
| 5,272,729 A | 12/1993 | Bechade et al. ............. 375/118 |
| 5,274,276 A | 12/1993 | Casper et al. ............... 307/443 |
| 5,276,642 A | 1/1994 | Lee ....................... 365/189.04 |
| 5,278,460 A | 1/1994 | Casper .................... 307/296.5 |
| 5,281,865 A | 1/1994 | Yamashita et al. .......... 307/279 |
| 5,283,631 A | 2/1994 | Koerner et al. ............. 307/451 |
| 5,289,580 A | 2/1994 | Latif et al. .................. 395/275 |
| 5,295,164 A | 3/1994 | Yamamura .................. 375/120 |
| 5,304,952 A * | 4/1994 | Quiet et al. ................. 331/1 A |
| 5,311,481 A | 5/1994 | Casper et al. ............ 365/230.06 |
| 5,311,483 A | 5/1994 | Takasugi ..................... 365/233 |
| 5,313,431 A | 5/1994 | Uruma et al. .......... 365/230.05 |
| 5,315,388 A | 5/1994 | Shen et al. .................. 348/718 |
| 5,321,368 A | 6/1994 | Hoelzle ........................ 328/63 |
| 5,337,285 A | 8/1994 | Ware et al. .................. 365/227 |
| 5,341,405 A * | 8/1994 | Mallard, Jr. ................. 375/120 |
| 5,347,177 A | 9/1994 | Lipp ........................... 307/443 |
| 5,347,179 A | 9/1994 | Casper et al. ............... 307/451 |
| 5,355,391 A | 10/1994 | Horowitz et al. ............. 375/36 |
| 5,361,002 A | 11/1994 | Casper ....................... 327/530 |
| 5,367,649 A | 11/1994 | Cedar ......................... 395/375 |
| 5,379,299 A * | 1/1995 | Schwartz .................... 370/108 |
| 5,390,308 A | 2/1995 | Ware et al. .................. 395/400 |
| 5,400,283 A | 3/1995 | Raad .......................... 365/203 |
| 5,402,389 A | 3/1995 | Flannagan et al. .......... 365/223 |
| 5,408,640 A | 4/1995 | MacIntyre et al. .......... 395/550 |
| 5,410,263 A | 4/1995 | Waizman .................... 327/141 |
| 5,416,436 A | 5/1995 | Rainard ...................... 327/270 |
| 5,416,909 A | 5/1995 | Long et al. ................. 395/275 |
| 5,420,544 A | 5/1995 | Ishibashi ...................... 331/11 |
| 5,428,311 A | 6/1995 | McClure ..................... 327/276 |
| 5,428,317 A | 6/1995 | Sanchez et al. ............. 331/1 A |
| 5,430,408 A | 7/1995 | Ovens et al. ................ 327/404 |
| 5,430,676 A | 7/1995 | Ware et al. ............ 365/189.02 |
| 5,432,823 A | 7/1995 | Gasbarro et al. ............ 375/356 |
| 5,438,545 A | 8/1995 | Sim ....................... 365/189.05 |
| 5,440,260 A | 8/1995 | Hayashi et al. ............. 327/278 |
| 5,440,514 A | 8/1995 | Flannagan et al. .......... 365/194 |
| 5,444,667 A | 8/1995 | Obara ......................... 365/233 |
| 5,446,696 A | 8/1995 | Ware et al. .................. 365/222 |
| 5,448,193 A | 9/1995 | Baumert et al. ............. 327/156 |
| 5,451,898 A | 9/1995 | Johnson ...................... 327/563 |
| 5,457,407 A | 10/1995 | Shu et al. ...................... 326/30 |
| 5,465,076 A | 11/1995 | Yamauchi et al. ........... 331/179 |
| 5,473,274 A | 12/1995 | Reilly et al. ................. 327/159 |
| 5,473,575 A | 12/1995 | Farmwald et al. ...... 365/230.06 |
| 5,473,639 A | 12/1995 | Lee et al. .................... 375/376 |
| 5,485,490 A | 1/1996 | Leung et al. ................ 375/371 |
| 5,488,321 A | 1/1996 | Johnson ........................ 327/66 |
| 5,489,864 A | 2/1996 | Ashuri ........................ 327/161 |
| 5,497,127 A | 3/1996 | Sauer ............................ 331/17 |
| 5,498,990 A | 3/1996 | Leung et al. ................ 327/323 |
| 5,500,808 A | 3/1996 | Wang .......................... 364/578 |
| 5,506,814 A | 4/1996 | Hush et al. ............. 365/230.03 |
| 5,508,638 A | 4/1996 | Cowles et al. ................. 326/38 |
| 5,513,327 A | 4/1996 | Farmwald et al. .......... 395/309 |
| 5,532,714 A | 7/1996 | Knapp et al. ................ 345/114 |
| 5,539,345 A | 7/1996 | Hawkins ..................... 327/150 |
| 5,544,124 A | 8/1996 | Zagar et al. ............ 365/230.08 |
| 5,544,203 A * | 8/1996 | Casasanta et al. ........... 375/376 |
| 5,552,727 A | 9/1996 | Nakao ......................... 327/159 |
| 5,555,429 A | 9/1996 | Parkinson et al. ........... 395/800 |
| 5,557,224 A | 9/1996 | Wright et al. ................ 327/156 |
| 5,557,781 A | 9/1996 | Stones et al. ................ 395/550 |
| 5,563,546 A | 10/1996 | Tsukada ....................... 327/408 |
| 5,568,075 A | 10/1996 | Curran et al. ................ 327/172 |
| 5,568,077 A | 10/1996 | Sato et al. ................... 327/199 |
| 5,572,557 A | 11/1996 | Aoki ........................... 375/376 |
| 5,572,722 A * | 11/1996 | Vogley ........................ 395/555 |
| 5,574,698 A | 11/1996 | Raad ..................... 365/230.06 |
| 5,576,645 A | 11/1996 | Farwell ......................... 327/94 |
| 5,577,236 A | 11/1996 | Johnson et al. ............. 395/551 |
| 5,578,940 A | 11/1996 | Dillion et al. ................. 326/30 |
| 5,578,941 A | 11/1996 | Sher et al. ..................... 326/34 |
| 5,579,326 A | 11/1996 | McClure ....................... 371/61 |
| 5,581,197 A | 12/1996 | Motley et al. ................. 326/30 |
| 5,589,788 A | 12/1996 | Goto ........................... 327/276 |
| 5,590,073 A | 12/1996 | Arakawa et al. ........ 365/185.08 |
| 5,594,690 A | 1/1997 | Rothenberger et al. 365/189.01 |
| 5,614,855 A | 3/1997 | Lee et al. .................... 327/158 |
| 5,619,473 A | 4/1997 | Hotta ....................... 365/238.5 |
| 5,621,340 A | 4/1997 | Lee et al. ...................... 327/65 |
| 5,621,690 A | 4/1997 | Jungroth et al. ............. 365/200 |
| 5,621,739 A | 4/1997 | Sine et al. .................. 371/22.1 |
| 5,627,780 A | 5/1997 | Malhi .................... 365/185.09 |
| 5,627,791 A | 5/1997 | Wright et al. ............... 365/222 |
| 5,631,872 A | 5/1997 | Naritake et al. ............. 365/227 |
| 5,636,163 A | 6/1997 | Furutani et al. ........ 365/189.01 |
| 5,636,173 A | 6/1997 | Schaefer ................ 365/230.03 |
| 5,636,174 A | 6/1997 | Rao ....................... 365/230.03 |
| 5,638,335 A | 6/1997 | Akiyama et al. ....... 365/230.03 |
| 5,646,904 A | 7/1997 | Ohno et al. .................. 365/233 |
| 5,652,530 A | 7/1997 | Ashuri .......................... 326/93 |
| 5,657,289 A | 8/1997 | Hush et al. ............. 365/230.05 |

| | | | |
|---|---|---|---|
| 5,657,481 A | 8/1997 | Farmwald et al. | 395/551 |
| 5,663,921 A | 9/1997 | Pascucci et al. | 365/233 |
| 5,666,322 A | 9/1997 | Conkle | 365/233 |
| 5,668,763 A | 9/1997 | Fujioka et al. | 365/200 |
| 5,668,774 A | 9/1997 | Furutani | 365/233 |
| 5,675,274 A | 10/1997 | Kobayashi et al. | 327/158 |
| 5,692,165 A | 11/1997 | Jeddeloh et al. | 395/551 |
| 5,694,065 A | 12/1997 | Hamasaki et al. | 327/108 |
| 5,708,611 A | 1/1998 | Iwamoto et al. | 365/195 |
| 5,712,580 A | 1/1998 | Baumgartner et al. | 327/12 |
| 5,719,508 A | 2/1998 | Daly | 327/12 |
| 5,740,123 A | 4/1998 | Uchida | 365/233 |
| 5,751,665 A | 5/1998 | Tanoi | 368/120 |
| 5,767,715 A | 6/1998 | Marquis et al. | 327/159 |
| 5,768,177 A | 6/1998 | Sakuragi | 365/194 |
| 5,774,699 A | 6/1998 | Nagae | 395/551 |
| 5,778,214 A * | 7/1998 | Taya et al. | 395/551 |
| 5,781,499 A | 7/1998 | Koshikawa | 365/233 |
| 5,784,422 A | 7/1998 | Heermann | 375/355 |
| 5,789,947 A | 8/1998 | Sato | 327/3 |
| 5,790,612 A | 8/1998 | Chengson et al. | 375/373 |
| 5,794,020 A * | 8/1998 | Tanaka et al. | 395/552 |
| 5,805,931 A | 9/1998 | Morzano et al. | 395/884 |
| 5,812,619 A | 9/1998 | Runaldue | 375/376 |
| 5,822,314 A | 10/1998 | Chater-Lea | 370/337 |
| 5,831,929 A * | 11/1998 | Manning | 365/233 |
| 5,841,707 A | 11/1998 | Cline et al. | 365/194 |
| 5,852,378 A | 12/1998 | Keeth | 327/171 |
| 5,872,959 A * | 2/1999 | Nguyen | 395/552 |
| 5,889,829 A | 3/1999 | Chiao et al. | 375/376 |
| 5,898,242 A | 4/1999 | Peterson | 327/278 |
| 5,898,674 A | 4/1999 | Mawhinney et al. | 370/247 |
| 5,917,760 A | 6/1999 | Millar | 365/194 |
| 5,920,518 A | 7/1999 | Harrison et al. | 365/233 |
| 5,926,047 A | 7/1999 | Harrison | 327/159 |
| 5,926,436 A | 7/1999 | Toda et al. | 365/236 |
| 5,940,608 A | 8/1999 | Manning | 395/558 |
| 5,940,609 A | 8/1999 | Harrison | 395/558 |
| 5,946,244 A | 8/1999 | Manning | 365/194 |
| 5,953,284 A | 9/1999 | Baker et al. | 365/233 |
| 5,964,884 A | 10/1999 | Partovi et al. | 713/503 |
| 5,990,719 A * | 11/1999 | Dai et al. | 327/244 |
| 6,005,823 A * | 12/1999 | Martin et al. | 365/230.08 |
| 6,011,732 A | 1/2000 | Harrison et al. | 365/194 |
| 6,016,282 A | 1/2000 | Keeth | 365/233 |
| 6,026,050 A | 2/2000 | Baker et al. | 365/233 |
| 6,029,250 A | 2/2000 | Keeth | 713/400 |
| 6,038,219 A | 3/2000 | Mawhinney et al. | 370/242 |
| 6,067,592 A | 5/2000 | Farmwald et al. | 710/104 |
| 6,101,152 A | 8/2000 | Farmwald et al. | 365/233 |
| 6,101,197 A | 8/2000 | Keeth et al. | 370/517 |
| 6,105,157 A | 8/2000 | Miller | 714/744 |
| 6,147,905 A | 11/2000 | Seino | 365/185.11 |
| 6,147,916 A | 11/2000 | Ogura | 365/203 |
| 6,160,423 A | 12/2000 | Haq | 327/41 |

FOREIGN PATENT DOCUMENTS

| | | |
|---|---|---|
| EP | 0 476 585 A3 | 3/1992 |
| EP | 0 655 741 A2 | 5/1995 |
| EP | 0 655 834 A1 | 5/1995 |
| EP | 0 680 049 A2 | 11/1995 |
| EP | 0 703 663 A1 | 3/1996 |
| EP | 0 704 848 A3 | 4/1996 |
| EP | 0 704 975 A1 | 4/1996 |
| EP | 0 767 538 A1 | 4/1997 |
| JP | 6-1237512 | 10/1986 |
| JP | 2-112317 | 4/1990 |
| JP | 4-135311 | 5/1992 |
| JP | 5-136664 | 6/1993 |
| JP | 5-282868 | 10/1993 |
| JP | 0-7319577 | 12/1995 |
| WO | WO 94/29871 | 12/1994 |
| WO | WO 95/22200 | 8/1995 |
| WO | WO 95/22206 | 8/1995 |
| WO | WO 96/10866 | 4/1996 |
| WO | WO 97/14289 | 4/1997 |
| WO | WO 97/42557 | 11/1997 |

OTHER PUBLICATIONS

Anonymous, "Variable delay Digital Circuit", IBM Technical Disclosure Bulletin, vol. 35, No. 4A, Sep. 1992, pp. 365–366.

Arai, Y. et al., "A CMOS Four Channel x 1K Time Memory LSI with 1–ns/b Resolution", IEEE Journal of Solid–State Circuits, vol.27, No. 3, M, 8107 Mar., 1992, No. 3, New York, US, pp. 359–364 and pp.528–531.

Arai, Y. et al., "A Time Digitizer CMOS Gate–Array with a 250 ps Time Resolution", XP 000597207, IEEE Journal of Solid–State Circuits, vol. 31, No.2, Feb. 1996, pp. 212–220.

Aviram, A. et al., "OBTAINING HIGH SPEED PRINTING ON THERMAL SENSITIVE SPECIAL PAPER WITH A RESISTIVE RIBBON PRINT HEAD", IBM Technology Disclosure Bulletin, vol. 27, No. 5, Oct. 1984, pp. 3059–3060.

Bazes, M., "Two Novel Fully Complementary Self–Biased CMOS Differential Amplifiers", IEEE Journal of Solid–State Circuits, vol. 26, No. 2, Feb. 1991, pp. 165–168.

Chapman, J. et al., "A Low–Cost High–Performance CMOS Timing Vernier for ATE", IEEE International Test Conference, Paper 21.2, 1995, pp. 459–468.

Cho, J. "Digitally–Controlled PLL with Pulse Width Detection Mechanism for Error Correction", ISSCC 1997, Paper No. SA 20.3, pp. 334–335.

Christiansen, J., "An Integrated High Resolution CMOS Timing Generator Based on an Array of Delay Locked Loops", IEEE Journal of Solid–State Circuits, vol. 31, No. 7, Jul. 1996, pp. 952–957.

Combes, M. et al., "A Portable Clock Multiplier Generator Using Digital CMOS Standard Cells", IEEE Journal of Solid–State Circuits, vol. 31, No. 7, Jul. 1996, pp. 958–965.

Descriptive literature entitled, "400 MHz SLDRAM, 4M X 16 SLDRAM Pipelined, Eight Bank, 2.5 V Operation," SLDRAM Consortium Advance Sheet, published throughout the United States, pp. 1–22.

Donnelly, K. et al., "A 660 MB/s Interface Megacell Portable Circuit in 0.3 $\mu$m–0.7 $\mu$m CMOS ASIC", IEEE Journal of Solid–State Circuits, vol. 31, No. 12, Dec. 1996, pp. 1995–2001.

"Draft Standard for a High–Speed Memory Interface (SyncLink)", Microprocessor and Microcomputer Standards Subcommitte of the IEEE Computer Society, Copyright 1996 by the Institute of Electrical and Electronics Engineers, Inc., New York, NY, pp. 1–56.

Goto, J. et al., "A PLL–Based Programmable Clock Generator with 50–to 350–MHz Oscillating Range for Video Signal Processors", IEICE Trans. Electron., vol. E77–C, No. 12, Dec. 1994, pp. 1951–1956.

Hamamoto, T., "400–MHz Random Column Operating SDRAM Techniques with Self–Skew Compensation", IEEE Journal of Solid–State Circuits, vol. 33, No. 5, May 1998, pp. 770–778.

Ishibashi, A. et al., "High–Speed Clock Distribution Architecture Employing PLL for 0.6 $\mu$m CMOS SOG", IEEE Custom Integrated Circuits Conference, 1992, pp. 27.6.1–27.6.4.

Kim, B. et al., "A 30MHz High–Speed Analog/Digital PLL in 2 µm CMOS", ISSCC, Feb. 1990.

Kikuchi, S. et al., "A GATE–ARRAY–BASED 666MHz VLSI TEST SYSTEM", IEEE International Test Conference, Paper 21.1, 1995, pp. 451–458.

Ko, U. et al., "A 30–ps JITTER, 3.6–µs LOCKING, 3.3–VOLT DIGITAL PLL FOR CMOS GATE ARRAYS", IEEE Custom Integrated Circuits Conference, 1993, pp. 23.3.1–23.3.4.

Lee, T. et al., "A 2.5V Delay–Locked Loop for an 18 Mb 500MB/s DRAM", IEEE International Solid–State Circuits Conference Digest of Technical Papers, Paper No. FA 18.6, 1994, pp. 300–301.

Lesmeister, G., "A DENSELY INTEGRATED HIGH PERFORMANCE CMOS TESTER", International Test Conference, Paper 16.2, 1991, pp. 426–429.

Ljuslin, C. et al., "An Integrated 16–channel CMOS Time to Digital Converter", IEEE Nuclear Science Symposium & Medical Imaging Confernace Record, vol. 1, 1993, pp. 625–629.

Maneatis, J., "Low–Jitter Process–Independent DLL and PLL Based on Self–Biased Techniques", IEEE Journal of Solid–State Circuits, vol. 31, No. 11, Nov. 1996, pp. 1723–1732.

Nakamura, M. etal., "A 156 Mbps CMOS Clock Recovery Circuit for Burst–mode Transmission", Symposium on VLSI Circuits Digest of Technical Papers, 1996, pp. 122–123.

Nielson, E., "Inverting latches make simple VCO", EDN, Jun. 19, 1997.

Novof, I. et al., "Fully Integrated CMOS Phase–Locked Loop with 15 to 240 MHz Locking Range and ±50 ps Jitter", IEEE Journal of Solid–State Circuits, vol. 30, No. 11, Nov. 1995, pp. 1259–1266.

Santos, D. et al., "A CMOS Delay Locked Loop And Sub–Nanosecond Time–to–Digital Converter Chip", IEEE Nuclear Science Symposium and Medical Imaging Conference Record, vol. 1, Oct. 1995, pp. 289–291.

Saeki, T. et al., "A 2.5–ns Clock Access, 250–MHz, 256–Mb SDRAM with Synchronous Mirror Delay", IEEE Journal of Solid–State Circuits, vol. 31, No. 11, Nov. 1996, pp. 1656–1665.

Shirotori, T. et al., "PLL–based, Impedance Controlled Output Buffer", 1991 Symposium on VLSI Circuits Digest of Technical Papers, pp. 49–50.

Sidiropoulos, S. et al., "A 700–Mb/s/pin CMOS Signaling Interface Using Current Integrating Receivers", IEEE Journal of Solid–State Circuits, vol. 32, No. 5, May 1997, pp. 681–690.

Sidiropoulos, S. et al., "A CMOS 500 Mbps/pin synchronous point to point link interface", IEEE Symposium on VLSI Circuits Digest of Technical Papers, 1994, pp. 43–44.

Sidiropoulos, S. et al., "A Semi–Digital DLL with Unlimited Phase Shift Capability and 0.08–400MHz Operating Range", IEEE International Solid State Circuits Conference, Feb. 8, 1997, pp. 332–333.

Soyuer, M. et al., "A Fully Monolithic 1.25GHz CMOS Frequency Synthesizer", IEEE Symposium on VLSI Circuits Digest of Technical Papers, 1994, pp. 127–128.

Taguchi, M. et al., "A 40–ns 64–Mb DRAM with 64–b Parallel Data Bus Architecture", IEEE Journal of Solid–State Circuits, vol. 26, No. 11, Nov. 1991, pp. 1493–1497.

Tanoi, S. et al., "A 250–622MHz Deskew and Jitter–Suppressed Clock Buffer Using a Frequency–and Delay–Locked Two–Loop Architecture", 1995 Symposium on VLSI Circuits Digest of Technical Papers, vol. 11, No. 2, pp. 85–86.

Tanoi, S. et al., "A 250–622 MHz Deskew and Jitter–Suppressed Clock Buffer Using a Two–Loop Architecture", IEEE IEICE Trans. Electron., vol.E–79–C. No. 7, Jul. 1996, pp. 898–904.

von Kaenel, V. et al., "A 320 MHz, 1.5 mW @ 1.35 V CMOS PLL for Microprocessor Clock Generation", IEEE Journal of Solid–State Circuits, vol. 31, No. 11, Nov. 1996, pp. 1715–1722.

Watson, R. et al., "Clock Buffer Chip with Absolute Delay Regulation Over Process and Environmental Variations", IEEE Custom Integrated Circuits Conference, 1992, pp. 25.2.1–25.2.5.

Yoshimura, T. et al. "A 622–Mb/s Bit/Frame Synchronizer for High–Speed Backplane Data Communication", IEEE Journal of Solid–State Circuits, vol. 31, No. 7, Jul. 1996, pp. 1063–1066.

Gustavsion, David B., "IEEE Standard for Scalable Coherent Interface (SCI)," IEEE Computer Society, IEEE Std. 1596–1992, Aug. 2, 1993.

* cited by examiner

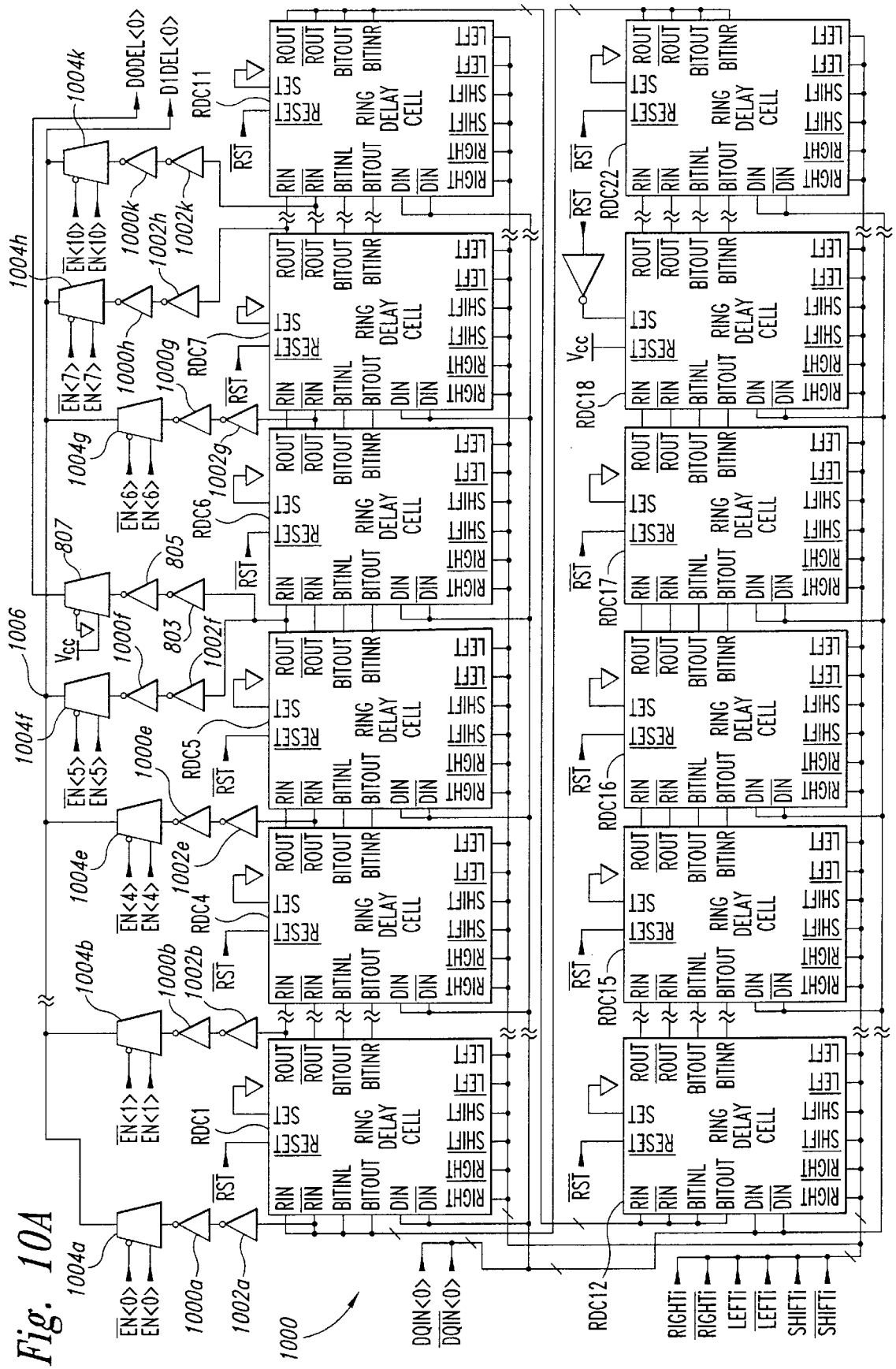

METHOD AND APPARATUS FOR HIGH SPEED DATA CAPTURE UTILIZING BIT-TO-BIT TIMING CORRECTION, AND MEMORY DEVICE USING SAME

TECHNICAL FIELD

The present invention relates generally to integrated circuit devices, and more particularly to a circuit and method of independently adjusting the respective time delays of a plurality of digital signals to enable an internal clock signal to be utilized in capturing such digital signals at high data transfer rates.

BACKGROUND OF THE INVENTION

Conventional computer systems include a processor (not shown) coupled to a variety of memory devices, including read-only memories ("ROMs") which traditionally store instructions for the processor, and a system memory to which the processor may write data and from which the processor may read data. The processor may also communicate with an external cache memory, which is generally a static random access memory ("SRAM"). The processor also communicates with input devices, output devices, and data storage devices.

Processors generally operate at a relatively high speed. Processors such as the Pentium® and Pentium II® microprocessors are currently available that operate at clock speeds of at least 400 MHz. However, the remaining components of existing computer systems, with the exception of SRAM cache, are not capable of operating at the speed of the processor. For this reason, the system memory devices, as well as the input devices, output devices, and data storage devices, are not coupled directly to the processor bus. Instead, the system memory devices are generally coupled to the processor bus through a memory controller, bus bridge or similar device, and the input devices, output devices, and data storage devices are coupled to the processor bus through a bus bridge. The memory controller allows the system memory devices to operate at a lower clock frequency that is substantially lower than the clock frequency of the processor. Similarly, the bus bridge allows the input devices, output devices, and data storage devices to operate at a substantially lower frequency. Currently, for example, a processor having a 300 MHz clock frequency may be mounted on a mother board having a 66 MHz clock frequency for controlling the system memory devices and other components.

Access to system memory is a frequent operation for the processor. The time required for the processor, operating, for example, at 300 MHz, to read data from or write data to a system memory device operating at, for example, 66 MHz, greatly slows the rate at which the processor is able to accomplish its operations. Thus, much effort has been devoted to increasing the operating speed of system memory devices.

System memory devices are generally dynamic random access memories ("DRAMs"). Initially, DRAMs were asynchronous and thus did not operate at even the clock speed of the motherboard. In fact, access to asynchronous DRAMs often required that wait states be generated to halt the processor until the DRAM had completed a memory transfer. However, the operating speed of asynchronous DRAMs was successfully increased through such innovations as burst and page mode DRAMs which did not require that an address be provided to the DRAM for each memory access. More recently, synchronous dynamic random access memories ("SDRAMs") have been developed to allow the pipelined transfer of data at the clock speed of the motherboard. However, even SDRAMs are incapable of operating at the clock speed of currently available processors. Thus, SDRAMs cannot be connected directly to the processor bus, but instead must interface with the processor bus through a memory controller, bus bridge, or similar device. The disparity between the operating speed of the processor and the operating speed of SDRAMs continues to limit the speed at which processors may complete operations requiring access to system memory.

A solution to this operating speed disparity has been proposed in the form of a computer architecture known as a synchronous link architecture. In the synchronous link architecture, the system memory may be coupled to the processor either directly through the processor bus or through a memory controller. Rather than requiring that separate address and control signals be provided to the system memory, synchronous link memory devices receive command packets that include both control and address information. The synchronous link memory device then outputs or receives data on a data bus that may be coupled directly to the data bus portion of the processor bus.

An example of a computer system 10 using the synchronous link architecture is shown in FIG. 1. The computer system 10 includes a processor 12 having a processor bus 14 coupled through a memory controller 18 and system memory bus 23 to three packetized or synchronous link dynamic random access memory ("SLDRAM") devices 16a–16c. The computer system 10 also includes one or more input devices 20, such as a keypad or a mouse, coupled to the processor 12 through a bus bridge 22 and an expansion bus 24, such as an industry standard architecture ("ISA") bus or a peripheral component interconnect ("PCI") bus. The input devices 20 allow an operator or an electronic device to input data to the computer system 10. One or more output devices 30 are coupled to the processor 12 to display or otherwise output data generated by the processor 12. The output devices 30 are coupled to the processor 12 through the expansion bus 24, bus bridge 22 and processor bus 14. Examples of output devices 24 include printers and a video display units. One or more data storage devices 38 are coupled to the processor 12 through the processor bus 14, bus bridge 22, and expansion bus 24 to store data in or retrieve data from storage media (not shown). Examples of storage devices 38 and storage media include fixed disk drives floppy disk drives, tape cassettes and compact-disk read-only memory drives.

In operation, the processor 12 sends a data transfer command via the processor bus 14 to the memory controller 18, which, in turn, communicates with the memory devices 16a–16c via the system memory bus 23 by sending the memory devices 16a–16c command packets that contain both control and address information. Data are coupled between the memory controller 18 and the memory devices 16a–16c through a data bus portion of the system memory bus 23. During a read operation, data is transferred from the packetized memory devices 16a–16c over the memory bus 23 to the memory controller 18 which, in turn, transfers the data over the processor 14 to the processor 12. The processor 12 transfers write data over the processor bus 14 to the memory controller 18 which, in turn, transfers the write data over the system memory bus 23 to the packetized memory devices 16a–16c. Although all the memory devices 16a–16c are coupled to the same conductors of the system memory bus 23, only one memory device 16a–16c at a time reads or writes data, thus avoiding bus contention on the memory bus 23. Bus contention is avoided by each of the memory devices 16a–16c on the system memory 22 having a unique identifier, and the command packet contains an identifying code that selects only one of these components.

The computer system 10 also includes a number of other components and signal lines that have been omitted from FIG. 1 in the interests of brevity. For example, the memory devices 16a–16c also receive a command clock signal to provide internal timing signals, and receive and provide respective data clock signals for clocking data into and out of the memory device, and also receive a FLAG signal signifying the start of a command packet, as will be explained in more detail below.

A typical command packet CA<0:39> for a packetized memory device is shown in FIG. 2 and is formed by 4 command packet words CA<0:9>, each of which contains 10 bits of data. As will be explained in more detail below, each packet word CA<0:9> is applied on a command bus CA including 10 lines CA0–CA9. In FIG. 2, the four packet words CA<0:9> comprising a command packet CA<0:39> are designated PW1–PW4. The first packet word $PW_1$ contains 7 bits of data identifying the packetized memory device 16a–16c that is the intended recipient of the command packet. As explained below, each of the packetized memory devices 16a–16c is provided with a unique ID code that is compared to the 7 ID bits in the first packet word $PW_1$. Thus, although all of the packetized memory devices 16a–16c will receive the command packet CA<0:39>, only the packetized memory device having an ID code that matches the 7 ID bits of the first packet word $PW_1$ will respond to the packet.

The remaining 3 bits of the first packet word $PW_1$ as well as 3 bits of the second packet word $PW_2$ comprise a 6 bit command. Typical commands are read and write in a variety of modes, such as accesses to pages or banks of memory cells. The remaining 7 bits of the second packet word $PW_2$ and portions of the third and fourth packet words $PW_3$ and $PW_4$ comprise a 20 bit address specifying a bank, row and column address for a memory transfer or the start of a multiple bit memory transfer. In one embodiment, the 20-bit address is divided into 3 bits of bank address, 10 bits of row address, and 7 bits of column address. Although the command packet shown in FIG. 2 is composed of 4 packet words PW1–PW4 each containing up to 10 bits, it will be understood that a command packet may contain a lesser or greater number of packet words, and each packet word may contain a lesser or greater number of bits.

The memory device 16a is shown in block diagram form in FIG. 3. Each of the memory devices 16a–16c includes a clock generator circuit 40 that receives a command clock signal CCLK and generates a large number of other clock and timing signals to control the timing of various operations in the memory device 16a. The memory device 16a also includes a command buffer 46 and an address capture circuit 48 which receive an internal clock signal ICLK, a command packet word CA<0:9> on a 10 bit command bus CA, and a terminal 52 receiving a FLAG signal. The clock generator 40 generates the ICLK signal in response to the CCLK signal, and the ICLK signal has a phase shift relative to the CCLK signal. A memory controller (not shown) or other device normally transmits command packet words CA<0:9> to the memory device 16a coincident with the command clock signal CCLK. As explained above, the command packet CA<0:39>, which generally includes four 10-bit packet words PW1–PW4, contains control and address information for each memory transfer. The FLAG signal is transmitted coincident with each packet work CA<0:9> and identifies the start of a command packet CA<0:39>. The FLAG signal also signals the start of an initialization mode of operation, as will be described in more detail below.

The command buffer 46 latches the command packet CA<0:39> from the command bus CA responsive to the ICLK signal, and compares at least a portion of the command packet to identifying data from an ID register 56 to determine if the packet is directed to the memory device 16a or some other memory device 16b, c. If the command buffer 46 determines that the command packet is directed to the memory device 16a, it then provides the command portion of the packet to a command decoder and sequencer 60. The command decoder and sequencer 60 generates a large number of internal control signals to control the operation of the memory device 16a during a memory transfer.

The address capture circuit 48 also receives the command packet CA<0:39> from the command bus CA and outputs a 20-bit address corresponding to the address portion in the command packet. The address is provided to an address sequencer 64, which generates a corresponding 3-bit bank address on bus 66, a 10-bit row address on bus 68, and a 7-bit column address on bus 70. The row and column addresses are processed by row and column address paths, as will be described in more detail below.

One of the problems of conventional DRAMs is their relatively low speed resulting from the time required to precharge and equilibrate circuitry in the DRAM array. The packetized memory device 16a shown in FIG. 3 largely avoids this problem by using a plurality of memory banks 80, in this case eight memory banks 80a–80h. After a read from one bank 80a, the bank 80a can be precharged while the remaining banks 80b–80h are being accessed. Each of the memory banks 80a–80h receives a row address from a respective row latch/decoder/driver 82a–82h. All of the row latch/decoder/drivers 82a–82h receive the same row address from a predecoder 84 which, in turn, receives a row address from either a row address register 86 or a refresh counter 88 as determined by a multiplexer 90. However, only one of the row latch/decoder/drivers 82a–82h is active at any one time as determined by bank control logic 94 as a function of a bank address from a bank address register 96.

The column address on bus 70 is applied to a column latch/decoder 100, which supplies I/O gating signals to an I/O gating circuit 102. The I/O gating circuit 102 interfaces with columns of the memory banks 80a–80h through sense amplifiers 104. Data are coupled to or from the memory banks 80a–80h through the sense amps 104 and I/O gating circuit 102 to a data path subsystem 108 which includes a read data path 110 and a write data path 112. The read data path 110 includes a read latch 120 that stores data from the I/O gating circuit 102.

In the memory device 16a shown in FIG. 3, 72 bits of data are stored in the read latch 120. The read latch then provides four 18-bit data words to an output multiplexer 122 that sequentially supplies each of the 18-bit data words to a read FIFO buffer 124. Successive 18-bit data words are clocked into the read FIFO buffer 124 by a clock signal RCLK generated from the internal clock signal ICLK. The 18-bit data words are then clocked out of the read FIFO buffer 124 by a clock signal obtained by coupling the RCLK signal through a programmable delay circuit 126. The programmable delay circuit 126 is programmed during initialization of the memory device 16a so that the data from the memory device is received by a memory controller, processor, or other device (not shown in FIG. 3) at the proper time. The FIFO buffer 124 sequentially applies the 18-bit data words to a driver circuit 128 which, in turn, applies the 18-bit data words to a data bus DQ forming part of the processor bus 14 (see FIG. 1). The driver circuit 128 also applies one of two data clock signals DCLK0 and DCLK1 to respective data clock lines 132 and 133. The data clocks DCLK0 and DCLK1 enable a device, such as the processor 12, reading the data on the data bus DQ to be synchronized with the data. Particular bits in the command portion of the command packet CA0–CA9 determine which of the two data clocks DCLK0 and DCLK1 is applied by the driver circuit 128. It should be noted that the clock signals CCLK, DCLK0, and DCLK1 are differential clock signals that each include true and complementary signals, but for ease of explanation only one signal for each clock is illustrated and described.

The write data path 112 includes a receiver buffer 140 coupled to the data bus 130. The receiver buffer 140 sequentially applies 16-bit data words from the data bus DQ to four input registers 142, each of which is selectively enabled by a signal from a clock generator circuit 144. The clock generator circuit 144 generates these enable signals responsive to the selected one of the data clock signals DCLK0 and DCLK1. The memory controller or processor determines which data clock DCLK0 or DCLK1 will be utilized during a write operation using the command portion of a command packet CA<0:39> applied to the memory device 16a. As with the command clock signal CCLK and command packet, the memory controller or other device (not shown) normally transmits the data to the memory device 16a coincident with the selected one of the data clock signals DCLK0 and DCLK1. The clock generator 144 is programmed during initialization to adjust the timing of the clock signal applied to the input registers 142 relative to the selected one of the data clock signals DCLK0 and DCLK1 so that the input registers 142 can capture the write data at the proper times. In response to the clock signal generated responsive to the selected data clock DCLK0 or DCLK1, the input registers 142 sequentially store four 16-bit data words and combine them into one 64-bit data word applied to a write FIFO buffer 148. The write FIFO buffer 148 is clocked by a signal from the clock generator 144 and an internal write clock WCLK to sequentially apply 64-bit write data to a write latch and driver 150. The write latch and driver 150 applies the 64-bit write data to one of the memory banks 80a–80h through the I/O gating circuit 102 and the sense amplifiers 104.

As mentioned above, a goal of the synchronous link architecture is to allow data transfer between a processor and a memory device to occur at a significantly faster rate. It should be noted that the phrase "data transfer" as used herein includes all digital signals transferred to and from the memory device 16a, and thus includes signals on the CA and DQ busses as well as the FLAG signal. As the data transfer rate increases, it becomes more difficult to maintain the required timing between signals transmitted to the memory device 16a. For example, as mentioned above, the command packet CA<0:39> is normally transmitted to the memory device 16a coincident with the command clock signal CCLK, and the data is normally transmitted to the memory device 16a coincident with the selected one of the data clock signals DCLK0 and DCLK1. However, because of unequal signal delays and other factors, the command packet words CA<0:9> may not arrive at the memory device 16a coincident with the command clock signal CCLK, and write data packet words DQ<0:17> may not arrive at the memory device 16a coincident with the selected data clock signal DCLK0 or DCLK1. Moreover, even if these signals are actually coupled to the memory device 16a coincident with each other, this timing may be lost once they are coupled to circuits within the memory device. For example, internal signals require time to propagate to various circuitry in the memory device 16a, differences in the lengths of signal routes can cause differences in the times at which signals reach the circuitry, and differences in capacitive loading of signal lines can also cause differences in the times at which signals reach the circuitry.

The problems associated with varying arrival times can become significant at high data transfer rates and eventually limit the operating speed of the packetized memory device. For example, if the internal clock ICLK derived from the command clock CCLK does not cause each of the packet words CA<0:9> comprising a command packet CA<0:39> to be latched at the proper time, errors in the operation of the memory device 16a may result. The timing or phase shift of the internal clock signal ICLK relative to the command clock signal CCLK must have a value that enables the ICLK signal to be utilized in successfully latching each of the respective command signals CA<0>–CA<9> comprising a packet word CA<0:9>. The same is true of respective internal clock signals derived from the DCLK0 and DCLK1 signals, these internal clock signals being utilized to latch DQ<0>–DQ<17> signals applied on the data bus DQ.

As the data transfer rate increases, the duration for which each signal CA<0>–CA<9> in a packet word CA<0:9> is valid decreases by a corresponding amount, as will be understood by one skilled in the art. More specifically, the data window or "eye" for each of the CA<0>–CA<9> signals decreases at higher data transfer rates, and the same is true for the respective data signals DQ<0>–DQ<17> applied on the data bus DQ. The following discussion applies to both the CA<0>–CA<9> and the DQ<0>–DQ<17> signals, but only the CA<0>–CA<9> signals will be discussed in more detail. As understood by one skilled in the art, the data eye for each of the CA<0>–CA<9> signals defines the actual duration that each signal is valid after timing skew of the signal is considered. The timing skew of the CA<0>–CA<9> signals arises from a variety of timing errors, such as loading on the lines of the CA bus and the physical lengths of such lines. FIG. 4 is a timing diagram illustrating the data eyes for a number of the CA<0>–CA<9> signals, each of these signals being in the same packet word CA<0:9> applied on the command bus CA by the memory controller 18. The solid lines indicate the ideal CA<0>, CA<1>, and CA<9> signals, and the dashed lines indicate the potential timing skew for the actual CA<0>, CA<1>, and CA<9> signals. The data eyes DE of the CA<0>, CA<1>, and CA<9> signals are defined by time intervals $t_0$–$t_3$, $t_1$–$t_4$, and $t_5$–$t_7$, respectively. The timing skew reduces the data eyes DE of the CA<0>, CA<1>, and CA<9> signals and thereby reduces the valid duration during which each of these signals may be successfully captured.

As data eyes of the applied signals CA<0>–CA<9> decrease at high data transfer rates, it is possible that one or more of these signals in each packet word CA<0:9> will have arrival times such that not all signals in a packet word are simultaneously valid at the memory device 16a, and thus cannot be successfully captured by the internal clock signal ICLK. For example, in FIG. 4, the data eye DE of the CA<0> signal from times $t_0$–$t_3$ does not overlap the data eye of the CA<9> signal from times $t_5$–$t_7$. In this situation, the signals CA<0> and CA<9> are not both valid at the memory device 16a at the same time so the packet word CA<0:9> cannot be successfully captured responsive to the ICLK signal. The transition of the ICLK signal at time $t_2$ could successfully capture the CA<0> and CA<1> signals but not the CA<9> signal, and, conversely, the transition of the ICLK signal at time $t_6$ could successfully capture the CA<9> signal but not the CA<0> and CA<1> signals, which have already gone invalid.

There is a need for successfully capturing signals applied to a packetized memory device at very high data transfer rates. Moreover, although the foregoing discussion is directed to packetized memory devices like SLDRAMs, similar problems exist in other types of integrated circuits, including other types of memory devices, as well as in any system capturing digital signals applied on a bus at very high data transfer rates.

SUMMARY OF THE INVENTION

According to one aspect of the present invention, a bus capture circuit captures digital signals applied on respective lines of a bus. Each latch has input and output terminals and latches a digital signal applied at the input terminal responsive to a clock signal. The bus capture circuit further includes a plurality of signal delay circuits, each signal delay circuit being coupled between a respective bus line and the input terminal of a respective latch. Each signal delay circuit develops a delayed digital signal having a delay time relative to the digital signal applied on the corresponding bus line, and applies the delayed digital signal to the input terminal of the corresponding latch. A control circuit is coupled to the signal delay circuits and to the output terminals of the latches. The control circuit adjusts the delay time of each signal delay circuit as a function of the data eye of the digital signal applied on the input of the signal delay circuit. In this way, the bus capture circuit adjusts the respective delay time of each signal delay circuit such that the corresponding latch successfully latches the delayed digital signal output from the signal delay circuit responsive to an applied clock signal.

According to a second aspect of the present invention, the control circuit also operates in a monitoring mode of operation to detect shifts in the data eye of an external clock signal. When the control circuit detects such a shift, the control circuit adjusts the delay time of all signal delay circuits by a delay adjustment time. According to another aspect of the present invention, the bus capture circuit is contained in a packetized memory device, such as an SLDRAM, and operates during an initialization mode of operation to adjust the delay times of each signal delay circuit as a function of the data eye of the digital signal applied on the input of that signal delay circuit.

BRIEF DESCRIPTION OF THE DRAWINGS

FIGS. 10A and 10B are a schematic of one embodiment of one of the data delay rings of FIG. 5.

DETAILED DESCRIPTION OF THE INVENTION

Figure 3:
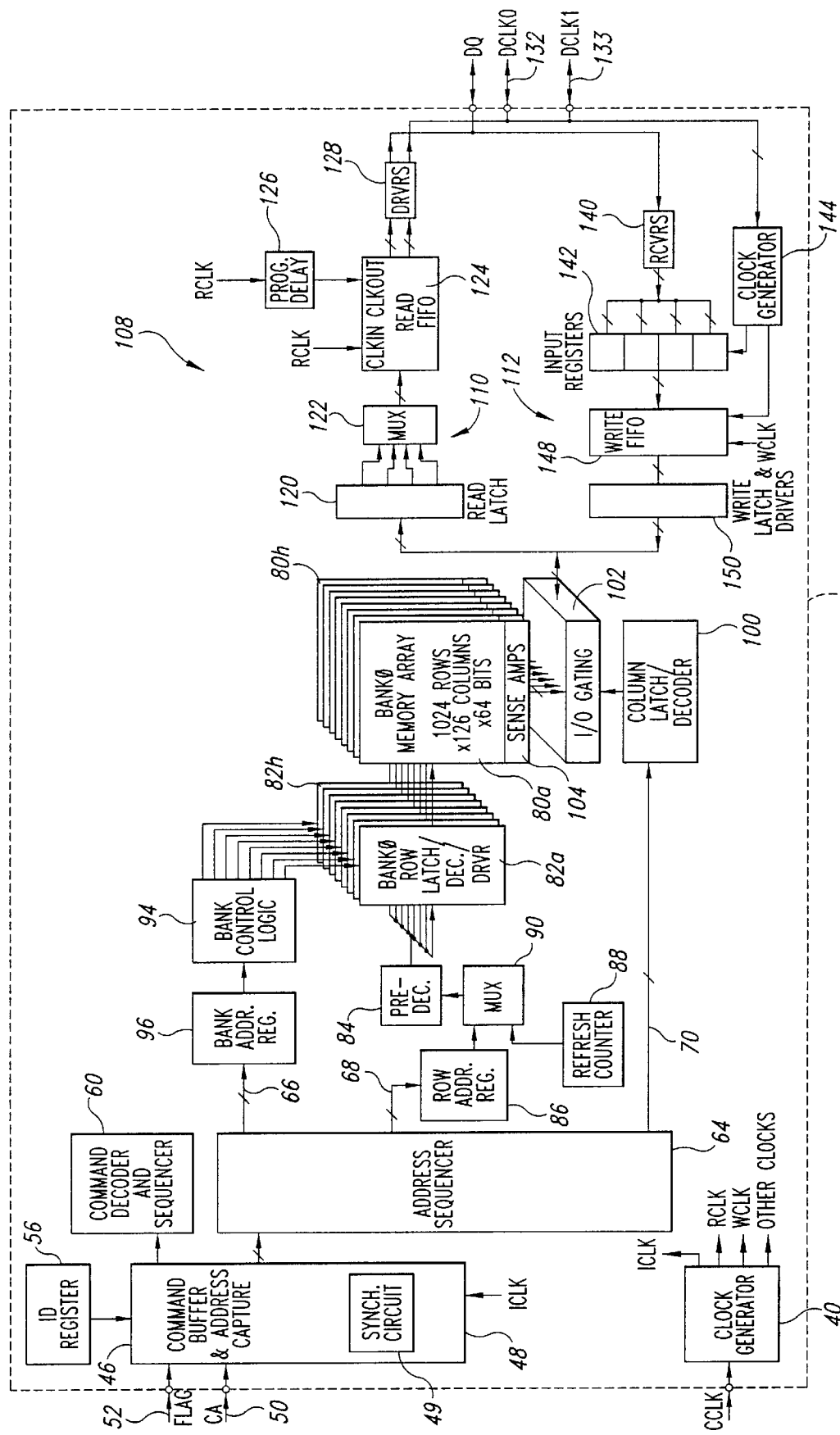
FIG. 3 is a block diagram of a conventional packetized memory device in the computer system of FIG. 1.
Figure 4:
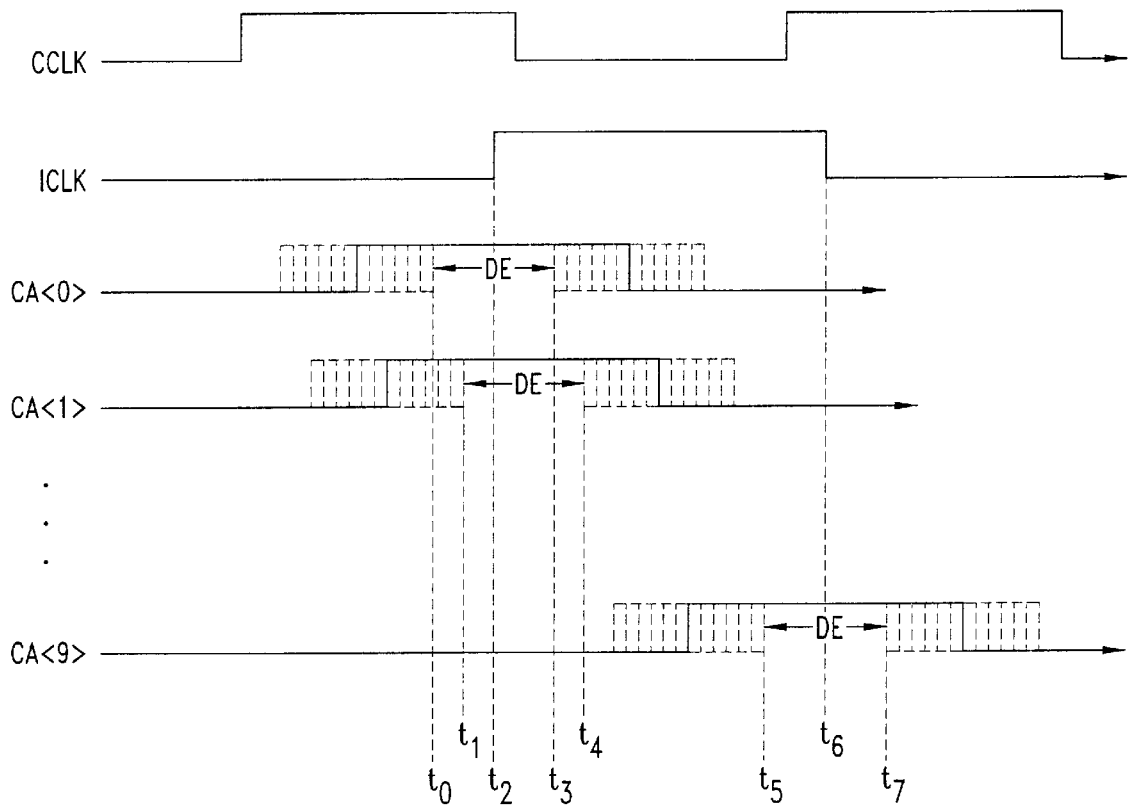
FIG. 4 is a timing diagram illustrating the effect of timing skews of the respective command signals at high data transfer rates.
Figure 5:
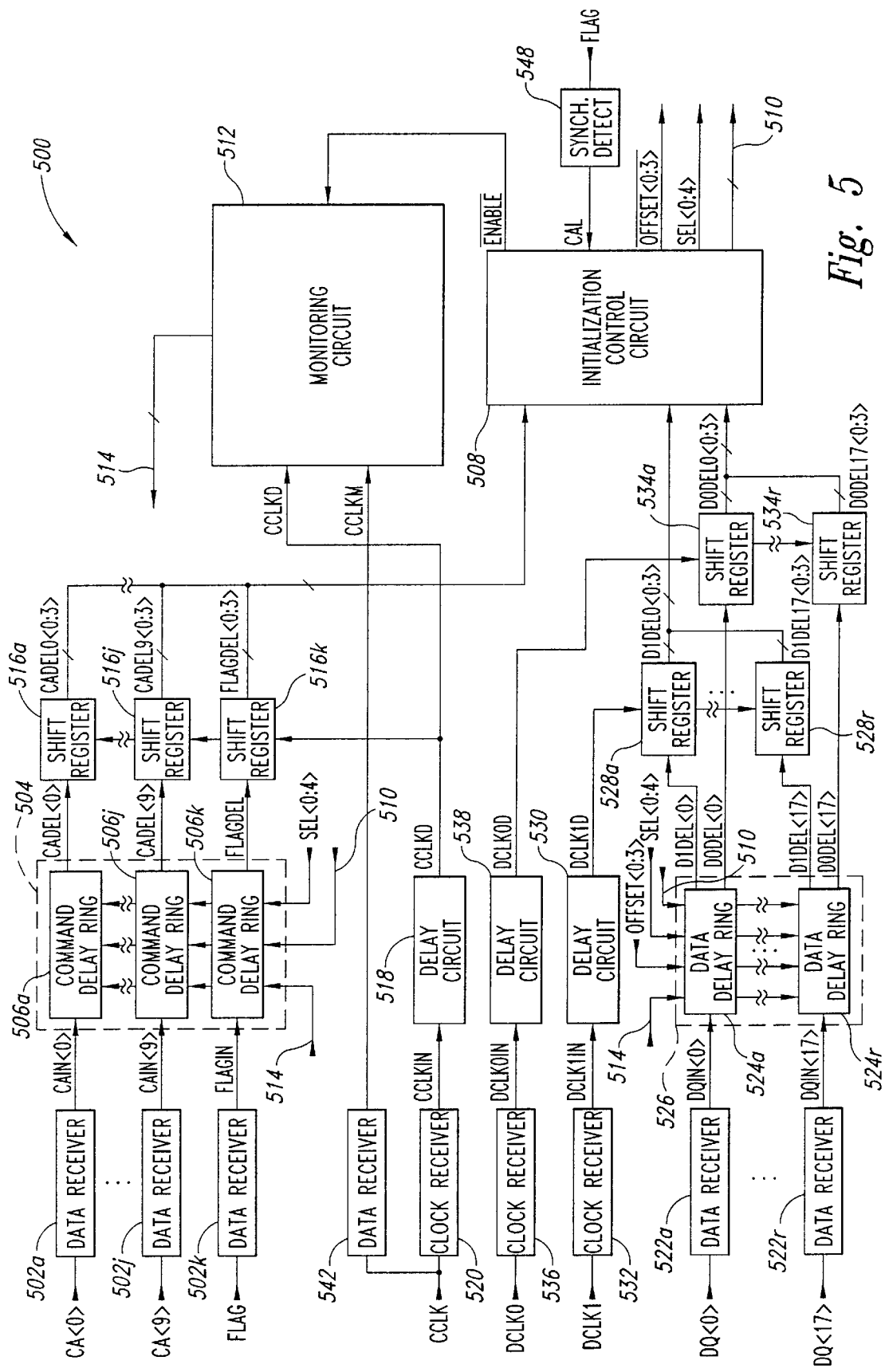
FIG. 5 is a functional block diagram of a bit-to-bit timing correction circuit according to one embodiment of the present invention.

FIG. 5 is a functional block diagram of a bit-to-bit timing correction circuit 500 according to one embodiment of the present invention. The bit-to-bit timing correction circuit 500 is typically contained in the command buffer 46, address capture circuit 48, and write data path circuitry 112 in the packetized memory device 16a of FIG. 3, but may be contained in any type of integrated circuit including other types of memory devices. In operation, the bit-to-bit timing correction circuit 500 operates in two modes, an initialization mode and a monitoring mode. During the initialization mode of operation, the bit-to-bit timing correction circuit 500 independently adjusts respective time delays for each of the CA<0>–CA<9> and FLAG signals applied on the command bus CA so that these signals may be successfully captured by an internal clock signal generated in response to the command clock signal CCLK, and operates in the same way to independently adjust respective delay times for each of the data signals DQ<0>–DQ<17> so that these signals can be successfully captured by respective internal clock signals generated responsive to the DCLK0 and DCLK1 signals, as will be explained in more detail below. During the monitoring mode of operation, the bit-to-bit timing correction circuit 500 detects shifts in the data eye of the command clock signal CCLK and adjusts the previously determined time delays for each of the CA<0>–CA<9>, DQ<0>–DQ<17>, and FLAG signals when such a shift is detected to thereby maintain successful capture of these signals during normal operation of the packetized memory device 16a containing the bit-to-bit timing correction circuit 500, as will also be explained in more detail below.

The bit-to-bit timing correction circuit 500 includes a plurality of data receivers 502a–502k, each receiving a respective one of the command signals CA<0>–CA<9> applied on a command bus CA. Each of the data receivers 502a–502k develops a respective output signal CAIN<0>–CAIN<9> in response to the corresponding command signal CA<0>–CA<9> applied at its input. The data receivers 502a–502k operate as conventional data receivers, each data receiver driving the corresponding CAIN<0>–CAIN<9> signal on its output to the same logic level voltage as the corresponding CA<0>–CA<9> signal applied on its input while introducing a minimal time delay between the input and output signals. A data receiver 502k operates in the same way, receiving the FLAG signal on its input and developing a FLAGIN signal on its output in response to the received FLAG signal. A data receiver that may be utilized for each of the data receivers 502a–502k is described in more detail in U.S. patent application Ser. No. 09/140,857 to Brent Keeth et al., entitled "LOW SKEW DIFFERENTIAL RECEIVER WITH DISABLE FEATURE," which is incorporated herein by reference.

The CAIN<0>–CAIN<9> and FLAGIN signals from the data receivers 502a–502k are applied to a command capture block 504 that delays each of these received command signals by a respective delay time and generates delayed command signals CADEL<0>–CADEL<9> and FLAGDEL, as will now be explained in more detail. The command capture block 504 includes a plurality of command delay rings 506a–506k, each of the command delay rings receiving a respective one of the CAIN<0>–CAIN<9> and FLAGIN signals and also receiving a plurality of control signals 510 and a selection word SEL<0:4> from an initialization control circuit 508. In operation, each of the command delay rings 506a–506k generates the corresponding delayed command signal CADEL<0>–CADEL<9> and FLAGDEL having a variable or adjustable delay time relative to the applied CAIN<0>–CAIN<9> and FLAGIN signal. For example, the command delay ring 506a generates the CADEL<0> signal having an adjustable delay time relative to the CAIN<0> signal applied on its input. The values of the respective delay times of the command delay rings 506a–506k are determined by the control circuit 508 during an initialization mode of operation and by a monitoring circuit 512 during a monitoring mode of operation. During the initialization mode, the control circuit 508 selects one of the command delay rings 506a–506k by applying the SEL<0:4> word having a value corresponding to the selected command delay ring, and thereafter develops the control signals 510 to adjust the value of the corresponding time delay. It should be noted that the control signals 510 from the control circuit 508 only adjust the delay time of the selected command delay ring 506a–506k, and are ignored by all the non-selected command delay rings. During the monitoring mode of operation, none of the command delay rings 506a–506k is selected by the SEL<0:4> word, and the monitoring circuit 512 applies a plurality of control signals 514 to each of the command delay rings 506a–506k to adjust each of their respective delay times by the same predetermined amount. In developing the control signals 514, the monitoring circuit 512 samples the data eye of a clock signal CCLKM developed by a data receiver 542 in response to the CCLK signal and detects shifts in this data eye, as will be described in more detail below. The initialization control circuit 508 applies an enable signal $\overline{\text{ENABLE}}$ to activate the monitoring circuit 512 to commence the monitoring mode of operation. In contrast to the initialization mode where only the delay time of the selected command delay ring 506a–506k is adjusted, during the monitoring mode the respective delay times of all the command delay rings 506a are adjusted by the same predetermined amount. The operation of the command delay rings 506a–506k during both the initialization and monitoring modes will be described in more detail below.

A plurality of shift registers 516a–516k receive the delayed signals CADEL<0>–CADEL<9> and FLAGDEL on their inputs, respectively, and are clocked by a delayed command clock signal CCLKD. Each of the shift registers 516a–516k includes four stages, and sequentially shifts the corresponding delay signal CADEL<0:9> and FLAGDEL applied on its input into the first stage responsive to each rising-edge transition of the CCLKD signal and into the second stage responsive to each falling-edge transition of the CCLKD signal. The signal in the first stage is thereafter shifted from the first stage to the third stage responsive to the next rising-edge transition of the CCLKD signal and a new delay signal shifted into the first stage. The signal in the second stage is thereafter shifted from the second stage to the fourth stage responsive to the next falling-edge of the CCLKD signal and a new delay signal shifted into the second stage. Each of the registers 516a–516k outputs the four stored signals to the control circuit 508 as the corresponding 4-bit word CADEL0<0:3>–CADEL9<0:3> and FLAGDEL<0:3>. During normal operation of the packetized memory device 16a containing the correction circuit 500, the CADEL<0:9> signals are stored in a register (not shown) and utilized to control operation of the memory device 16a, as will be understood by one skilled in the art.

The delay circuit 518 generates the CCLKD signal in response to an internal command clock signal CCLKIN received from a clock receiver 520, the CCLKD signal having a predetermined time delay relative to the CCLKIN signal. The clock receiver 520 develops the CCLKIN signal in response to the command clock signal CCLK applied on its input. The clock receiver 520 operates in a manner analogous to that previously described for the data receivers 502a–502k, developing the CCLKIN signal on its output having a minimal time delay relative to the applied CCLK signal. In operation, the delay circuit 518 and clock receiver 520 operate in combination to clock the shift registers 516a–516k with the CCLKD signal having a predetermined time delay relative to the CCLK signal. The shift registers 516a–516k are clocked by the CCLKD signal instead of the CCLKIN signal to ensure that the CA<0>–CA<9> and FLAG signals must be delayed by the delay rings 506a–506k to ensure proper capture by the latches 516a–516k. In other words, the command delay rings 506a–506k can only delay the CA<0>–CA<9> and FLAG signals and not advance these signals, so the CCLK signal must be delayed by a sufficient amount to ensure that a particular transition of the CCLK signal can be utilized to successfully capture the CADEL<0:9> and FLAGDEL signals developed by the delay rings 506a–506k responsive to the CA<0:9> and FLAG signals transmitted coincident with that particular transition of the CCLK signal, as will be understood by one skilled in the art.

The bit-to-bit timing correction circuit 500 further includes a plurality of data receivers 522a–522r each receiving a respective one of the data signals DQ<0>–DQ<17> signals applied on the data bus DQ. The data receivers 522a–522r operate in the same way as previously described for the data receivers 502a–502k to develop output signals DQIN<0>–DQIN<17>, respectively, in response to the corresponding DQ<0>–DQ<17> signals. The DQIN<0>–DQIN<17> signals from the data receivers 522a–522r are applied to a plurality of data delay rings 524a–524r, respectively, that form a data capture block 526. Each of the data delay rings 524a–524r generates a corresponding pair of first and second delayed data signals D0DEL<0:17> and D1DEL<0:17> having respective time delays relative to the corresponding DQIN<0>–DQIN<17> signal applied on its input. For example, the data delay ring 524a generates the first delayed data signal D0DEL<0> having a first time delay relative to the DQIN<0> signal applied on its input, and generates the second delayed data signal D1DEL<0> having a second delay time relative to the DQIN<0> signal. The initialization control circuit 508 applies the control signals 510 and the SEL<0:4> word to the data delay rings 524a–524r to control their operation in the initialization mode and monitoring mode to adjust the respective first time delays of the D0DEL<0:17> signals as previously described for the command delay rings 506a–506k. In addition, during the initialization mode, the control circuit 508 applies a time delay offset word to the selected data delay ring 524a–524r to adjust the time delay of the D1DEL<0> signal after the time delay of the D0DEL signal has been determined, as will be explained in more detail below. Each of the data delay rings 524a–524r also receives the control signals 514 from the monitoring circuit 512 to adjust each of the time delays of the data delay rings 524a–524r during the monitoring mode of operation, as will also be explained in more detail below.

A first group of shift registers 528a–528r receive the delayed data signals D1DEL<0>–D1DEL<17>, respectively, each shift register including four stages. A clock receiver 532 and delay circuit 530 operate in the same way as previously described for the clock receiver 520 and delay circuit 518 to clock the registers 528a–528r with a delayed data clock signal DCLK1D having a predetermined time delay relative to the DCLK1 signal. Each of the shift registers 528a–528r is identical to the shift registers 516a–516k, and operates in the same way to sequentially shift the applied D1DEL<0:17> signal into its four respective stages responsive to the DCLK1D signal. Each register 528a–528r outputs the four stored delay signals as the corresponding four bit word D1DEL0<0:3>–D1DEL17<0:3>, and these words are applied to the initialization control circuit 508 which utilizes the words in determining the respective second time delays for the data delay rings 524a–524r, as will be described in more detail below. The shift registers 528a–528r are clocked by the DCLK1D signal, which is a delayed version of the DCLK1 signal, to ensure that a particular transition of the DCLK1 signal can be utilized to successfully capture the delayed data signals D1DEL<0:17> developed by the data delay rings 524a–524r responsive to the DQ<0:17> signals transmitted coincident with that particular transition of the DCLK1 signal, as previously discussed with reference to the CCLKD signal clocking the registers 516a–516k.

A second group of shift registers 534a–534r receive the delayed data signals D0DEL<0>–D0DEL<17>, respectively, from the data delay rings 524a–524r. Each of the shift registers 534a–534r is identical to the shift registers 516a–516k and 528a–528r, and operates in the same way to sequentially shift the applied D0DEL<0:17> signal into respective stages and output the four stored delayed data signals as a corresponding four bit word D0DEL0<0:3>–D0DEL17<0:3>. The D0DEL0<0:3>–D0DEL17<0:3> words are applied to the initialization control circuit 508, which utilizes these words in determining the respective first time delays for the data delay rings 524a–524r, as will be described in more detail below. A clock receiver 536 and delay circuit 538 operate in the same way as the clock receiver 532 and delay circuit 530 to clock the shift registers 534a–534r with a delayed data clock signal DCLK0D having a predetermined time delay relative to the DCLK0 signal, and thus their operation will not be described in further detail.

The bit-to-bit timing correction circuit 500 further includes a synchronization detection circuit 548 that receives the FLAG signal and generates a calibration signal CAL when the FLAG signal indicates the packetized memory device 16a containing the timing correction circuit 500 is to be placed in the initialization mode of operation. As previously described, the packetized memory device 16a is placed in the initialization mode of operation by applying two consecutive 1's for the FLAG signal. Thus, when the synchronization detection circuit 548 detects two consecutive binary 1's for the FLAG signal, the detection circuit 548 applies an active CAL signal to the initialization control circuit 508, placing the timing correction circuit 500 in the initialization mode of operation. A more detailed description of one embodiment of the synchronization detection circuit 548 is described in U.S. patent application Ser. No. 09/146, 716 to Manning, entitled "METHOD AND APPARATUS FOR RESYNCHRONIZING A PLURALITY OF CLOCK SIGNALS USED IN LATCHING RESPECTIVE DIGITAL SIGNALS APPLIED TO A PACKETIZED MEMORY DEVICE," which is incorporated herein by reference.

Figure 1:
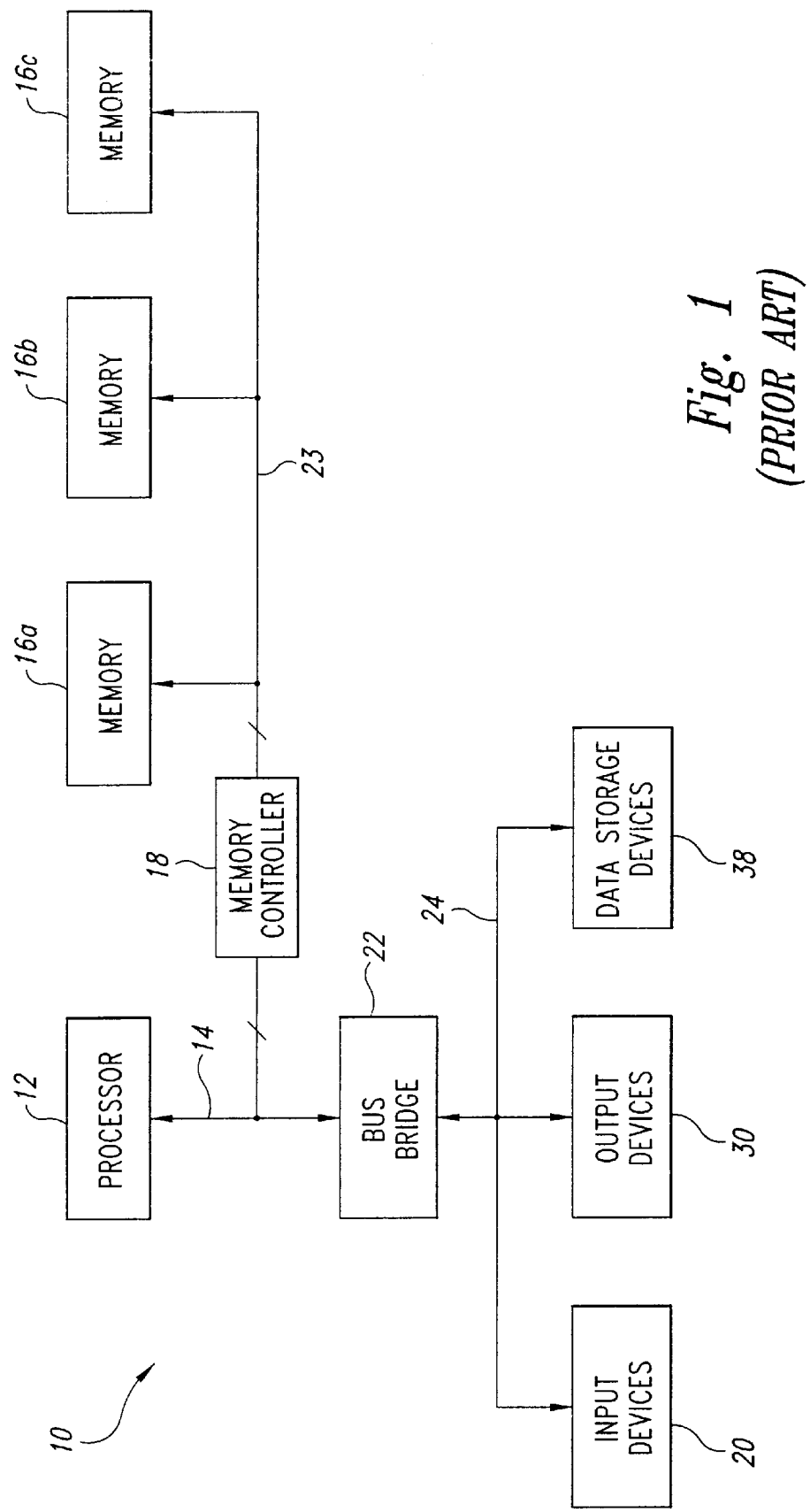
FIG. 1 is a block diagram of a conventional computer system including a plurality of packetized memory devices.
Figure 2:
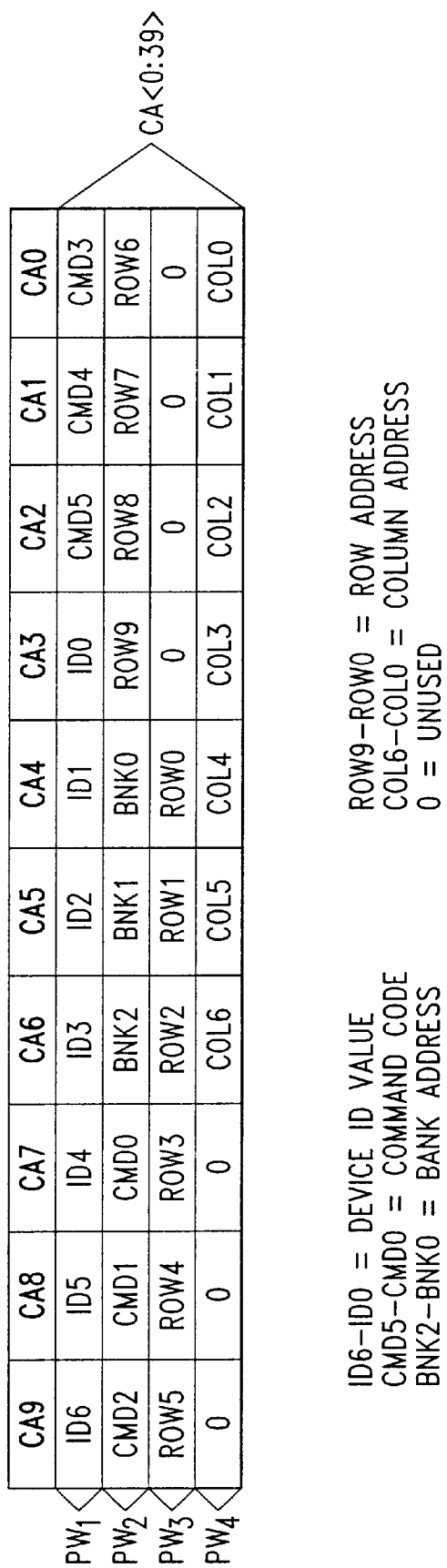
FIG. 2 is diagram showing a typical command packet received by the packetized memory devices of FIG. 1.

In operation, the bit-to-bit timing correction circuit 500 operates in two modes, an initialization mode and a monitoring mode. To place the bit-to-bit timing correction circuit 500 in the initialization mode of operation, the memory controller 18 (FIG. 1) applies a 15-bit repeating pseudo-random bit sequence on each line of the command bus CA, on the flag line receiving the FLAG signal, and on each line of the data bus DQ. One 15-bit repeating pseudo-random bit sequence that may be applied on these lines is shown in Table 1 below.

TABLE 1

| FLAG  | 1 | 1 | 1 | 1 | 0 | 1 | 0 | 1 | 1 | 0 | 0 | 1 | 0 | 0 | 0 |
|-------|---|---|---|---|---|---|---|---|---|---|---|---|---|---|---|
| CA<9> | 0 | 0 | 0 | 0 | 1 | 0 | 1 | 0 | 0 | 1 | 1 | 0 | 1 | 1 | 1 |
| CA<8> | 1 | 1 | 1 | 1 | 0 | 1 | 0 | 1 | 1 | 0 | 0 | 1 | 0 | 0 | 0 |
| CA<7> | 0 | 0 | 0 | 0 | 1 | 0 | 1 | 0 | 0 | 1 | 1 | 0 | 1 | 1 | 1 |
| . | . | . | . | . | . | . | . | . | . | . | . | . | . | . | . |
| . | . | . | . | . | . | . | . | . | . | . | . | . | . | . | . |
| CA<0>  | 1 | 1 | 1 | 1 | 0 | 1 | 0 | 1 | 1 | 0 | 0 | 1 | 0 | 0 | 0 |
| DQ<15> | 0 | 0 | 0 | 0 | 1 | 0 | 1 | 0 | 0 | 1 | 1 | 0 | 1 | 1 | 1 |
| DQ<14> | 1 | 1 | 1 | 1 | 0 | 1 | 0 | 1 | 1 | 0 | 0 | 1 | 0 | 0 | 0 |
| . | . | . | . | . | . | . | . | . | . | . | . | . | . | . | . |
| . | . | . | . | . | . | . | . | . | . | . | . | . | . | . | . |
| DQ<0> | 1 | 1 | 1 | 1 | 0 | 1 | 0 | 1 | 1 | 0 | 0 | 1 | 0 | 0 | 0 |

As seen from Table 1, the 15-bit pseudo-random bit sequence is complemented on adjacent lines of the command bus CA and data bus DQ. Thus, for example, the sequence starts with 0000 on line CA<9>, 1111 on CA<8>, 0000 on CA<7>, and so on, such that the sequence applied on each line is the complement of the sequence applied on adjacent lines. The repeating pseudo-random bit sequence insures that no four consecutive bits can be mistaken for any other four consecutive bits, as will be understood by one skilled in the art.

In response to the applied 15-bit pseudo-random bit sequence, the synchronization detection circuit 548 activates the CAL signal placing the bit-to-bit timing correction circuit 500 in the initialization mode of operation. More specifically, as shown in Table 1, the pseudo-random bit sequence begins with consecutive 1's for the FLAG signal. As previously described, in response to two consecutive 1's applied for the FLAG signal, the synchronization detection circuit 548 activates the CAL signal to place the bit-to-bit timing correction circuit 500 in the initialization mode of operation. In response to the active CAL signal, the initialization control circuit 508 generates the control signals 510, OFFSET<0:3> word, and SEL<0:4> word to sequentially and independently adjust the respective time delays of each of the command delay rings 506a–506k and data delay rings 524a–524r, as will now be explained in more detail.

After receiving the active CAL signal, the initialization control circuit 508 generates the SEL<0:4> word to select an initial one of the command delay rings 506a–506k and data delay rings 524a–524r. In the embodiment of FIG. 5, the initialization control circuit 508 initially sets the value of the SEL<0:4> word to 00000 to thereby select the command delay ring 506a. As previously discussed, only the selected one of the command delay rings 506a–506k and data delay rings 524a–524r responds to the control signals 510 from the initialization control circuit 508. In this way, the initialization control circuit 508 may independently adjust the respective time delays for each of the command delay rings 506a–506k and data delay rings 524a–524r by generating the SEL<0:4> word corresponding to the selected delay ring and thereafter applying the control signals 510 to adjust the time delay of the selected delay ring. At this point, the initialization control circuit 508 applies the control signals 510 to the selected command delay ring 506a to adjust the delay time of the command delay ring 506a to a first value. The command delay ring 506a thereafter develops the CADEL<0> signal having the first time delay relative to the CAIN<0> signal applied on its input.

At this point, the CA<0> signal from the memory controller 18 (FIG. 1) is applied through the data receiver 502a and delayed by the first time delay of the command delay ring 506a, this delayed signal being applied as the CADEL<0> signal to the shift register 516a. The shift register 516a sequentially latches the CADEL<0> signal in response to each transition of the CCLKD signal and outputs the latched CADEL0<0:3> word to the initialization control circuit 508. The initialization control circuit 508 compares the value of each of the bits in the latched CADEL0<0:3> word to an expected value and stores the result of this comparison. The initialization control circuit 508 may generate the expected values for the latched CADEL0<0:3> word from the known 15-bit pseudo-random bit sequence for this signal previously described with reference to Table 1. A circuit that may be utilized to generate the expect data is disclosed in U.S. patent application Ser. No. 09/146,860 to Manning entitled, "METHOD AND APPARATUS FOR GENERATING EXPECT DATA FROM A CAPTURED BIT PATTERN, AND MEMORY DEVICE USING SAME," which is incorporated herein by reference. The result of this comparison indicates whether the first time delay for the command delay ring 506a results in the successful capture of the CADEL<0> signal in the shift register 516a. In other words, when the latched CADEL0<0:3> word has its expected value, the CA<0> signal applied on the command bus CA is being delayed by an amount that allows this signal to be successfully captured in the shift register 516a in response to the CCLKD signal. In contrast, when the CADEL0<0:3> word does not have its expected value, the first time delay of the command delay ring 506a does not allow successful capture of the CA<0> signal applied on the command bus CA.

After the initialization control circuit 508 has stored the result of the comparison of the CADEL0<0:3> word at the first time delay, the initialization control circuit 508 applies the control signals 510 to increment the time delay of the command delay ring 506a to a second value. The command delay ring 506a thereafter delays the CA<0> signal by the second time delay and once again applies the CADEL<0> signal having the second time delay to the shift register 516a. Once again, the shift register 516a latches the CADEL<0> signal responsive to the CCLKD signal and outputs the latched CADEL0<0:3> word to the initialization control circuit 508. The initialization control circuit 508 operates as previously described, comparing the latched value of the CADEL0<0:3> word at the second time delay to the expected value for this signal and storing the result of this comparison.

The initialization control circuit 508 thereafter continues operating in the same manner to sequentially adjust the time delay of the command delay ring 506a and compare the latched CADEL0<0:3> word at each time delay to the expected value for that word and stores the results of each such comparison. In one embodiment, the initialization control circuit 508 adjusts the time delay of the command delay ring 506a twenty-two times, and stores the results of the comparison of each latched CADEL0<0:3> word at each time delay. In one embodiment, the incremental difference between delay times is approximately 100 picoseconds. Once the initialization control circuit 508 has stored the corresponding twenty-two result signals, the initialization control circuit 508 selects an optimum time delay for the command delay ring 506a from the ones of the time delays resulting in the CADEL0<0:3> word having the expected value. An analogous procedure that may be utilized by the control circuit 508 in determining the optimum delay time for the command delay ring 506a is described in more detail in U.S. patent application SER. No. 08/890,055 to Baker et al., which is incorporated herein by reference. Once the initialization control circuit 508 has determined the optimum time delay for the command delay ring 506a, the initialization control circuit develops the control signals 510 to adjust the time delay of the command delay ring 506a to the optimum value.

After adjusting the time delay of the command delay ring 506a to its optimum value, the initialization control circuit 508 increments the value of the SEL<0:4> word to thereby select the command delay ring 506b (not shown). The initialization control circuit 508 thereafter operates in the same manner as previously described to adjust the time delay of the command delay ring 506b to its optimum value. In other words, the initialization control circuit 508 develops the control signals 510 to sequentially adjust the value for the time delay of the command delay ring 506b, and compares each of the corresponding latched CADEL1<0:3> words to its expected value and stores the corresponding result signal. After incrementing the time delay twenty-two times, the initialization control circuit 508 once again determines the optimum time delay for the command delay ring 506b from among the time delays resulting in successful capture of the CADEL1<0:3> word and develops the control signals 510 to adjust the time delay of the command delay ring 506b to this optimum value. Note that since the command delay ring 506b is selected by the SEL<0:4> word, the command delay ring 506a, along with all other command delay rings 506a–506k and data delay rings 524a–524r, do not respond to the control signals 510. In this way, once the initialization control circuit 508 has determined an optimum time delay for a particular command delay ring 506a–506k or data delay ring 524a–524r, the time delay of that ring is not affected until once again selected by the initialization control circuit 508. Actually, the respective time delays for all the command delay rings 506a–506k and data delay rings 524a–524r may be adjusted by the monitoring circuit 512 during the monitoring mode of operation, as will be described in more detail below.

The initialization control circuit 508 thereafter sequentially increments the SEL<0:4> word to thereby sequentially select each of the command delay rings 506c–506k and determines the respective optimum time delays for each of these delay rings. Once the initialization control circuit 508 has adjusted the time delay for the command delay ring 506k to its optimum value, the initialization control circuit 508 increments the SEL<0:4> word to thereby select the data delay ring 524a. As previously described, each of the data delay rings 524a–524r has a first time delay associated with the corresponding D0DEL<0:17> signal and a second time delay associated with the D1DEL<0:17> signal. The initialization control circuit 508 must, of course, determine the optimum value for each of these time delays.

In operation, the initialization control circuit 508 initially increments the SEL<0:4> word to select the data delay ring 524a. The initialization control circuit 508 thereafter operates identically to the process previously described for each of the command delay rings 506a–506k to determine the optimum value for the first time delay for the D0DEL<0> signal. In other words, the initialization control circuit 508 develops the control signals 510 to sequentially adjust the value for the first time delay of the data delay ring 524a. The shift register 534a thereafter sequentially latches the D0DEL<0> signal output from the data delay ring 524a and applies the latched D0DEL0<0:3> word to the initialization control circuit 508 which, as previously described, compares this word to its expected values and stores the result of this comparison. Once again, after the initialization control circuit 508 has adjusted the first time delay of the data delay ring 524a twenty-two times, the initialization control circuit 508 determines an optimum value for the first time delay and develops the control signals 510 to adjust the first time delay to this optimum value.

At this point, the initialization control circuit 508 sequentially increments the value of the OFFSET<0:3> word to thereby sequentially adjust the second time delay of the data delay ring 524a. As previously described, the second time delay determines the delay of the D1DEL<0> signal relative to the applied DQIN<0> signal. More specifically, the value of the OFFSET<0:10> word adjusts or "offsets" the value of the second time delay of the D1DEL<0> signal relative to the first time delay of the D0DEL<0> signal. In this situation, the initialization control circuit 508 sequentially adjusts the OFFSET<0:3> word to thereby adjust the second time delay relative to the previously determined optimum value for the first time delay. For each value of the OFFSET<0:3> word, the initialization control circuit 508 operates identically to the manner previously described in determining whether the D1DEL<0> signal was successfully latched by the shift register 528a at the particular value of the OFFSET<0:3> word. For example, the initialization control circuit 508 initially applies the OFFSET<0:3> word having the value 0000 to the data delay ring 524a. In response to the applied OFFSET<0:3> word, the data delay ring 524a adjusts the time delay of the D1DEL<0> signal to a first value relative to the previously determined optimum time delay for the D0DEL<0> signal. The shift register 528a thereafter latches the D1DEL<0> signal at this first relative time delay in response to the DCLK1D signal and applies the latched D1DEL0<0:3> word to the initialization control circuit 508. The initialization control circuit 508 compares the latched D1DEL0<0:3> word to its expected value and stores a corresponding result signal indicating the result of this comparison.

At this point, the initialization control circuit 508 increments the value of the OFFSET<0:3> word to thereby adjust the time delay of the D1DEL0<0> signal relative to the previously determined optimum time delay for the D0DEL<0> signal. Once again, the shift register 528a latches the D1DEL<0> signal at this new time delay responsive to the DCLK1D signal, and the initialization control circuit 508 determines whether the latched D1DEL0<0:3> word has its expected value. In one embodiment, the initialization control circuit 508 applies eleven different values of the OFFSET<0:3> word to the data delay ring 524a, causing the data delay ring 524a to adjust the second time delay of the D1DEL<0> signal eleven times. Once the initialization control circuit 508 has stored the result signal determined by comparing the D1DEL0<0:3> word at each of the eleven time delays to its corresponding expected value, the initialization control circuit 508 selects the optimum second time delay for the D1DEL<0> signal from among the time delays resulting in successful capture of the D1DEL<0> signal by the shift register 528a. The initialization control circuit 508 thereafter applies the OFFSET<0:3> word to the data delay ring 524a having a value corresponding to the determined optimum time delay for the D1DEL<0> signal to cause the data delay ring 524a to adjust the second delay time of the D1DEL<0> to the value corresponding to this OFFSET<0:3> word.

The initialization control circuit 508 thereafter increments the SEL<0:4> word to select the data delay ring 524b (not shown) and operates as previously described to adjust the respective time delays for the D0DEL<1> and D1DEL<1> signals output from the data delay ring 524b. The initialization control circuit 508 continues incrementing the SEL<0:4> word and adjusting the respective time delays of the corresponding data delay ring 524a–524r until the respective time delays for the D0DEL<17> and D1DEL<17> signals from the data delay ring 524r have been adjusted. Once the initialization control circuit 508 has adjusted the first and second time delays for the data delay ring 524r to their respective optimum values, the initialization mode is terminated since the time delays for each of the command delay rings 506a–506k and data delay rings 524a–524r have been adjusted to their respective optimum values.

To terminate the initialization mode of operation, the initialization control circuit 508 first sets the value of the SEL<0:4> word to 11111 so that none of the twenty-nine delay rings (eleven command delay rings 506a–506k and eighteen data delay rings 524a–524r is selected. At this point, the initialization control circuit 508 activates the $\overline{\text{ENABLE}}$ signal to thereby activate the monitoring circuit 512. As previously described, the monitoring circuit 512 monitors the data eye of the CCLKM signal and detects shifts in this data eye. When the monitoring circuit 512 detects a shift in the data eye of the CCLKM signal, the monitoring circuit 512 develops the control signals 514 to adjust the respective delay times for each of the command delay rings 506a–506k and data delay rings 524a–524r to compensate for the detected shift.

Figure 6:
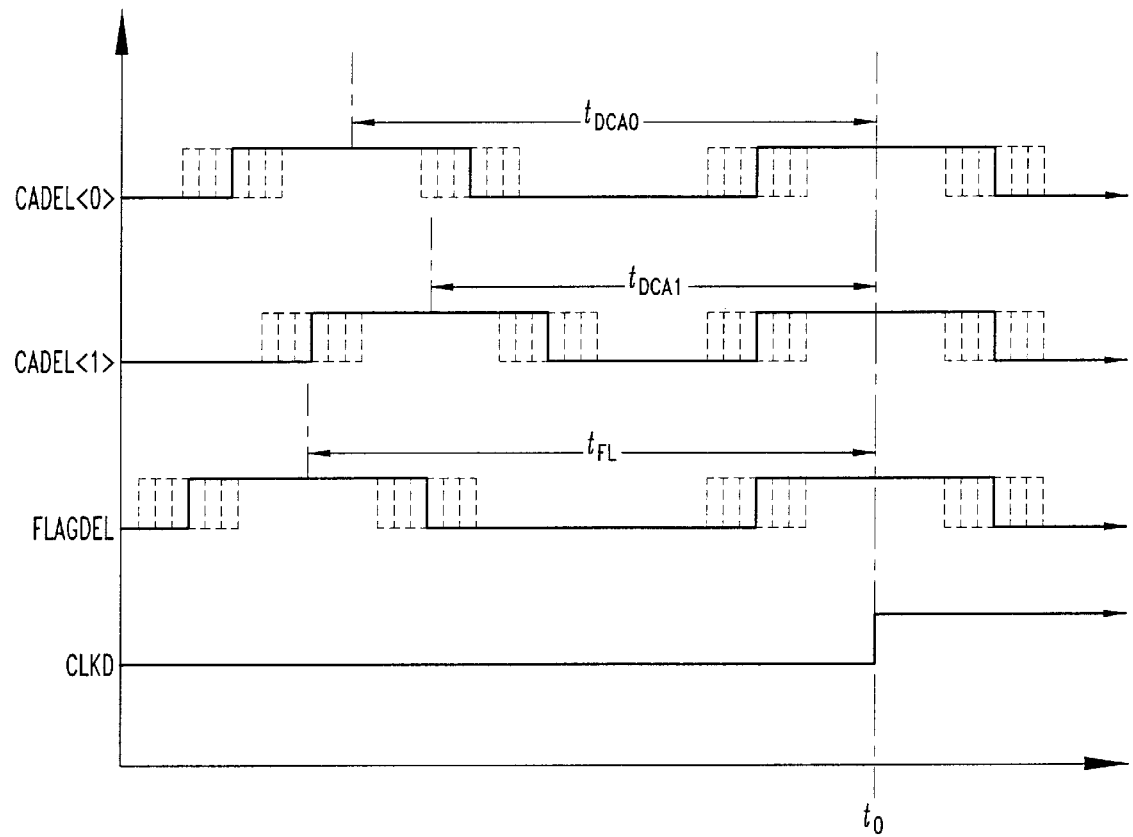
FIG. 6 is a timing diagram illustrating operation of the timing correction circuit of FIG. 5 during an initialization mode of operation.

FIG. 6 is a timing diagram illustrating the operation of the bit-to-bit timing correction circuit 500 in adjusting the respective delay times of the CADEL<0:9> and FLAGDEL signals to center the respective data eyes relative to transitions of the CCLKD signal. In FIG. 6, the CADEL<0>, CADEL<1>, and FLAGDEL signals are illustrated before and after the correction circuit 500 has adjusted the respective delay times $t_{DCA0}$, $t_{DCA1}$, and $t_{DFL}$ of these signals. The signals to the left illustrate the CADEL<0>, CADEL<1>, and FLAGDEL signals before their respective delay times $t_{DCA0}$, $t_{DCA1}$, and $t_{DFL}$ have been adjusted. At this point, prior to delaying the signals CADEL<0>, CADEL<1> and FLAGDEL, a transition of the CCLKD signal at any time would not allow these signals to be successfully captured in the corresponding ones of the shift registers 516a–516k. After the bit-to-bit timing correction circuit 500 has adjusted the respective delay times $t_{DCA0}$, $t_{DCA1}$, and $t_{DFL}$ for the CADEL<0>, CADEL<1>, and FLAGDEL signals, each of these signals has its data eye approximately centered around a transition of the CCLKD signal at a time to as shown in FIG. 5. As a result, each of the CADEL<0>, CADEL<1>, and FLAGDEL signals is successfully captured in the corresponding ones of the shift registers 516a–516k responsive to the CCLKD signal. Although only the CADEL<0:9> and FLAGDEL signals have been discussed with reference to FIG. 6, all the D0DEL<0:17> and D1DEL<0:17> signals similarly have their respective data eyes centered around transitions of the delayed internal clock signals DCLK0D and DCLK1D, respectively.

Figure 7:
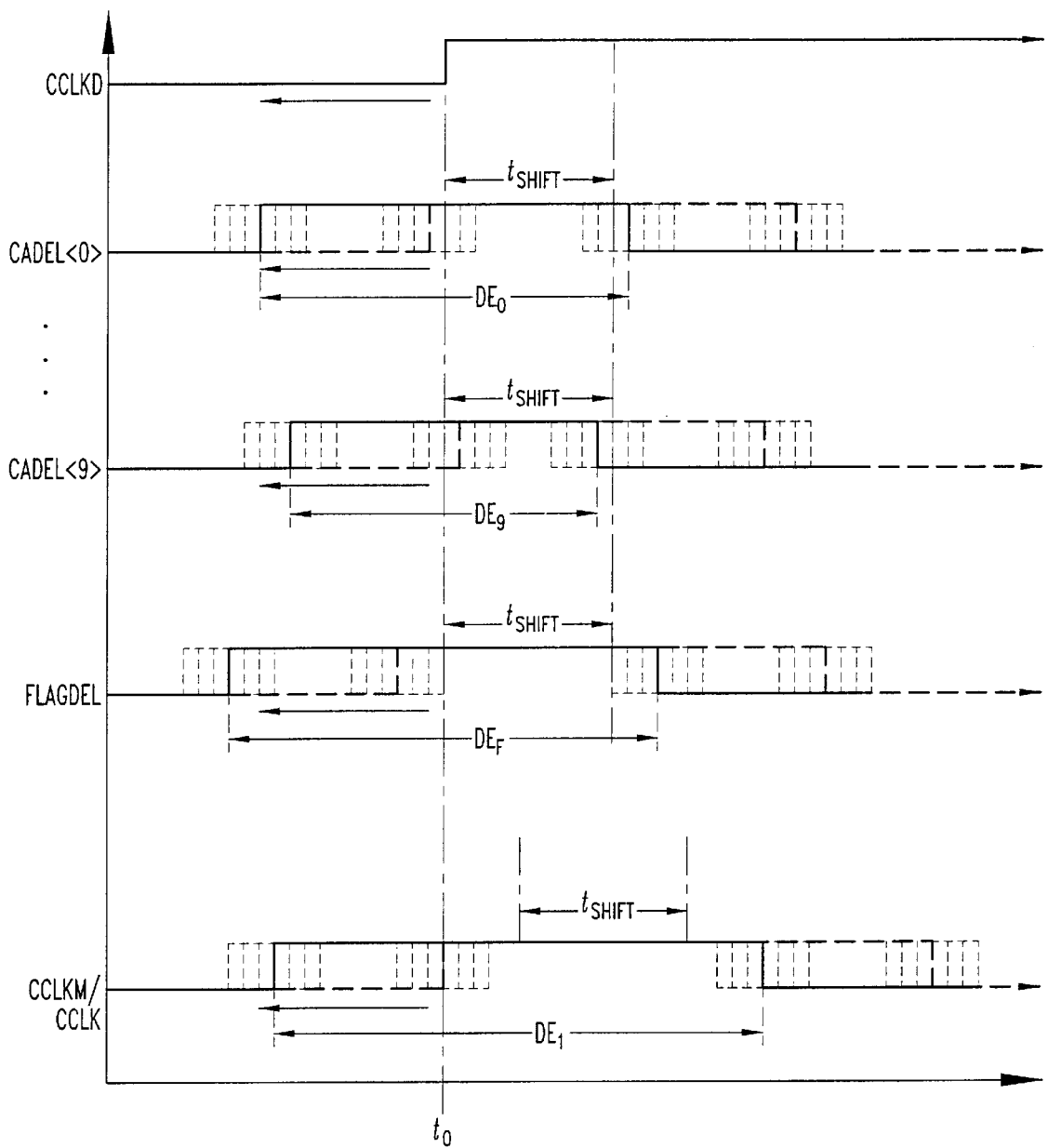
FIG. 7 is a timing diagram illustrating operation of the timing circuit of FIG. 5 during a monitoring mode of operation.

The operation of the monitoring circuit 512 will now be described in more detail with reference to FIG. 7. FIG. 7 is a timing diagram illustrating the operation of the monitoring circuit 512 during the monitoring mode of operation. Initially the CCLKM signal has a data eye $DE_1$ as indicated by the solid line. Also shown are the data eyes $DE_0$, $DE_9$, and $DE_F$ for the CADEL<0>, CADEL<9>, and FLAGDEL signals, respectively after each of these signals has had its associated time delay adjusted by the initialization control circuit 508 during the initialization mode of operation. The CCLKD signal is shown as having a rising-edge transition at a time $t_0$, which occurs in approximately the center of the data eyes $DE_0$, $DE_9$, and $DE_F$. This illustrates the result of the bit-to-bit timing correction circuit 500 after the initialization mode of operation, the initialization control circuit 508 having adjusted the respective delay times for each of the command delay rings 506a–506k such that each transition of the CCLKD signal occurs in approximately the center of the respective data eyes of the CADEL<0:9> and FLAGDEL signals. Although not shown in FIG. 7, the same is true for the delayed data signals D0DEL<0:17> relative to the DCLK0D signal, and the D1DEL<0:17> signals relative to the DCLK1D signal.

In FIG. 7, a shift in the data eye of the CCLKM signal is illustrated by a dotted line and corresponds to the CCLKM signal being shifted by a time $t_{SHFT}$ relative to the initial CCLKM signal. The CCLKM signal corresponds to the CCLK signal applied through the data receiver 542 that is identical to the data receivers 502a–502k receiving the CA<0:9> and FLAG signals, and thus the data eye of the CCLKM signal tracks the data eyes of the CA<0:9> and FLAG signals applied through the data receivers 502a–502k. Any shift in the operating characteristics of the data receiver 542 manifests itself as a shift in the data eye of the CCLKM signal, such shifts in operating characteristics of the data receiver 542 occurring, for example, in response to variations in a supply voltage $V_{DD}$ applied to the data receiver 542, or as a result of temperature variations in the operating environment in which the bit-to-bit timing correction circuit 500 is operating. Because the data receiver 542 is identical to the data receivers 502a–502k receiving the CA<0:9> and FLAG signals, any shifts in the data eye of the CCLKM signal will typically also occur in the CADEL<0:9> and FLAGDEL signals, since these signals are applied through the identical data receivers 502a–502k.

In FIG. 7, the data eye for the CADEL<0>, CADEL<9>, and FLAGDEL signals are shown as having shifted to the right by the same duration $t_{SHFT}$ as the CCLKM signal. In response to this shift, the monitoring circuit 512 adjusts the respective time delays for the command delay rings 506a–506k by the same amount in order to shift the data eyes of the CADEL<0:9> and FLAGDEL signals to the left by the amount $t_{SHFT}$ so that the data eyes for each of these signals is once again centered around the transition of the CCLKD signal at the time $t_0$. In this way, the monitoring circuit 512 detects shifts in the data eye of the CCLKM signal and adjusts the respective time delays for each of the command delay rings 506a–506k by the same amount so that the respective data eyes for the CADEL<0:9> and FLAGDEL signals remain approximately centered around transitions of the CCLKD signal. Although only the CADEL<0:9> and FLAGDEL signals are shown and described with reference to FIG. 7, the monitoring circuit 512 operates in the same way to adjust the respective time delays for each of the data delay rings 524a–524r so that the respective data eyes of the D0DEL<0:17> signals remain centered around transitions of the DCLK0D signal, and the data eyes of the D1DEL<0:17> signals likewise remain centered around transitions of the DCLK1D signal. The bit-to-bit timing correction circuit 500 successfully captures the CA<0:9>, FLAG, and DQ<0:17> signals at very high data transfer rates. Furthermore, the circuit 500 enables very fast recovery from standby modes of operation of the packetized memory device 16a containing the circuit 500. For example, during a power savings mode, the CCLK signal is removed and the memory device 16a goes into a lower power operating mode. In this situation, the delay rings 506a–506k and 524a–524r retain their previously determined time delays. When the CCLK signal is again applied to terminate the power savings mode, the circuit 500 begins capturing applied signals without a significant lag utilizing the previously determined time delays.

Although the timing correction circuit 500 has been described as operating first in the initialization mode and then in the monitoring mode, one skilled in the art will realize operation in these two modes may be varied. For example, in another embodiment of the timing correction circuit 500 the monitoring circuit 512 operates continuously in the monitoring mode to detect shifts in the data eye of the CCLKM signal and adjust the respective time delays of the delay rings 506a–506k and 524a–524r as previously described. In this embodiment, the initialization control circuit 508 operates during the initialization mode to sequentially select the delay rings 506a–506k and 524a–524r and to adjust the time delay of the selected ring to its optimum value as previously described. When one of the delay rings 506a–506k and 524a–524r is selected, it ignores the control signals 510 from the initialization control circuit 508 and operates responsive to the control signals 514 from the monitoring circuit 512, as previously mentioned and as will be discussed in more detail below. Thus, in this embodiment the monitoring circuit 512 continuously controls all delay rings 506a–506k and 524a–524r except the selected delay ring. In another embodiment of the timing correction circuit 500, during the initialization mode the initialization control circuit 508 adjusts the respective time delays of the delayed signals CADEL<0:9>, FLAG, D0DEL<0:17>, and D1DEL<0:17> in parallel instead of sequentially.

Figure 8A:
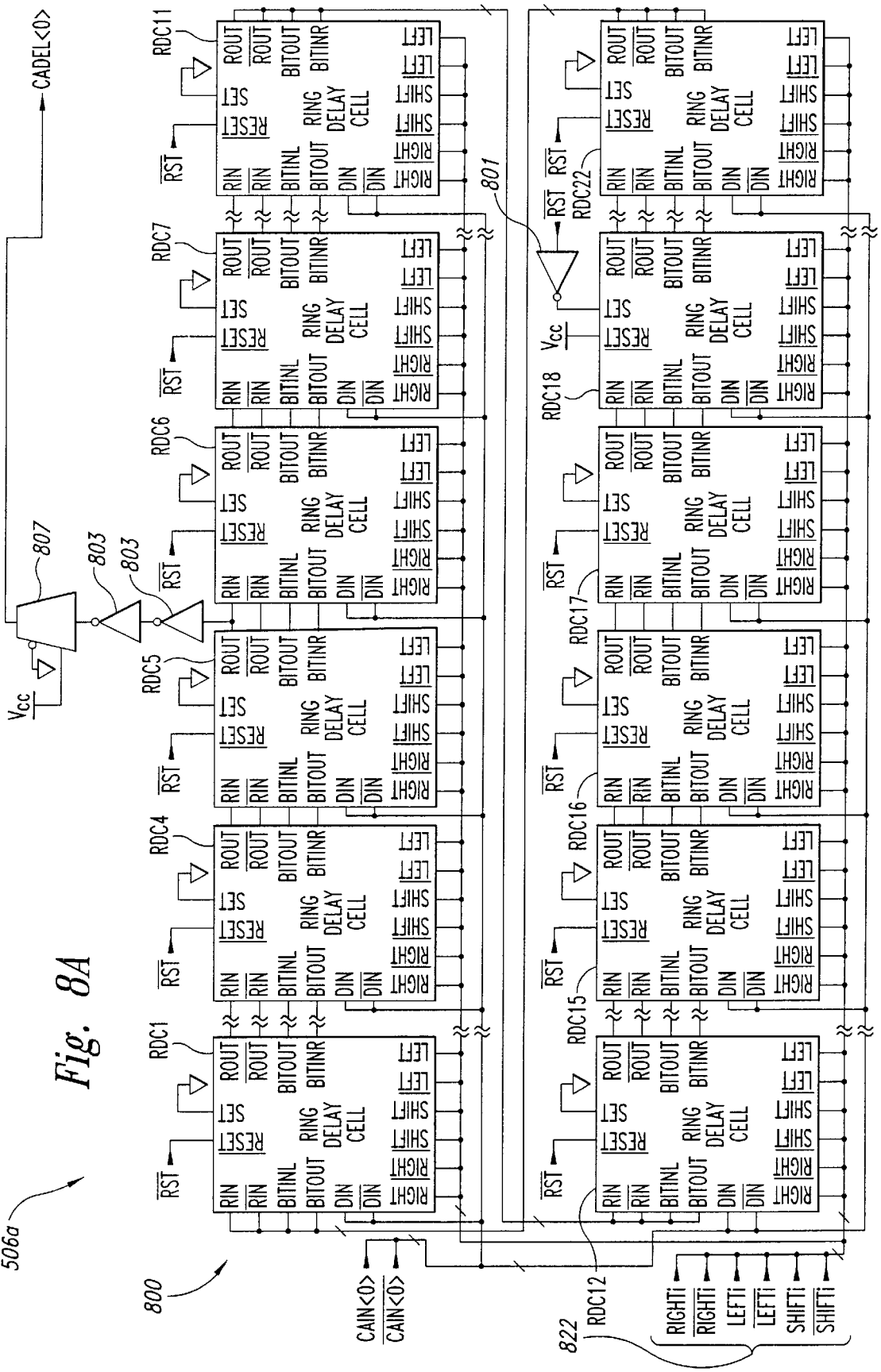
FIGS. 8A and 8B are a schematic of one embodiment of one of the command delay rings of FIG. 5.
Figure 8B:
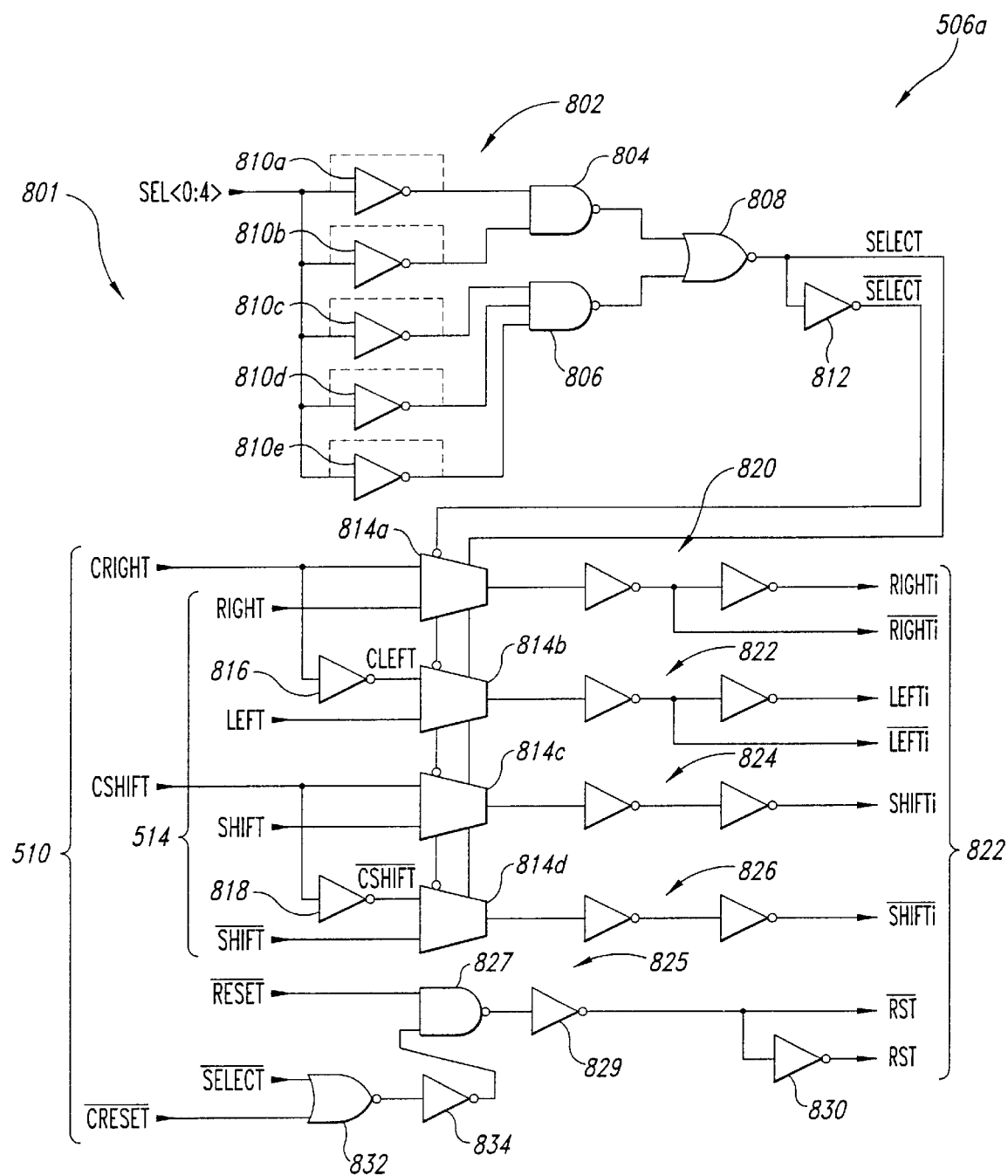

The overall operation of the bit-to-bit timing correction circuit 500 and general operation of several components within that circuit have now been described with reference to FIGS. 5–7. At this point, the operation of several components within the bit-to-bit timing correction circuit 500 will now be described in more detail. FIGS. 8A and 8B are a schematic of one embodiment of the command delay ring 506a of FIG. 5. The command delay rings 506a–506k illustrated in FIG. 5 are identical, and thus, for the sake of brevity, only the command delay ring 506a will be described in more detail with reference to FIGS. 8A and 8B. Referring to FIG. 8A, the command delay ring 506a includes a delay circuit 800 formed by a plurality of ring delay cells RDC1–RDC22 connected to form a delay ring. It should be noted that several of the ring delay cells RDC1–RDC22 have been omitted in FIG. 8A as indicated in order to simplify the Figure. The delay cells RDC1–RDC22 form a ring since outputs from the last ring delay cell RDC22 are applied to inputs of the first ring delay cell RDC1 as shown. In operation, the CAIN<0> and $\overline{\text{CAIN}}$<0> signals are selectively input into one of the ring delay cells RDC1–RDC22 in response to a plurality of control signals 822 to thereby adjust the time delay of the CADEL<0> signal relative to the CAIN<0> signal, as will now be explained in more detail.

Figure 9:
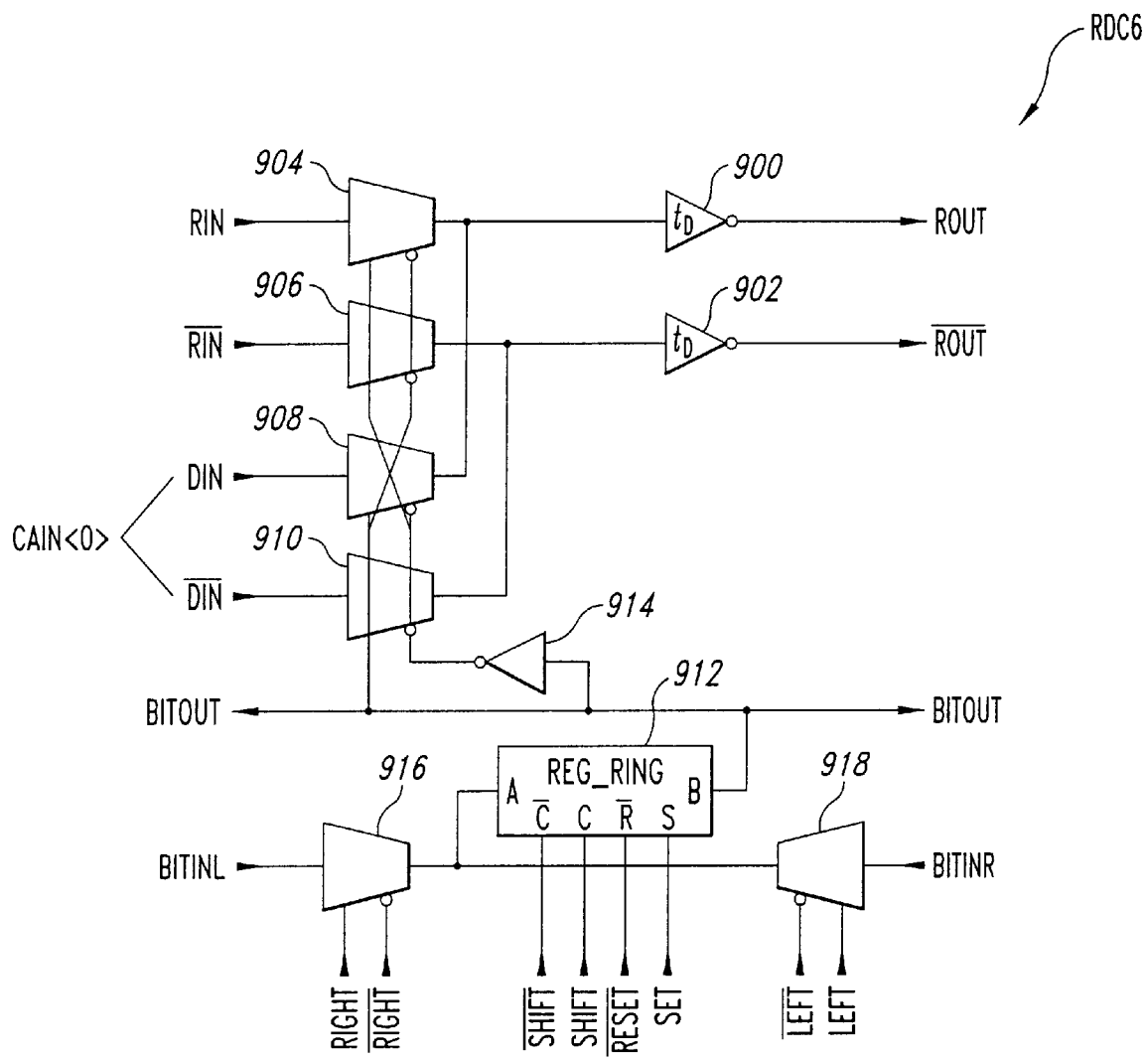
FIG. 9 is a schematic of one embodiment of one of the ring delay cells of FIG. 8A.

Before describing the overall operation of the delay ring 800, a more detailed description of the ring delay cells RDC1–RDC22 will be provided with reference to FIG. 9. FIG. 9 illustrates one embodiment of the ring delay cell RD61 of FIG. 8A, and because all ring delay cells RDC1–RDC22 are identical only the ring delay cell RD61 will be described in more detail with reference to FIG. 9. In operation, the ring delay cell RD61 selects either a first pair of data signals applied on terminals RIN, $\overline{\text{RIN}}$ or a second pair of data signals applied on terminals DIN, $\overline{\text{DIN}}$ responsive to the control signals 822, and generates a complementary pair of delayed data signals on output terminals ROUT, $\overline{\text{ROUT}}$. The delayed output signals have a predetermined delay time relative to the selected one of the first and second data input pairs, as will now be explained in more detail below.

The ring delay cell RDC1 includes a pair of inverters 900 and 902 that function as the delay elements of the ring delay cell, each of the inverters providing a delay time $t_D$. As understood by one skilled in the art, there is a finite time between application of a signal on the input of an inverter and the corresponding transition on the output of the inverter in response to the applied input signal. In one embodiment, the delay time $t_D$ of the inverters 900 and 902 is approximately 100 picoseconds, meaning that in response to a transition on the input of each inverter 900, 902 a transition on the output of the inverter occurs approximately 100 picoseconds after the applied input transition. The outputs of the inverters 900 and 902 develop the delayed data signals on the output terminals ROUT and $\overline{\text{ROUT}}$ signals, respectively. The first pair of data input signals on the terminals RIN, $\overline{\text{RIN}}$ are applied through a pair of transmission or pass gates 904 and 906 to the inverters 900 and 902, respectively. The second pair of data input signals applied on the terminals DIN, $\overline{\text{DIN}}$ are also applied through a pair of pass gates 908 and 910 to the inverters 900 and 902, respectively. A register 912 outputs a data output bit select signal BITOUT, and this BITOUT signal is applied directly and through an inverter 914 to alternately enable either the pass gates 904 and 906 or the pass gates 908 and 910. When the output BITOUT signal is high, the pass gates 908 and 910 are activated and the data input signals on the terminals DIN, $\overline{\text{DIN}}$ are applied to the inverters 900 and 902. In contrast, when the BITOUT signal is low, the pass gates 904 and 906 are activated and the data input signals on the terminals RIN, $\overline{\text{RIN}}$ are applied to the inverters 900 and 902. In this way, the value of the BITOUT signal selects which one of first data input signals on terminals RIN, $\overline{\text{RIN}}$ or second data input signals on terminals DIN, $\overline{\text{DIN}}$ is applied to the inverters 900, 902 to generate the delayed data signals on the terminals ROUT, $\overline{\text{ROUT}}$. In other words, the BITOUT signal determines whether the first bit terminals RIN, $\overline{\text{RIN}}$ or second bit on terminals DIN, $\overline{\text{DIN}}$ is output from the ring delay cell RDC6. The BITOUT signal is also applied to adjacent ring delay cells (not shown in FIG. 9), as will be described in more detail below.

A pass gate 916 applies a bit input left BITINL signal to the input of the register 912 when complementary right control signals RIGHT, $\overline{\text{RIGHT}}$ applied on respective control terminals are active, and a pass gate 918 applies a bit input right BITINR signal to the input of the register 912 when complementary left control signals LEFT, $\overline{\text{LEFT}}$ applied on respective control terminals are active. The register 912 is clocked by a pair of complementary shift signals SHIFT, $\overline{\text{SHIFT}}$, and also receives a set signal SET and reset signal $\overline{\text{RESET}}$ on respective set and reset inputs as shown. When the $\overline{\text{RESET}}$ goes active low, the register 912 latches the BITOUT signal low, and when the SET signal goes active high the register 912 latches the BITOUT signal high.

In operation, the ring delay cell RDC1 operates in one of three modes, a shift left mode, a shift right mode, and a pass-through mode. The pass-through mode is characterized by the BITOUT signal from the register 912 being low, which deactivates the pass gates 908 and 910 and activates the pass gates 904 and 906. When the pass gates 904 and 906 are activated, the first data input signals on terminals RIN, $\overline{\text{RIN}}$ signals are applied through the respective inverters 900 and 902 to generate the ROUT, $\overline{\text{ROUT}}$ signals having the delay time $t_D$ relative to the RIN, $\overline{\text{RIN}}$ signals. During the pass-through mode, the DIN, $\overline{\text{DIN}}$ signals are isolated by the turned OFF pass gates 908 and 910 and do not affect operation of the ring delay cell RDC1.

During the shift left mode of operation, the value of the BITOUT signal of the ring delay cell to the right of the ring delay cell RDC6, which is the ring delay cell RDC7 in this case, is shifted through the register 912 and output as the BITOOUT signal of the ring delay cell RDC6, as will now be explained in more detail. First, assume the BITOUT signal from the adjacent ring delay cell RDC7 is high. As seen from FIG. 8A, the BITOUT signal from the adjacent ring delay cell RDC7 is applied as the BITINR signal of the ring delay cell RDC6, and thus the BITINR signal applied to the ring delay cell RDC6 is high. To commence the shift left mode of operation, the LEFT and $\overline{\text{LEFT}}$ signals are activated, turning ON the pass gate 918 and applying the high BITINR signal to the input of the register 912. The SHIFT and $\overline{\text{SHIFT}}$ signals thereafter clock the register 912 shifting the high signal applied on its input to its output as the high BITOUT signal. In this way, during the shift left mode of operation, the value of the BITOUT signal of the adjacent ring delay cell RDC7 is shifted into the ring delay cell RDC6. As will be explained in more detail below, the shift left mode of operation shifts the input tap of the delay circuit 800 to the left by one delay cell, where the input tap is the one of the delay cells that applies the signals on terminals DIN, $\overline{\text{DIN}}$ to generate the delayed data signals on terminals ROUT, $\overline{\text{ROUT}}$.

During the shift right mode of operation, the ring delay cell RDC6 operates in substantially the same manner as previously described for the shift left mode except that the value of the BITOUT signal output from the ring delay cell adjacent the ring delay cell RDC6 to its left, which is the ring delay cell RDC5 in this case, is shifted into the ring delay RDC6. First, assume the BITOUT signal from the adjacent ring delay cell RDC5 is high. To commence the shift right mode of operation, the RIGHT, $\overline{\text{RIGHT}}$ signals are activated turning ON the pass gate 916. When the pass gate 916 is turned ON, the BITINL signal is applied to the input of the register 912. As seen in FIG. 8A, the BITOUT signal from the ring delay cell RDC5 is applied as the BITINL signal to the ring delay cell RDC6. Thus, the BITINL signal is high, and this high signal is applied to the input of the register 912. The register 912 is thereafter clocked by the SHIFT, $\overline{\text{SHIFT}}$ signals, shifting the high BITINL signal on its input to its output as the high BITOUT signal from the ring delay cell RDC6. In this way, during the shift right mode of operation, the value of the BITOUT signal of the ring delay cell RDC5 is shifted to the right as the BITOUT signal of the ring delay cell RDC6. As will be discussed below, the shift right mode shifts the input tap of the delay circuit 800 to the right by one delay cell.

Returning now to FIG. 8A, the overall operation of the delay circuit 800 will now be described in more detail. In operation, the $\overline{\text{RST}}$ signal applied to each of the ring delay cells RDC1–RDC22 is initially activated, resetting each of the ring delay cells RDC1–RDC17 and RDC19–RDC22. As previously described with reference to FIG. 9, when each of the ring delay cells RDC1–RDC22 is reset the ring delay cell isolates its DIN, $\overline{\text{DIN}}$ terminals and outputs the delayed data signals on its output terminals ROUT, $\overline{\text{ROUT}}$ responsive to the data input signals on the terminals RIN, $\overline{\text{RIN}}$. Referring to the ring delay cell RDC18, note that the $\overline{\text{RST}}$ signal is applied through an inverter 801 to the set input of the ring delay cell RDC18. As a result, when the $\overline{\text{RST}}$ signal goes active low, the SET input goes active high setting the ring delay cell RDC18. As previously described with reference to FIG. 9, when the ring delay cell RDC18 is set, it latches its BITOUT signal so that it delays the CAIN<0>, $\overline{\text{CAIN}}$<0> applied on its terminals DIN, $\overline{\text{DIN}}$ and applies these delayed data signals on its output terminals ROUT, $\overline{\text{ROUT}}$. In this way, when the $\overline{\text{RST}}$ signal goes active low, the delay cell RDC18 becomes the input tap of the delay circuit 800.

At this point, when the CAIN<0> signal is applied to the delay circuit 800, this signal is input to the ring delay cell RDC18, and thereafter propagates out of the delay cell RDC18 on the terminals ROUT, $\overline{\text{ROUT}}$ and then through the ring delay cells RDC22, RDC1, RDC2, RDC3, RDC4 and so on. As the CAIN<0> signal propagates through these series connected ring delay cells, the delay time of this signal is increased by the delay time $t_D$ of each ring delay cell. For example, when the CAIN<0> signal is input to the ring delay cell RDC18, this signal has been delayed by a total delay time $10t_D$ when it reaches the output terminals ROUT, $\overline{\text{ROUT}}$ of the ring delay cell RDC5 (i.e., the respective delay times $t_D$ of ring delays cells RDC18, RDC19–RDC21 (not shown), RDC22, RDC1, RDC2–RDC3 (not shown), and RDC4–RDC5). The output terminal ROUT from the ring delay cell RDC5 is the fixed output tap of the delay circuit 800, and is applied through series connected inverters 803 and 805 and an enabled pass gate 807 to develop the CADEL<0> signal from the command delay ring 506*a*.

The control signals 822 are thereafter applied to the ring delay cells RDC1–RDC22 to shift the input tap of the delay circuit 800 and thereby adjust the delay time of the CADEL<0> signal relative to the CAIN<0> signal. During the initialization mode of operation, the control signals 822 are generated in response to the control signals 510 from the initialization control circuit 508 (FIG. 5) to sequentially shift the input tap of the delay 800 to the left by one ring delay cell RDC1–RDC22 and thereby adjust the delay time of the CADEL<0> signal relative to the CAIN<0> signal. For example, after the initialization control circuit 508 has determined whether the CADEL<0> has been captured by the corresponding shift register 516*a* (FIG. 5) at the total time delay $10t_D$, which is the time delay of the CADEL<0> signal immediately after the delay circuit 800 has been reset, the initialization control circuit 508 applies the control signals 822 to cause the ring delay cells RDC1–RDC22 to operate in the shift left mode of operation as previously described with reference to FIG. 9. As a result, the high BITOUT signal from the ring delay cell RDC18 is shifted into the ring delay cell RDC17, and this delay cell now operates as the input tap of the delay circuit 800. In other words, the CAIN<0> signal is now input into the ring delay cell RDC17 instead of the ring delay cell RDC18. Thus, the total delay time of the CADEL<0> signal is now increased by the respective delay time $t_D$ of the ring delay cell RDC17. Thus, the total delay time of the CADEL<0> signal relative to the CAIN<0> signal is now a $11t_D$. During the initialization mode of operation, the initialization control circuit 508 continues shifting the input tap of the delay circuit 800 to the left until it has determined whether the CADEL<0> is successfully captured at each of the respective total delay times corresponding to each input tap. Once all input taps have been selected, the initialization control circuit 508 causes the control circuits 822 to shift the input tap to its optimum location such that the total delay time of the CADEL<0> signal has its optimum value as previously described.

During the monitoring mode of operation, the monitoring circuit 512 controls the control signals 822 to shift the input tap of the delay circuit 800 either to the left or to the right and thereby adjust the total delay time of the delay circuit 800 as required. Thus, for example, when the monitoring circuit 512 determines the delay time of the CADEL<0> signal should be increased, the input tap of the delay circuit 800 is shifted to the left by the required number of taps. For example, if the ring delay cell RDC17 corresponds to the input tap of the delay circuit 800 and the monitoring circuit 512 determines the delay time of the CADEL<0> signal must be increased by $2t_D$, the monitoring circuit 512 develops the control signals 822 to cause the input tap to be shifted from the ring delay cell RDC17 to the delay cell RDC15 to thereby increase the delay time of the CADEL<0> signal by the required amount $2t_D$.

Referring to FIG. 8B, the command delay ring 506*a* includes address decode and multiplexing circuitry 801 that controls whether the control signals 510 from the initialization control circuit 508 (FIG. 5) or the control signals 514 from the monitoring circuit 512 (FIG. 5) are utilized to generate the control signals 822 that are applied to control the delay circuitry 800 of the command delay ring 506*a* as previously described with reference to FIG. 8A. The circuitry 801 includes address circuitry 802 that encodes a particular selection address for the command delay ring 506a corresponding to a particular value of the SEL<0:4> word, and decodes this encoded address to determine when the command delay ring 506a has been selected. More specifically, each bit of the SEL<0:4> word is applied through a corresponding inverter 810a–810e to an input of either a NAND gate 804 or a NAND gate 806 as shown. Each of the inverters 810a–810e is selectively bypassed, as indicated by the dotted lines, to encode the selection address corresponding to a particular value of the SEL<0:4> word. As previously discussed with reference to FIG. 5, the command delay ring 506a has the selection address 00000 for the SEL<0:4> word. In this situation, none of the inverters 810a–810e is bypassed so that when the SEL<0:4> word having the value 00000 is applied, each of the inverters 810a–810e drives its corresponding output high. When all outputs from the inverters 810a–810e are high, all high inputs are applied to the NAND gates 804 and 806 causing both the NAND gates to drive their respective outputs low. When both outputs from the NAND gates 804 and 806 go low, a NOR gate 808 drives its output high generating an active high select signal SELECT, and the SELECT signal is also applied through an inverter 812 to generate a complementary select signal $\overline{\text{SELECT}}$. Thus, when the SEL<0:4> word having the value 00000 is applied to the command delay ring 506a, the NOR gate 808 drives its output high activating the SELECT, $\overline{\text{SELECT}}$ signals to thereby signal the command delay ring 506a has been selected by the initialization control circuit 508 (FIG. 5).

The SELECT and $\overline{\text{SELECT}}$ signals are applied to respective address terminals of a group of multiplexers 814a–814d. Each of the multiplexers 814a–814d includes first and second inputs, and couples either its first input or its second input to an output responsive to the applied SELECT, $\overline{\text{SELECT}}$ signals. The multiplexers 814a and 814c receive a control right CRIGHT and control shift CSHIFT signal on respective first inputs. The CRIGHT and CSHIFT signals are included in the control signals 510 generated by the initialization control circuit 508 (FIG. 5) during the initialization mode of operation as previously described. The CRIGHT signal is applied through an inverter 816 to generate a CLEFT signal that is applied to the first input of the multiplexer 814b and the CSHIFT signal is applied through an inverted 818 to generate a $\overline{\text{CSHIFT}}$ signal that is applied to a first input of the multiplexer 814d. Similarly, the multiplexers 814a–814d receive a shift right signal RIGHT, a shift left signal LEFT, and complementary shift signals SHIFT and $\overline{\text{SHIFT}}$ on respective second inputs as shown. The RIGHT, LEFT, SHIFT, and $\overline{\text{SHIFT}}$ signals are included in the control signals 514 generated by the monitoring circuit 512 (FIG. 5) during the monitoring mode of operation as previously described. In operation, when the SELECT and $\overline{\text{SELECT}}$ signals are active high and low, which occurs when the SEL<0:4> word has the value 00000 corresponding to the selected address of the command delay ring 506a, the multiplexers 814a–814d apply the CRIGHT, CLEFT, CSHIFT, and $\overline{\text{CSHIFT}}$ on other outputs, respectively. These signals on the outputs of the multiplexers 814a–814d are then applied through series-connected inverter pairs 820–826, respectively, to generate the control signals 822 that are applied to control each of the ring delay cells RDC1–RDC22 as previously described with reference to FIG. 8A.

The circuitry 801 also includes a reset circuit 824 that generates a complementary pair of reset signals RST and $\overline{\text{RST}}$. More specifically, a NAND gate 827 receives a system reset signal $\overline{\text{RESET}}$ that is generated by circuitry (not shown) in the packetized memory device 16a containing the command delay ring 506a. The $\overline{\text{RESET}}$ signal may go active low, for example, upon reset of the packetized memory device 16a or during power up of the memory device. When the $\overline{\text{RESET}}$ signal goes active low, the NAND gate 827 drives its output high and this high output is applied through a first inverter 829 to generate the $\overline{\text{RST}}$ signal and through a second inverter 830 to generate the RST signal. A NOR gate 832 applies its output through an inverter 834 to a second input of the NAND gate 827. The NOR gate 832 is enabled by the $\overline{\text{SELECT}}$ signal going active low, which occurs when the initialization control circuit 508 (FIG. 5) has selected the command delay ring 506a, as previously described. When the NOR gate 832 is enabled and the initialization control circuit 508 activates the $\overline{\text{RESET}}$ signal, the NOR gate 832 drives its output high, causing the inverter 834 to drive its output low. As previously described, when either input of the NAND gate 826 goes low, the NAND gate drives its output high activating the RST, $\overline{\text{RST}}$ signals to thereby reset the ring delay cells RDC1–RDC22.

Figure 10B:
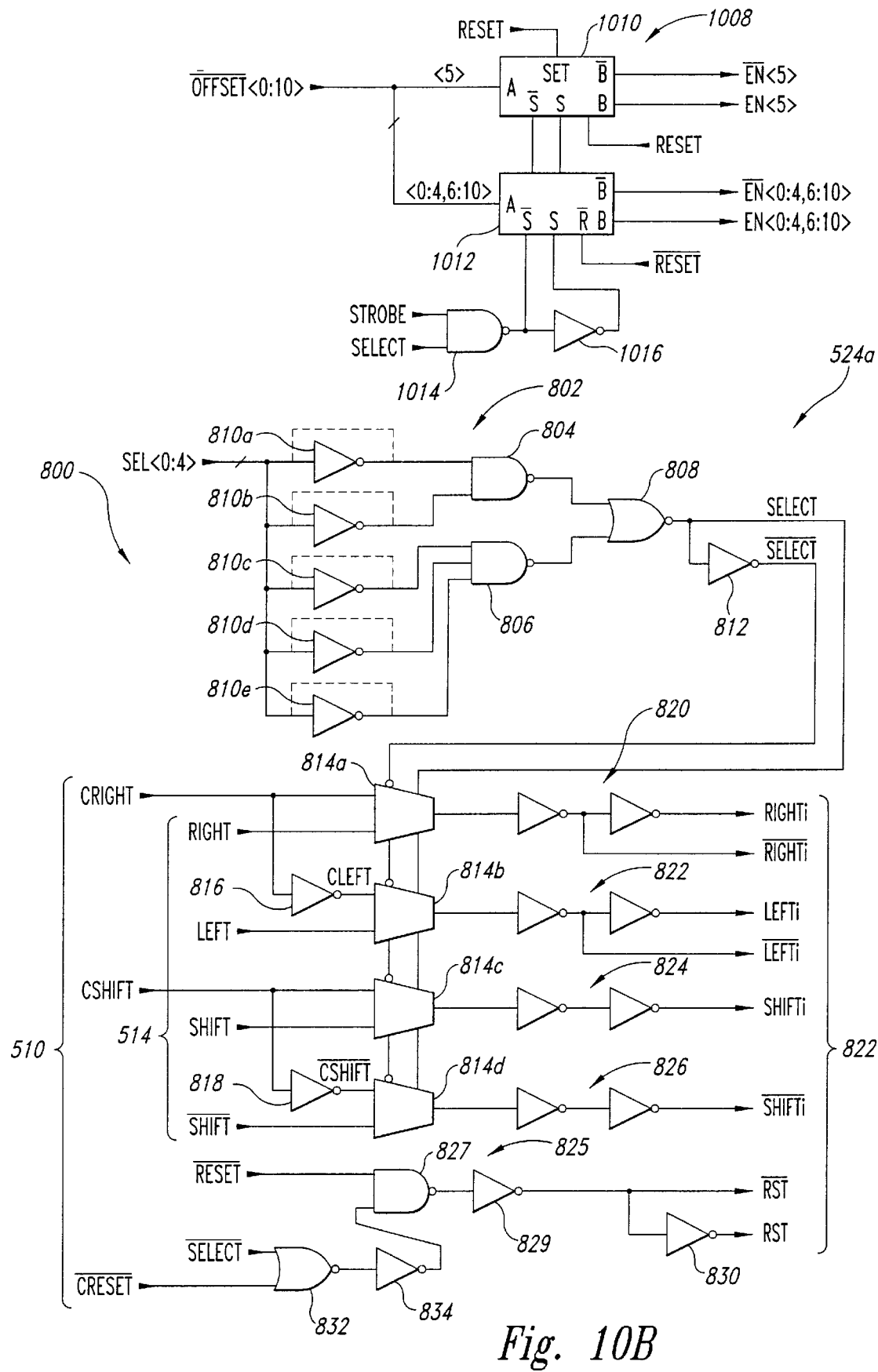

FIGS. 10A and 10B are a schematic of one embodiment of the data delay ring 524a of FIG. 5. Each of the data delay rings 524a–524r is identical, and thus, for the sake of brevity, only the data delay ring 524a will be described in more detail with reference to FIGS. 10A and 10B. In addition, the data delay ring 524a includes a number of components that are identical to corresponding components previously described for the command delay ring 506a with reference to FIGS. 8A and 8B. These identical components have been given the same reference numbers as in FIGS. 8A and 8B, and, for the sake of brevity will not be described in further detail. Referring to FIG. 10A, the delay circuit 1000 is identical to that previously described with reference to FIG. 8A except for the inclusion of a plurality of output taps 1000a–1000k that are utilized in adjusting the delay time of the D1DEL<0> signal, as will now be described in more detail. Each of the output taps 1000a–1000k includes a corresponding pair of series connected inverters 1002a–1002k and a corresponding pass gate 1004a–1004k coupled between selected outputs from the ring delay cells RDC1–RDC22 and an output node 1006 as shown. The pass gates 1004a–1004k receive respective complementary pairs of enable signals from an enable word EN<0:10> an a complementary enable word $\overline{\text{EN}}$<0:10>. Only one of the pass gates 1004a–1004k is enabled at a time so that only a single output tap 1000a–1000k is coupled to the output node 1006 to develop the D1DEL<0> signal.

Referring to Figure 10B, an offset circuit 1008 generates the EN<0:10> and $\overline{\text{EN}}$<0:10> words in response to the applied $\overline{\text{OFFSET}}$<0:10> word generated by the initialization control circuit 508 (FIG. 5). More specifically, respective bits of the $\overline{\text{OFFSET}}$<0:10> word are shifted through a pair of register 1010 and 1012 as shown. A NAND gate 1014 has its output applied directly and through an inverter 1016 to clock the registers 1010 and 1012 in response to a strobe signal STROBE and the SELECT signal applied on respective inputs.

In operation, during the initialization mode of operation, the initialization control circuit 508 (FIG. 5) first determines the optimum delay time for the D0DEL<0> signal as previously described. After this optimum time delay for the D0DEL<0> signal has been determined, the initialization control circuit 508 increments the $\overline{\text{OFFSET}}$<0:10> word to adjust the delay time of the D1DEL<0> signal relative to the determined optimum delay time for the D0DEL<0>, as will now be described in more detail. The $\overline{\text{OFFSET}}$<0:10> word having a first value is applied to the registers 1010 and 1012, and the control circuit 508 then drives the STROBE signal active high causing the NAND gate 1014 to clock the registers 1010 and 1012, thereby shifting the applied $\overline{\text{OFFSET}}$<0:10> word into these registers. It should be noted that the NAND gate 1014 is enabled by the high SELECT signal when the data delay ring 524a has been selected, as previously described. At this point, one of the pass gates 1004a–1004k turns ON applying the output from the corresponding ring delay cell RDC1–RDC10 or RDC22 on the output node 1006 as the D1DEL<0> signal. The control circuit 508 (FIG. 5) thereafter determines whether the D1DEL<0> signal is successfully captured at the delay time corresponding to the selected tap. Once the control circuit 508 has made this determination, it increments the value of the $\overline{\text{OFFSET}}$<0:10> word and again toggles the STROBE signal shifting this new $\overline{\text{OFFSET}}$<0:10> word into the registers 1010 and 1012. In response to the new $\overline{\text{OFFSET}}$<0:10> word output from the registers 1010 and 1012, a next one of the pass gates 1004a–1004k turns ON, coupling a different output tap to the output node 1006. Once again, the control circuit 508 determines whether the D1DEL<0> signal is successfully captured at the delay time corresponding to the new selected output tap. The control circuit 508 repeats this process until all output taps 1000a–1000k have been selected and thereafter determines the optimum output tap. The control circuit 508 then applies the $\overline{\text{OFFSET}}$<0:10> word having the value corresponding to the optimum output tap to the registers 1010 and 1012 and toggles the STROBE signal to strobe that value into the registers 1010 and 1012 thereby turning ON the pass gate 1000a–1000k corresponding to the optimum tap. By utilizing the delay ring 524a as shown in FIGS. 10A and 10B, two data delay rings are not required for each data signal DQ<0:17>. One skilled in the art will realize, however, that two separate data delay rings could be utilized with the respective outputs of the two data delay rings being latched by respective internal clock signals generated responsive to the two externally applied data clock signals DCLK0 and DCLK1.

Figure 11:
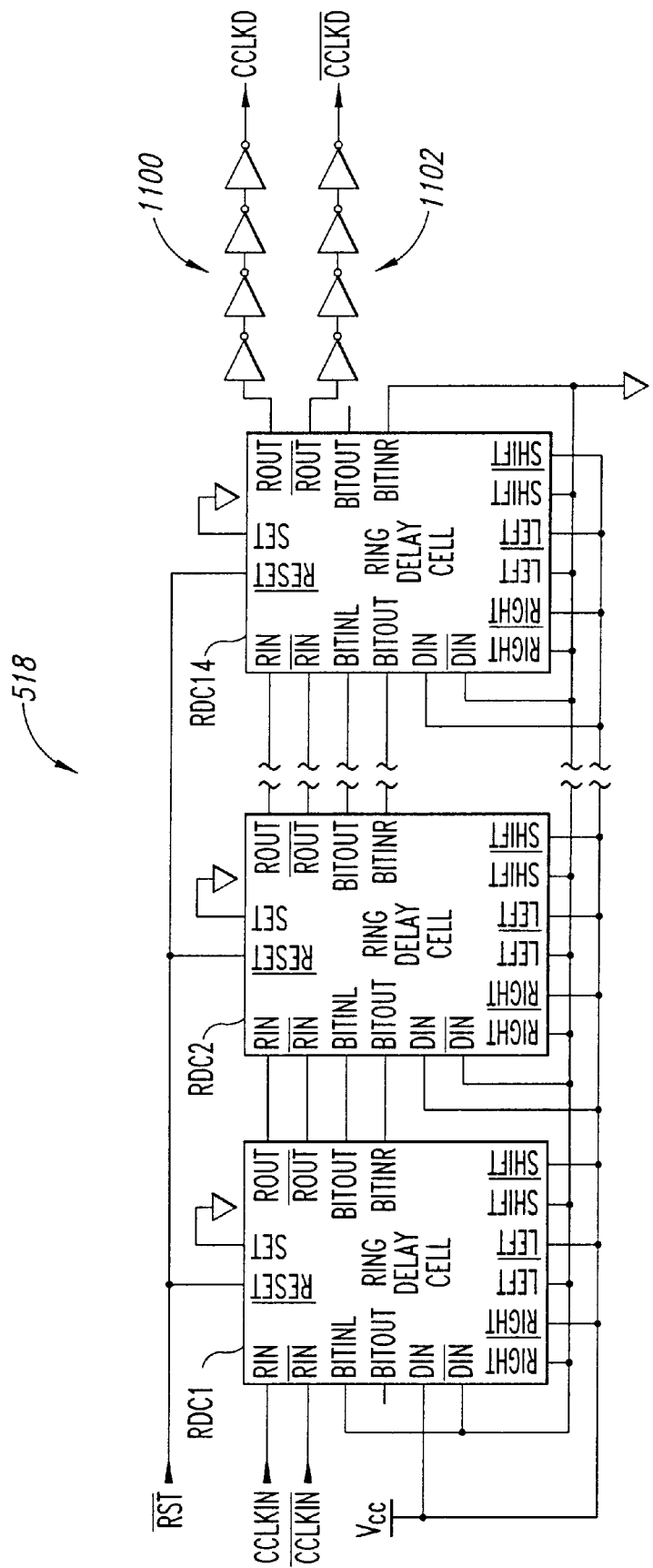
FIG. 11 is a schematic of one embodiment of one of the delay circuits of FIG. 5.

FIG. 11 is a schematic of one embodiment of the delay circuit 518 of FIG. 5 that generates the CCLKD signal as previously described. Each of the delay circuits 518, 530, and 538 of FIG. 5 may be identical, and thus, for the sake of brevity, only the delay circuit 518 will be described in more detail with reference to FIG. 11. The delay circuit 518 includes a plurality of ring delay cells RDC1–RDC14 having their input terminals RIN, $\overline{\text{RIN}}$ and output terminals ROUT, $\overline{\text{ROUT}}$ connected in series as shown, and each having its corresponding signal terminals coupled to either a supply voltage source $V_{CC}$ or ground as shown. Referring back to FIG. 9, it is seen that when each of the ring delay cells RDC1–RDC14 has its control terminals coupled as shown, each ring delay cell applies the signals placed on its input terminals RIN, $\overline{\text{RIN}}$ through the corresponding inverters 900 and 902 to generate a delayed data signal on its output terminals ROUT, $\overline{\text{ROUT}}$ having the delay time $t_D$ relative to the applied input signal. In operation, the CCLKIN, $\overline{\text{CCLKIN}}$ signals applied to the ring delay cell RDC1 are delayed by the delay time $t_D$ as they propagate through each of the series connected ring delay cells RDC1–RDC14, and a delayed clock signal is developed on the output terminals ROUT, $\overline{\text{ROUT}}$ having the total delay time $14t_D$ relative to the CCLKIN, $\overline{\text{CCLKIN}}$ signal. This delayed clock signal on the output terminals ROUT, $\overline{\text{ROUT}}$ of the ring delay cell RDC14 is applied through two sets of series connected inverters 1100 and 1102 to generate the delayed clock signals CCLKD and $\overline{\text{CCLKD}}$ signals, respectively.

Figure 12:
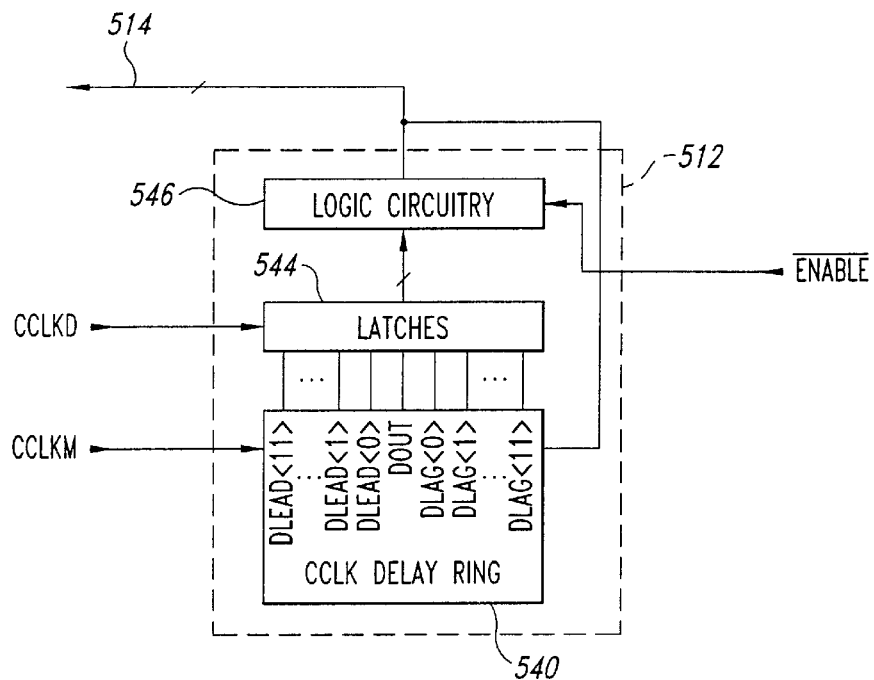
FIG. 12 is a functional block diagram of one embodiment of the monitoring circuit of FIG. 5.

FIG. 12 is a functional block diagram of one embodiment of the monitoring circuit 512 of FIG. 5 which, as previously described, operates during the monitoring mode to adjust the delay time delays of all delay rings 506a–506k and 524a–524r responsive to shifts in the data eye of the CCLKM signal. The monitoring circuit 512 includes a command clock delay ring 540 that receives the CCLKM signal from the data receiver 542 that is identical to the data receivers 502a–502k and 522a–522r receiving corresponding ones of the CA<0:9>, FLAG, and DQ<0:17> signals. By utilizing the data receiver 542 that is identical to the data receivers 502a–502k, 522a–522r, the CCLKM signal developed by the data receiver 542 will experience the same variations as the data signals output from these other data receivers during operation of the packetized memory device 16a containing the bit-to-bit timing correction circuit 500. For example, as the operating temperature of the packetized memory device 16a containing the timing correction circuit 500 varies, the operating characteristics of the data receivers 502a–502k and 522a–522r may likewise vary, resulting in variations of the respective data eyes of the signals developed by these data receivers. In this situation, the CCLKM signal developed by the data receiver 542 will also experience the same variations since the data receiver 542 is identical to the data receivers 502a–502k and 522a–522r.

The delay ring 540 transfers the CCLKM signal through N series-connected delay stages each having a predetermined time delay $t_d$. The delay ring 540 outputs N sample signals on respective taps DOUT, DLEAD<0:11> and DLAG<0:11>, each sample signal corresponding to the output from the associated delay stage. For example, the sample signal at tap DLAG<0> corresponds to the CCLKM signal delayed by the time delay of one delay stage relative to the signal on the center tap DOUT, and the sample signal on the tap DLAG<1> corresponds to the CCLKM signal delayed by the delay time of two delay stages relative to the signal on the center tap DOUT, and so on, with the signals on the taps DLEAD<0:11> leading the signal on the center tap DOUT successive delay times $t_d$. The sample signals from the taps are latched by a plurality of latches 544 in response to the CCLKD signal. As will be understood by one skilled in the art, the delay ring 540 and latches 544 operate in combination to oversample the CCLKM signal. In other words, each of the sample signals on the taps DOUT, DLAG<0:11> and DLEAD<0:11> represents the value of the CCLKM signal at a predetermined delay time relative to the other sample signals. For example, the sample signal on the tap DLEAD<11> corresponds to the value of the CCLKM signal N delay times before the value of the sample signal from the tap DLAG<11>. For example, if each delay stage presents a time delay $t_d$, the sample signals from the taps DOUT, DLEAD<0:11>, and DLAG<0:11> represent N values of the CCLKM signal, one sample value every time $t_d$, over the total time interval $N \times t_d$. In response to the latched sample signals output from the latches 544, logic circuitry 546 in the monitoring circuit 512 monitors the data eye of the CCLKM signal and detects shifts in this data eye. When the logic circuitry 546 detects a shift in the data eye of the CCLKM signal, the logic circuitry 546 applies the control signals 514 to the command delay rings 506a–506k and data delay rings 524a–524r to shift the respective time delays of each of these rings by a predetermined amount, as previously explained.

Figure 13:
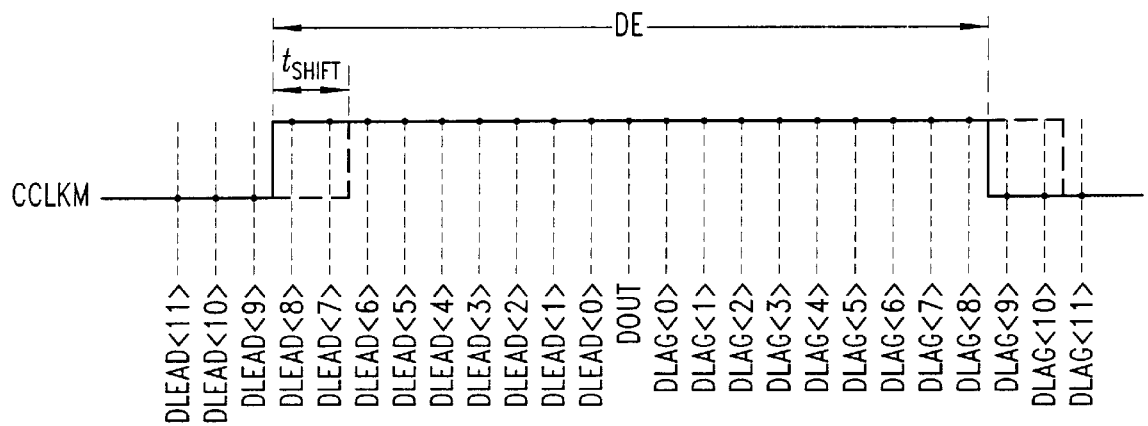
FIG. 13 is a timing diagram illustrating operation of the monitoring circuit of FIG. 12.

The operation of the monitoring circuit 512 will now be described in more detail with reference to FIG. 13 which is a timing diagram illustrating a sample data eye DE of the CCLKM signal. In the example of FIG. 13, the values for each of the sample signals from the taps DOUT, DLEAD<0:11> and DLAG<0:11> that are latched by the latches 544 in response to a particular transition of the CCLKD signal are represented by circles on the CCLKM signal. In the example of FIG. 6, the data eye DE of the CCLKM signal is initially centered around the center tap DOUT of the delay ring 540. In other words, the transitions of the CCLKM signal on both sides of the center tap DOUT are equidistant from that tap. More specifically, to the left of the center tap DOUT, the nine signals from taps DLEAD<0:8> are all high and the three signals from taps DLEAD<9:11> are low. Similarly, to the right of the center tap DOUT, the nine signals from taps DLAG<0:8> are all high and the three signals from taps DLAG<9:11> are low. Thus, the rising-edge transition of the CCLKM signal to the left of the center tap DOUT occurs between the taps DLEAD<8> and DLEAD<9> which corresponds to the ninth and tenth signals to the left of the center tap DOUT. Similarly, the falling-edge transition of the CCLKM signal occurs between the ninth and tenth signals DLAG<8> and DLAG<9>, respectively, to the right of the center tap DOUT. Thus, initially the data eye DE is centered around the center tap DOUT.

A shift in the data eye DE of the CCLKM signal is indicated by the dotted line for the CCLKM signal in FIG. 13. In the example, the rising-edge transition of the CCLKM signal has shifted from occurring between the taps DLEAD<8> and DLEAD<9> to between the taps DLEAD<6> and DLEAD<7>, and the falling-edge transition edge has shifted between the taps DLAG<8> and DLAG<9> to between the taps DLAG<10> and DLAG<1 1> as shown. At this point, the data eye DE of the CCLKM signal is no longer centered around the center tap DOUT. In response to such a shift in the data eye DE of the CCLKM signal, the logic circuitry 546 generates the control signals 514 to shift the respective time delays for each of the command delay rings 506a–506k and data delay rings 524a–524r by an amount equal to the shift in the data eye of the CCLKM signal. In response to the control signals 514, the delay ring 540 also shifts the respective delay times of each of the signals from the taps DOUT, DLEAD<0:11> and DLAG<0:11> by a predetermined amount, and thereby causing the data eye DE to once again be centered around the center tap DOUT.

Figure 14A:
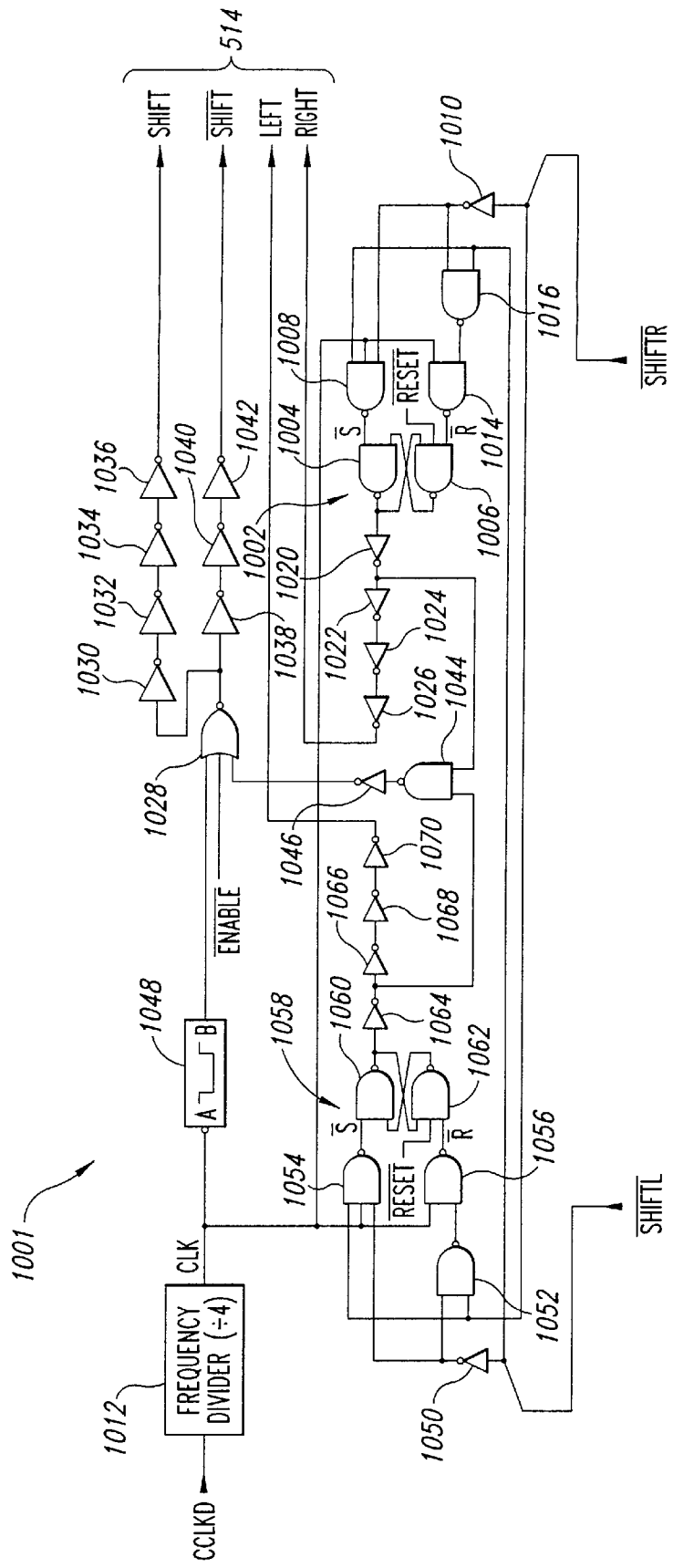
FIGS. 14A–14C are schematics of one embodiment of the monitoring circuit of FIG. 12.
Figure 14B:
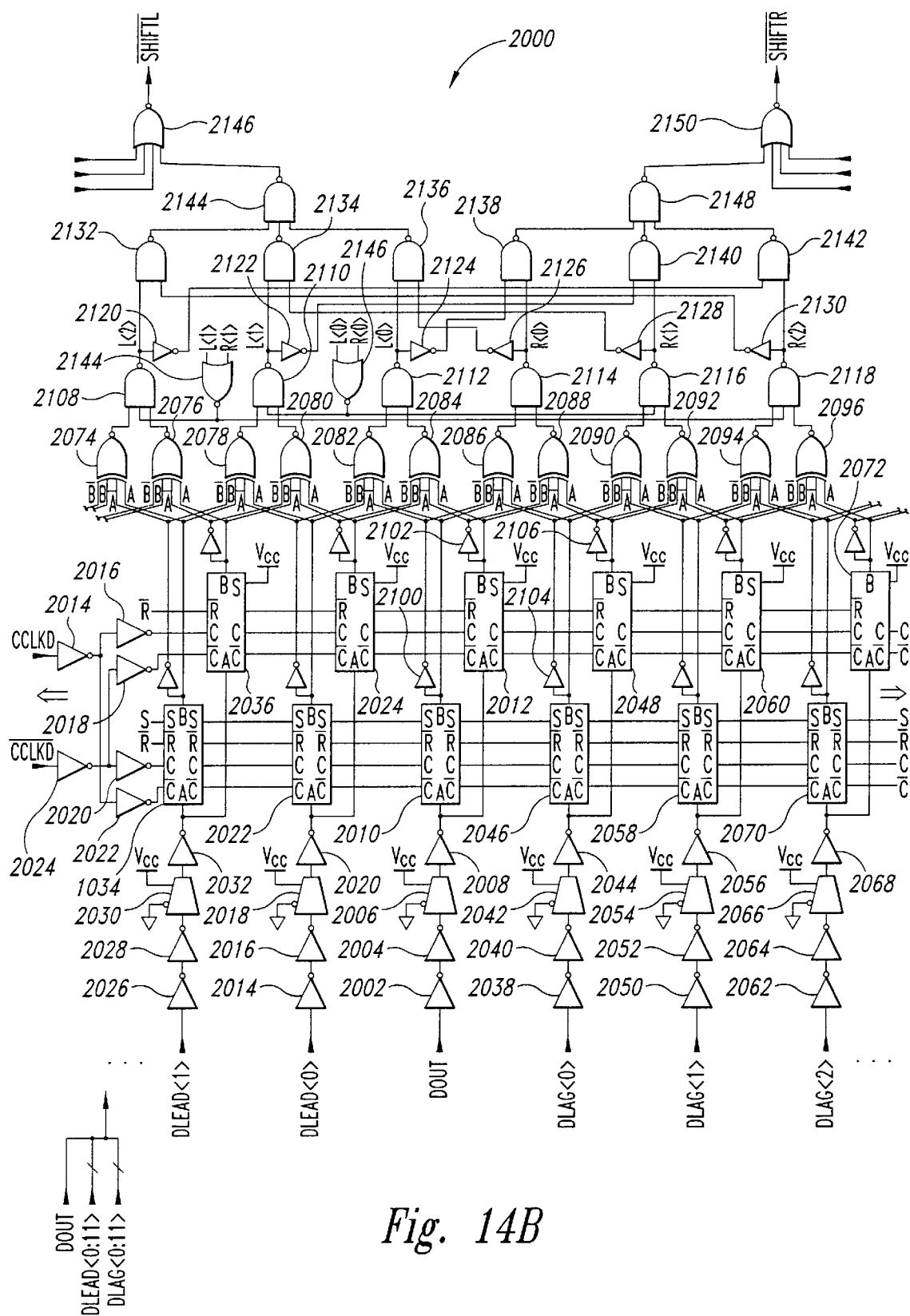
Figure 14C:
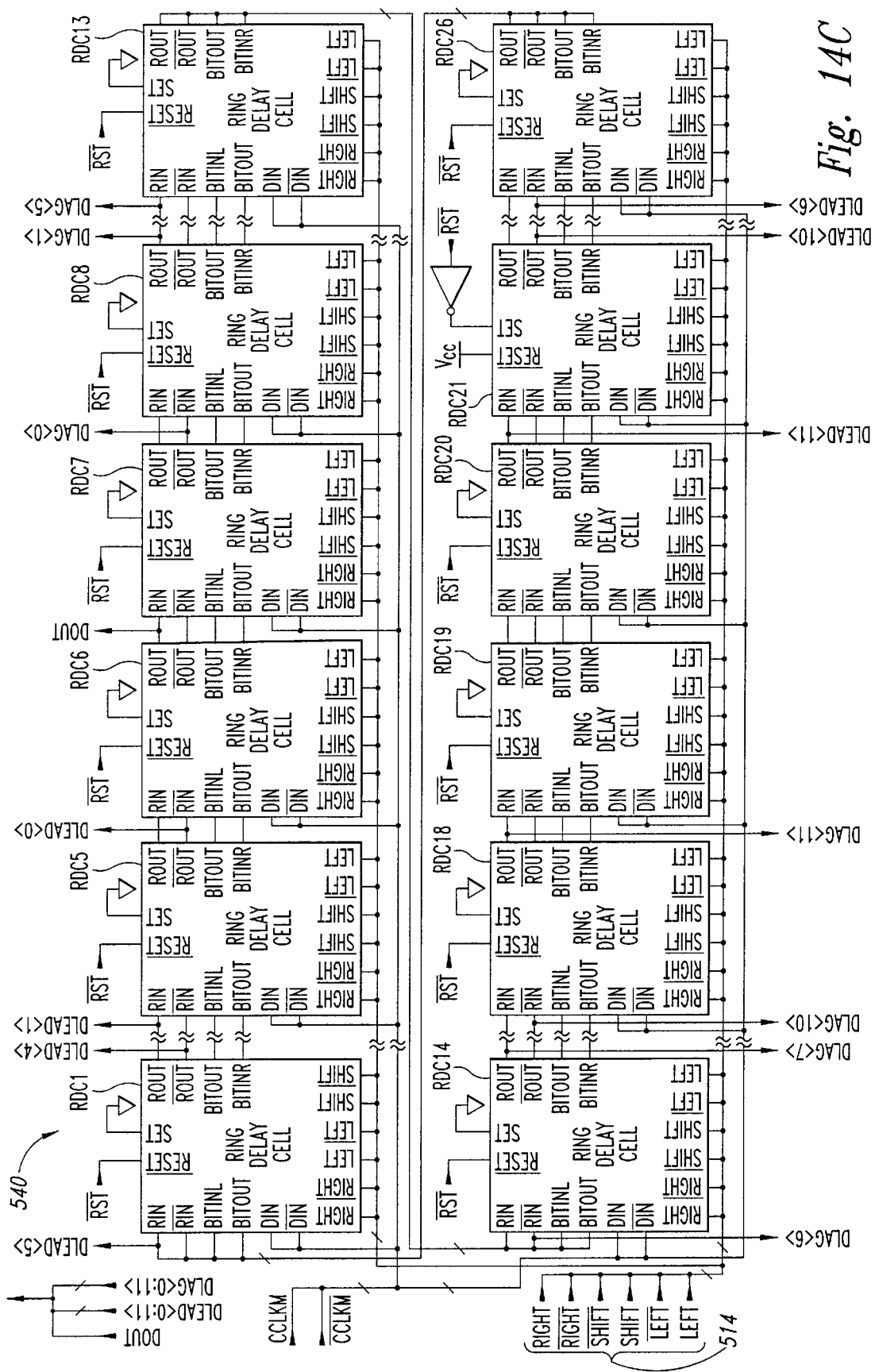

FIGS. 14A–14C are a more detailed schematic of one embodiment of the monitoring circuit 512 of FIG. 12. Referring to FIG. 14A, one embodiment of a control signal generator 1001 contained in the logic circuitry portion 546 of the monitoring circuit 512 is shown in more detail. The control signal generator 1001 generates the SHIFT, $\overline{\text{SHIFT}}$ LEFT, and RIGHT signals to adjust the respective time delays of the command delay rings 506a–506k and data delay rings 524a–524r, and CCLK delay ring 540 during the monitoring mode of operation, as was previously described with reference to FIG. 12 and will now be described in more detail below. As indicated in FIG. 14A, the SHIFT, $\overline{\text{SHIFT}}$ LEFT, and RIGHT signals are included in the control signals 514 previously discussed with reference to FIG. 5. The control signal generator 1001 includes a first RS flip-flop 1002 formed by the cross-coupled NAND gates 1004 and 1006. A NAND gate 1008 applies an active low set input $\overline{\text{S}}$ to the RS flip-flop 1002 when all of its inputs are high. A shift right signal $\overline{\text{SHIFTR}}$ is applied through an inverter 1010 to a first input of a NAND gate 1008, and a shift left signal $\overline{\text{SHIFTL}}$ is applied directly to a second input of the NAND gate 1008. A conventional frequency divider 1012 generates a clock signal CLK having one-fourth the frequency of the applied CCLKD signal, and applies the CLK signal to enable the NAND gate 1008.

A NAND gate 1016 applies a high output to the NAND gate 1014 when either the $\overline{\text{SHIFTL}}$ signal is low or the $\overline{\text{SHIFTR}}$ signal is high, causing the NAND gate 1014 to reset the latch 1002 when the CLK signal is high and either the $\overline{\text{SHIFTL}}$ signal is low or the $\overline{\text{SHIFTR}}$signal is high. The output from the latch 1002 is applied through series connected inverters 1020–1026 to generate the RIGHT signal. In operation, when the CLK signal is high, the latch 1002 is set in response to the $\overline{\text{SHIFTR}}$ signal going active low and the $\overline{\text{SHIFTL}}$ signal being inactive high. When the latch 1002 is set, the NAND gate 1004 drive its output high and this high output is applied through the inverters 1020–1026 to drive the RIGHT signal high. When the $\overline{\text{SHIFTL}}$ signal is active low, the NAND gate 1008 is disabled so that even if the $\overline{\text{SHIFTR}}$ signal goes active low, the latch 1002 is not set. The latch 1002 is reset by the output from the NAND gate 1014 in response to the CLK signal and the output of the NAND gate 1016. When the CLK signal is high enabling the NAND gate 1014, the NAND gate 1014 drives its output low resetting the latch 1002 when the NAND gate 1016 drives its output high, which, as previously described, occurs when either the $\overline{\text{SHIFTL}}$ signal is low or the $\overline{\text{SHIFTR}}$ signal is high.

A NOR gate 1028 applies its output through series connected inverters 1030–1036 and series connected inverters 1038–1042 to generate the SHIFT and $\overline{\text{SHIFT}}$ signals, respectively. The NOR gate 1028 is enabled by the ENABLE signal from the initialization control circuit 508 (FIG. 5) and by the output from a NAND gate 1044 applied through an inverter 1046. When the ENABLE signal is low and the output from the NAND gate 1044 is high, the NOR gate 1028 is enabled and generates the SHIFT, $\overline{\text{SHIFT}}$ signals in response to a pulse generated by a pulse generator 1048. The pulse generator 1048 applies a low pulse having a fixed duration to the NOR gate 1028 in response to a falling-edge transition of the CLK signal applied on its input. In operation, when the latch 1002 is set, the NOR gate 1004 drives its output high causing the inverter 1020 to apply a low input to the NAND gate 1044. In response to this low output from the inverter 1020, the NAND gate 1044 drives its output high and this high output is applied through the inverter 1046 to enable the NOR gate. Thus, when the latch 1002 is set, the NOR gate 1028 generates the SHIFT, $\overline{\text{SHIFT}}$ signals responsive to the pulse from the pulse generate 1048.

The control signal generator 1001 further includes a number of components 1050–1070 that operate to generate the LEFT signal in substantially the same way as described for the circuitry generating the RIGHT signal, and thus, for the sake of brevity, these components will not be described in further detail. It should be noted, however, that when the $\overline{\text{SHIFTR}}$ signal is active low, the NAND gate 1054 is disabled and does not set the latch 1058 notwithstanding the state of the $\overline{\text{SHIFTL}}$ signal, in the same way as was previously described for the NAND gate 1008 and the $\overline{\text{SHIFTL}}$ signal. In this way, if both the $\overline{\text{SHIFTL}}$ and $\overline{\text{SHIFTR}}$ signals are simultaneously active low, neither of the latches 1002 and 1058 is set so that neither the LEFT or RIGHT signals are generated. This prevents the monitoring circuit 512 (FIG. 5) from shifting the delay times of the command delay rings 5006a–5006k and data delay rings 524a–524r in this situation.

Referring to FIG. 14B, a portion of a transition detection circuit 2000 is shown, the transition detection circuit being part of the logic circuitry 546 in the monitoring circuit 512.

In operation, the transition detection circuit 2000 detects the first transition to either the right or left of the center tap DOUT and generates either the $\overline{\text{SHIFTL}}$ or $\overline{\text{SHIFTR}}$ signals when the detected first transition to the right of the center tap DOUT and the first transition to the left of the center tap are not equidistant from the center tap to thereby center the data eye of the CCLK around the center tap DOUT, as will now be explained in more detail. The center tap DOUT is applied through series connected inverters 2002 and 2004 and enabled pass gate 2006, and an inverter 2008 to the inputs of registers 2010 and 2012. The CCLKD and $\overline{\text{CCLKD}}$ signals are applied through inverters 2014–2024 as shown to clock the registers 2010 and 2012. The register 2012 clocks the signal applied at its input to its output responsive to each rising-edge transition of the CCLKD signal. In this way, the register 2012 stores the value of the center tap DOUT responsive to each rising-edge transition of the CCLKD signal and the register 2010 stores the value of the center tap DOUT responsive to each falling-edge transition of the CCLKD signal. Each of the taps DLEAD<0:11> to the left of the center tap DOUT is applied to a corresponding pair of registers in the same way as just described for the center tap DOUT. For the sake of brevity, only the components 2014–2036 for the taps DLEAD<0> and DLEAD<1> are shown in FIG. 12B. Similarly, each of the taps DLAG<0:11> to the right of the center tap DOUT is applied to a corresponding pair of registers in the same manner as previously described for the center tap DOUT, and for the sake of brevity, only the components 2038–2072 are shown for the taps DLAG<0:2>.

The transition detection circuit 2000 further includes a plurality of exclusive NOR gates ("XNOR") 2074–2096 arranged in pairs as shown, each pair being coupled to the registers of adjacent tap outputs. For example, the XNOR gates 2086 and 2088 have their inputs coupled to receive the outputs from the registers 2010 and 2012 associated with the center tap DOUT and the registers 2046 and 2048 associated with the tap DLAG<0>. More specifically, the XNOR gate 2086 receives the output from the register 2010 directly and through an inverter 2100 on a first pair of complementary inputs, and receives the output from the register 2046 directly and through an inverter 2104 on a second pair of complementary inputs. Thus, the XNOR gate 2086 compares the value of the center tap DOUT latched in response to the falling-edge CCLKD signal to the value of the tap DLAG<0> latched in response to the falling edge of the CCLKD signal. When the value of the center tap DOUT differs from the value of the tap DLAG<0>, indicating a transition of the CCLK signal, the XNOR gate 2086 drives its output low. When no such transition is present, both the taps DOUT and DLAG<0> have the same binary values, and XNOR gate drives its output high. Thus, only when a transition occurs between taps DOUT and DLAG<0> occurs does the XNOR gate 2086 drive its output low. The XNOR gate 2088 operates in the same way responsive to the values of the center tap DOUT and tap DLAG<0> captured by the registers 2012 and 2048 responsive to rising-edge transitions of the CCLKD signal as previously described. Each pair of the XNOR gates 2074–2096 operate in the same way to detect a transition between the corresponding adjacent taps.

The outputs from each pair of the XNOR gates 2074–2096 are applied to respective inputs of a corresponding one of a group of NAND gates 2108–2118 as shown. The NAND gates 2108–2112 generate the signals L<2>, L<1>, and L<0> on their outputs, respectively, and the NAND gates 2114–2118 generate the signals R<0>–R<2> on their outputs respectively. In operation, each of the NAND gates 2108–2118 maintains its output high when no transition is detected by the corresponding of XNOR gates 2074–2096, and drives its output low when such a transition is detected by the corresponding pair of XNOR gates, as will now be explained in more detail. Referring to the NAND gate 2114, when either of the XNOR gates 2086 and 2088 detects a transition between the center tap DOUT and the tap DLAG<0>, that XNOR gate drives its output low as previously described. When the output from either of the XNOR gates 2086 and 2088 goes low, the NAND gate 2114 drives the R<0> signal high indicating such a transition was detected. Each of the NAND gates 2108–2118 operates in the same way, driving its output high when the corresponding pair of XNOR gates 2074–2096 detects a transition between the corresponding taps.

A plurality of NOR gates each receive the outputs from a first one of the NAND gates 2108–2118 to the right of the center tap DOUT and the corresponding one of the NAND gates 2108–2118 to the left of the center tap DOUT. Only two of these NOR gates, NOR gates 2144 and 2146 are shown in FIG. 12B although one skilled in the art will realize that in the embodiment of the monitoring circuit 512 being described with reference to FIGS. 12A–12C, the transition detection circuit 2000 actually includes 11 such NOR gates. These NOR gates operate to disable selected ones of the NAND gates 2108–2118 that are associated with taps farther away from the center tap DOUT than the taps between which a transition was detected, as will now be explained in more detail. First assume that initially no transition occurs between any of the taps illustrated in FIG. 12B so that each of the NAND gates 2108–2118 maintains its output low as previously described. In this situation, both the NOR gates 2144 and 2146 receive two low inputs and accordingly drive their outputs high. The high output from the NOR gate 2146 enables the NAND gates 2110, and 2116 and the high output from the NOR gate 2144 enables the NAND gates 2108 and 2118. Now assume a transition occurs between the taps DLAG<0> and DLAG<1>, causing one or more of XNOR gates 2090 and 2092 to drive its output low which, in turn, causes the NAND gate 2116 to drive the R<1> signal on its output high. When the R<1> signal goes high, the NOR gate 2144 drives its output low disabling the NAND gates 2108 and 2118. Note that the disabled NAND gates 2108 and 2118 drive the L<2> and R<2> signals on their respective outputs high, which will result in the NOR gate receiving these signals (not shown in FIG. 12B) to disable the NAND gate just to the left of the NAND gate 2108 (not shown) and the NAND gate just to the right of the NAND gate 2118 (not shown). The NAND gates outward from the center tap DOUT continue to be disabled in the same way until the NOR gate receiving the signals L<10> and R<10> from the corresponding NAND gates to the left and right of the NAND gates 2108–2118 disables the NAND gates that generates the signal L<11> (not shown) and the NAND gate that generates the signal R<11> (not shown). By disabling the group of NAND gates including the NAND gates 2108–2118 in this manner, the transition detection circuit 2000 detects the closest transition to either the right or left of the center tap DOUT, and ignores any other transitions farther away from the center tap.

Each of the outputs from the NAND gates 2108–2118 is applied directly and through a corresponding one of a group of inverters 2120–2130 to a corresponding NAND gate and a second group of NAND gates 2132–2142. The NAND gates 2132–2136 apply their outputs to a NAND gate 2144 which, in turn, applies its output to a NOR gate 2146 to generate the $\overline{\text{SHIFTL}}$ signal. Similarly, the NAND gates 2138–2142 apply their outputs to a NAND gate 2148 which, in turn, applies its output to a NOR gate 2150 that generates the $\overline{\text{SHIFTR}}$ signal. In operation, when any of the NAND gates 2108–2118 drives its output high, indicating a transition has been detected between the corresponding taps, the corresponding one of the NAND gates 2132–2142 drives its output low unless equidistant transitions to the left and right of the center tap DOUT have been detected, as will now be described in more detail. Initially, assume that no transition occurs except for a single transition between the taps DLAG<0> and DLAG<1>. In this situation, one or both of the XNOR gates 2090 and 2092 drives its output low causing the NAND gate 2116 to drive its output high. At this point, the NAND gate 2140 receives a high output from the NAND gate 2116 and a high output from the inverter 2122 since the NAND gate 2110 maintains the L<1> signal low since no transition was detected between the taps DLEAD<0> and DLEAD<1>. In response to receiving two high inputs, the NAND gate 2140 drives its output low causing the NAND gate 2148 to drive its output high. In response to the high output from the NAND gate 2148, the NOR gate 2150 generates the active low $\overline{\text{SHIFTR}}$ signal. Note, however, that if a transition was detected between both the taps DLAG<0:1> and DLEAD<0:1> that the NAND gate 2140 would not drive its output low so no $\overline{\text{SHIFTR}}$ signal would be generated. More specifically, if a transition is also detected between the taps DLEAD<0:1>, the NAND gate 2110 would drive the L<1> signal high causing the inverter 2122 to drive its output low disabling the NAND gate 2140. As a result, the disabled NAND gate 2140 will not drive its output low even though the R<1> signal from the NAND gate 2116 goes high. Note that the high output from the NAND gate 2116 also results in the inverter 2128 driving its output low thereby disabling the NAND gate 2134 to prevent this NAND gate from driving its output low which would result in the NOR gate 2146 driving the $\overline{\text{SHIFTL}}$ signal active low. In this way, when equidistant transition are detected to the left and right of the center tap DOUT, neither the $\overline{\text{SHIFTL}}$ nor $\overline{\text{SHIFTR}}$ signals is generated. There is no need to generated the $\overline{\text{SHIFTL}}$ or $\overline{\text{SHIFTR}}$ signals in this situation since the data eye of the CCLK signal is centered around the data tap DOUT in this situation.

Referring now to FIG. 14C, a more detailed schematic of the CCLK delay ring 540 of FIG. 12 is illustrated. The delay ring 540 includes ring delay cells RDC1–RDC26 connected in the same way as previously described for the command delay ring 506a of FIG. 8A. Instead of having a single output tap, the delay ring 540 includes the center tap DOUT along with the taps DLAG<0:11> and DLEAD<0:11> as shown. In operation, the CCLKM, $\overline{\text{CCLKM}}$ signals are inserted into a selected one of the ring delay cells RDC1–RDC26 so that the data eye of the CCLKM signal, and accordingly the data eye of the CCLK signal is centered around the center tap DOUT. The control signal generator 1001 of FIG. 12A operates in response to the $\overline{\text{SHIFTL}}$ and $\overline{\text{SHIFTR}}$ from the transition detection circuit 2000 of FIG. 12B to develop the control signals 514 to shift the input tap of the delay ring 540 and thereby adjust the respective time delays for each of the taps until the data eye of the CCLKM signal is centered around the center tap DOUT.

Figure 15:
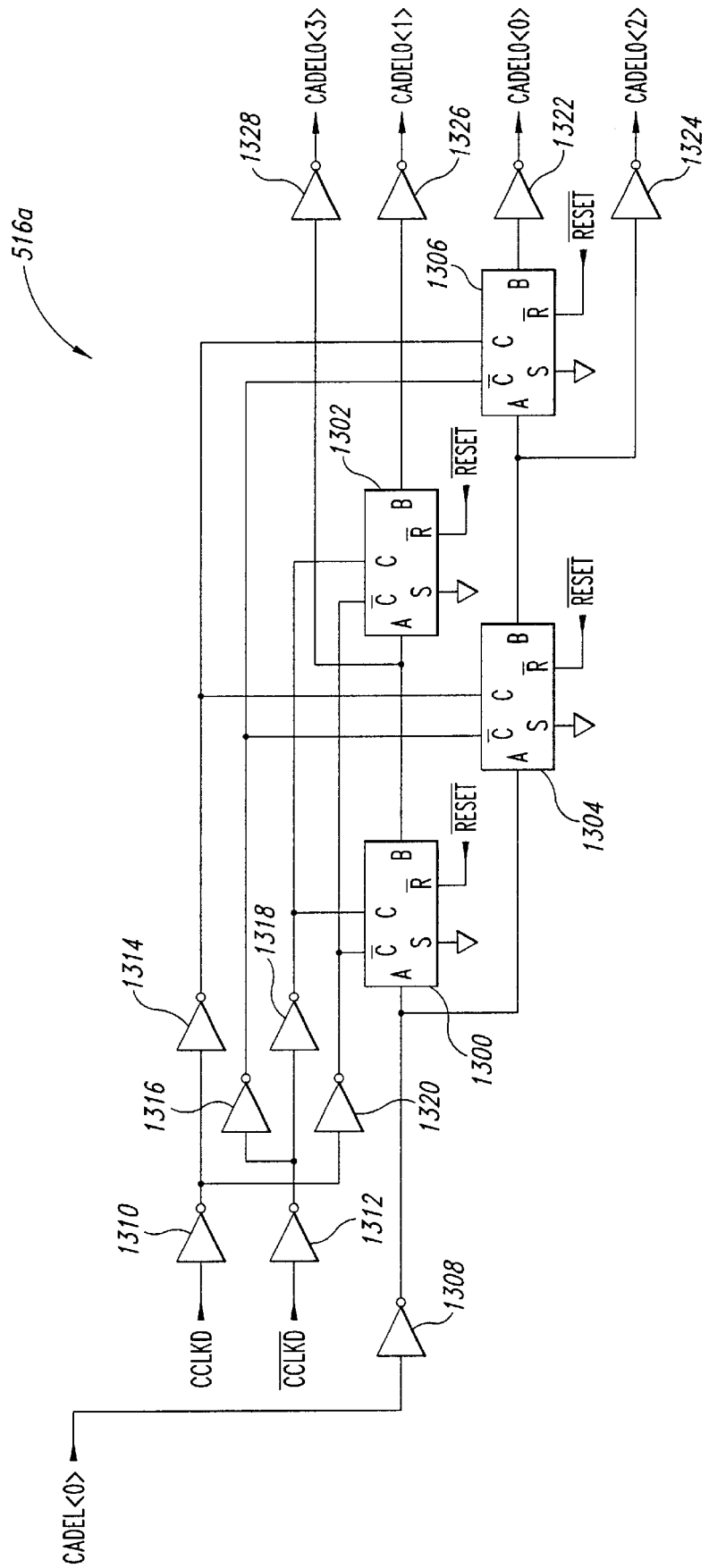
FIG. 15 is a schematic of one embodiment of one of the shift registers of FIG. 5.

FIG. 15 is a schematic of one embodiment of the shift register 516a of FIG. 5. Each of the shift registers 516a–516k, 528a–528r and 534a–534r may be identical, and thus for the sake of brevity, only the shift register 516a will be described in more detail with reference to FIG. 15. The shift register 516a includes a first pair of series connected registers 1300 and 1302, and a second pair of series connected registers 1304 and 1306. The CADEL<0> signal is applied through an inverter 1308 to the inputs of the registers 1300 and 1304. The CCLKD and $\overline{\text{CCLKD}}$ signals are applied through inverters 1310–1320 as shown to clock the registers 1300–1306. The interconnection of the inverters 1310–1320 results in the registers 1304 and 1306 shifting data applied at their inputs to their outputs in response to the rising-edge of the CCLKD signal, and the registers 1300 and 1302 shifting data applied at their respective inputs to their respective outputs in response to falling-edge transitions of the CCLKD signal.

In operation, a first CADEL<0> signal is applied to the inputs of the registers 1300 and 1304, and the register 1304 shifts the signal to its output in response to a rising–edge transition of the CCLKD signal. A second CADEL<0> signal is then applied through the inverter 1308 to the inputs of the registers 1300 and 1304. The register 1300 shifts this second applied signal at its input to its output in response to the next falling edge of the CCLKD signal. A third CADEL<0> signal is then applied through the inverter 1308 to the registers 1300 and 1304 and the register 1304 shifts this signal to its output in response to the next rising edge of the CCLKD signal. In addition, note that as the third CADEL<0> signal is shifted into the register 1304 the first CADEL<0> signal at the input of the register 1306 is shifted to the output of this register. Finally, when a fourth CADEL<0> signal is applied through the inverter 1308 to the inputs of the registers 1300 and 1304, the register 1300 shifts this signal to its output in response to the next falling edge of the CCLKD signal. In addition, while the fourth CADEL<0> signal is shifted into the register 1300, the second CADEL<0> signal applied at the input of the register 1302 is shifted to the output of this register. At this point, in response to four transitions of the CCLKD signal, the four consecutively applied CADEL<0> signals have been shifted into respective ones of the registers 1300–1306 as described. The first CADEL<0> signal output from the register 1306 is applied through an inverter 1322 to generate the CADEL<0> signal, and the third CADEL<0> signal output from the register 1304 is applied through an inverter 1324 to generate the CADEL0<2> signal. Similarly, the second CADEL<0> signal output from the register 1302 is applied through an inverter 1326 to generate the CADEL0<1> signal, and the fourth CADEL<0> signal output from the register 1300 is applied through an inverter 1328 to generate the CADEL0<3> signal. As previously described with reference to FIG. 5, the CADEL0<0:3> word is applied to the initialization control circuit 508 (FIG. 5) and is utilized by the control circuit in determining whether the CADEL<0> signals were successfully captured in the registers 1300 and 1304.

Figure 16:
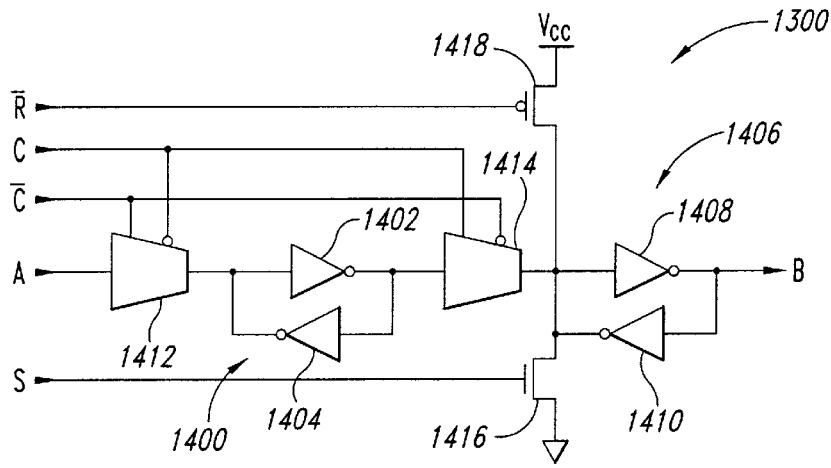
FIG. 16 is a schematic of one embodiment of one of the registers shown in FIGS. 9, 14B, and 14.

FIG. 16 is a schematic of one embodiment of the register 1300 of FIG. 15. The registers 1300–1306 of FIG. 15 as well as the register 912 of FIG. 9 and the registers of FIG. 14B are identical, and thus, for the sake of brevity, only the register 1300 will be described in more detail with reference to FIG. 16. The register 1300 includes a first latch 1400 formed by cross-couple inverters 1402 and 1404 and a second latch 1406 formed by cross-couple inverters 1408 and 1410. A pass gate 1412 couples a signal applied on the input A of the register 1300 to the input of the latch 1400 in response to complementary clock signals C, $\overline{\text{C}}$ applied on respective control terminals, and a pass gate 1414 applies the signal at the output of the latch 1400 to the input of the latch 1406 responsive to the clock signals C, $\overline{\text{C}}$. The pass gates 1412 and 1414 operate in a complementary manner, such that when one of the pass gates is turned ON, the other is turned OFF. More specifically, when the C and $\overline{C}$ signals are high and low, respectively, the pass gate 1414 turns ON and the pass gate 1412 turns OFF. When the C and $\overline{C}$ signals are low and high, respectively, the pass gate 1412 turns ON and the pass gate 1414 turns OFF. A set transistor 1416 couples the input of the latch 1406 to ground in response to a set signal S applied on its gage.

A reset transistor 1418 is coupled between the input of the latch 1406 and a supply voltage $V_{CC}$, and drives the input of the latch 1406 to the supply voltage in response to a low reset $\overline{R}$ applied on its gate. In operation, when the clock signals C, $\overline{C}$ are low and high, respectively, a signal applied at the input A is latched by the latch 1400. When the C and $\overline{C}$ thereafter transition high and low, respectively, the pass gate 1412 turns OFF isolating the input A from the latch 1400 and the pass gate 1414 turns ON shifting the input signal latched by the latch 1400 into the latch 1406 which latches the signal and applies this latch signal on the output B of the shift register 1300. The set signal S and reset signal $\overline{R}$ are complementary signals, and both are never active at the same time. When the S signal goes active high and the $\overline{R}$ signal is inactive high, the transistor 1418 turns OFF and the transistor 1416 turns ON causing the latch 1406 to latch its input low and the output B high. In contrast, when the S signal is inactive low and the $\overline{R}$ signal is active low, the transistor 1416 turns OFF and the transistor 1418 turns ON causing the latch 1406 to latch its input high and the output B low.

Figure 17:
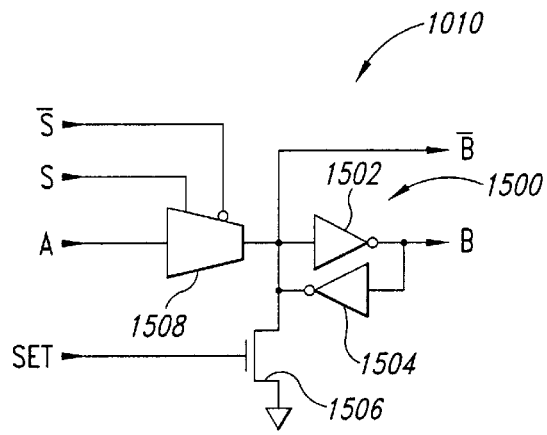
FIG. 17 is a schematic of one embodiment of the set register of FIG. 10A.

FIG. 17 is a schematic illustrating one embodiment of the bit set register 1010 of FIG. 10B. The register 1010 includes a latch 1500 formed by cross-couple inverters 1502 and 1504. A set transistor 1506 couples the input of the latch 1500 to ground in response to an active high SET signal applied on its gate. A pass gate 1508 applies a signal on the input A to the input of the latch 1500 in response to the complementary signals S and $\overline{S}$ applied on its respective control terminals. In operation, when the S and $\overline{S}$ signals are high and low, respectively, the pass gate 1508 turns on applying a signal on the input A to the input of the latch 1500. The latch 1500 latches its input to the logic level of the applied input signal and its output to the complementary logic level. The input and output from the latch 1500 generate the output signals B and $\overline{B}$, respectively, from the bit set register 1010. When the SET signal goes active high, the transistor 1506 turns on causing the latch 1500 to latch the $\overline{B}$ signal low and the B signal high.

Figure 18:
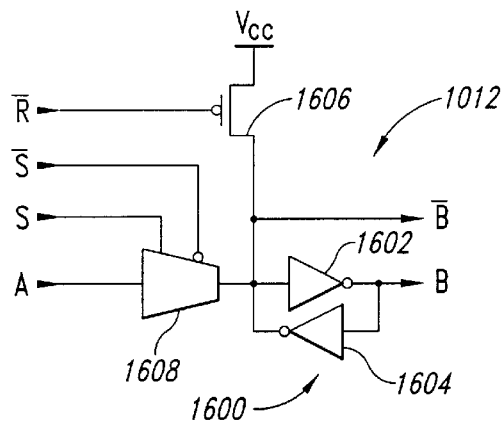
FIG. 18 is a schematic of one embodiment of the reset register of FIG. 10A.

FIG. 18 is a schematic of one embodiment of the bit reset register 1012 of Figure 10B. The bit reset register 1012 includes a latch 1600 formed by a pair of cross-coupled inverters 1602 and 1604. A reset transistor 1606 couples the input of the latch 1600 to the supply voltage $V_{CC}$ in response to an active reset signal $\overline{R}$ applied on its gate. A pass gate 1608 selectively applies or isolates a signal on the input A to the input of the latch 1600 responsive to a pair of complementary clock signals S and $\overline{S}$. When the clock signals S and $\overline{S}$ are high and low, respectively, the pass gate 1608 turns on applying the signal at the input A to the input of the latch 1600. The latch 1600 latches its input to the same logic level as the applied input signal, and latches its output to the complementary logic level. The input and output from the latch 1600 are applied as the latched output signals $\overline{B}$ and B, respectively, from the register 1012. When the reset signal $\overline{R}$ goes active low, the transistor 1606 turns on causing the latch 1600 to latch the $\overline{B}$ signal high and the B signal low.

It is to be understood that even though various embodiments and advantages of the present invention have been set forth in the foregoing description, the above disclosure is illustrative only, and changes may be made in detail, and yet remain within the broad principles of the invention. For example, many of the components described above may be implemented using either digital or analog circuitry, or a combination of both, and also, where appropriate, may be realized through software executing on suitable processing circuitry. Therefore, the present invention is to be limited only by the appended claims.

What is claimed is:

1. A method of capturing digital signals including digital signal packets applied on respective command-address and data busses of a packetized memory device, each digital signal packet including at lease one packet word and each packet word comprising a plurality of digital signals applied on respective lines of the busses, each line being coupled to a respective latch, the method comprising:

applying a plurality of digital signals on the bus, each digital signal being applied on a respective line;

delaying the plurality of applied digital signals, each digital signal being delayed a respective delay time independent of the delay times of all other digital signals;

applying each of the delayed digital signals to the corresponding latch; and storing each of the digital signals in the corresponding latch responsive to a clock signal.

2. The method of claim 1, further comprising adjusting the respective delay times of the digital signals to successfully capture each of the digital signals in the corresponding latch responsive to the clock signal.

3. The method of claim 2 wherein adjusting the respective delay times of the digital signals is performed sequentially on each of the digital signals until respective delay times have been sequentially selected for every digital signal.

4. The method of claim 2 wherein adjusting the respective delay times of the digital signals comprises:

repetitively applying digital signals having expected values on the bus;

evaluating the digital signals stored in each latch responsive to the clock signal to determine if the stored digital signals have the expected values;

identifying each delay time of the respective digital signal that caused the corresponding latch to store the digital signal having the expected values;

selecting a final delay time for each digital signal from one of the delay times that caused the corresponding latch to store the digital signal having the expected values; and adjusting the delay time of each digital signal to the corresponding final delay time.

5. The method of claim 4 wherein evaluating the digital signals stored in each latch responsive to the clock signal to determine if the stored digital signals have the expected values comprises:

generating expected values for digital signals stored in all the latches responsive to the digital signals stored in one of the latches; and determining the digital signals were successfully stored in a respective latch when the digital signals stored in the latch correspond to the generated expected values for those digital signals.

6. The method of claim 1, further comprising generating the clock signal responsive to an external clock signal, the clock signal having a constant delay time relative to the external clock signal.

7. The method of claim 1, further comprising:
applying an external clock signal on an external clock terminal, the clock signal being generated responsive to the external clock signal and having a delay relative to the external clock signal;
determining the data eye of the external clock signal;
detecting changes in the data eye of the external clock signal; and
adjusting the previously adjusted delay time of each digital signal by a delay adjustment time responsive to each detected change in the data eye of the external clock signal.

8. The method of claim 7 wherein detecting changes in the data eye of the external clock signal comprises:
generating a plurality of delayed signals responsive to the external clock signal, each of the delayed signals having either a first or second logic level voltage, the delayed signals including a center delayed signal having a center delay, and also including a plurality of lagging delayed signals having successively increasing delays relative to the center delay, and further including a plurality of leading delayed signals having successively decreasing delays relative to the center delay;
comparing each pair of adjacent lagging delay signals to detect the pair of adjacent lagging delay signals nearest the center delay signal that have different logic level voltages;
comparing each pair of adjacent leading delay signals to detect the pair of adjacent leading delay signals nearest the center delay signal that have different logic level voltages; and
determining a change in the data eye of the external clock signal has occurred when the detected pair of adjacent lagging delay signals is different than the corresponding detected pair of adjacent leading delay signals.

9. The method of claim 7 wherein adjusting the previously adjusted delay time of each digital signal by a delay adjustment time responsive to each detected change in the data eye of the external clock signal comprises adjusting the respective delay times to center the data eye of the external clock signal and shifting the respective delay times the digital signals by the same shift amount.

10. The method of claim 7 wherein adjusting the previously adjusted delay time of each digital signal by a delay adjustment time comprises adjusting the previously adjusted delay time of each digital signal by a positive delay adjustment time responsive to each detected positive shift of the data eye and adjusting the previously adjusted delay time of each digital signal by a negative delay adjustment time responsive to each detected negative shift of the data eye.

11. A method of capturing packet words applied to a packetized memory device, each packet word including a plurality of digital signals applied to respective bus lines of the packetized memory device, each of the respective digital signals having a corresponding data eye, comprising:
placing the packetized memory device in a synchronization mode of operation;
applying packet words to the packetized memory device, the digital signals in each packet word having expected values;
delaying each of the digital signals in an applied packet word by a corresponding delay time;
adjusting the respective delay times of the digital signals;
storing the delayed digital signals responsive to an internal clock signal, each of the digital signals being stored at each adjusted delay time; and
determining a final delay time for each digital signal in a packet word, each final delay time being determined independent of all other final delay times and causing the corresponding digital signal to be stored during the data eye of the digital signal.

12. The method of claim 11, further comprising adjusting the delay time of digital signal to the corresponding determined final delay time.

13. The method of claim 12 wherein adjusting the respective delay times of the digital signals is performed sequentially on each of the digital signals until respective final delay times have been sequentially determined for every digital signal.

14. The method of claim 11 wherein placing the packetized memory device in the synchronization mode comprises capturing a FLAG signal and generating a calibration signal when the FLAG signal has a predetermined binary value for two consecutive captures.

15. The method of claim 11, further comprising generating the internal clock signal responsive to an external clock signal, the internal clock signal having a substantially constant delay time relative to the external clock signal.

16. The method of claim 11, further comprising:
placing the packetized memory device in a normal of mode of operation after final delay times have been determined for each digital signal;
applying an external clock signal on an external clock terminal, the internal clock signal being generated responsive to the external clock signal and having a delay relative to the external clock signal;
determining the data eye of the external clock signal;
detecting changes in the data eye of the external clock signal; and
adjusting the previously determined final delay time of each digital signal by a delay adjustment time responsive to each detected change in the data eye of the external clock signal.

17. The method of claim 16 wherein adjusting the previously determined final delay time of each digital signal by a delay adjustment time comprises adjusting the previously determined final delay time of each digital signal by a positive delay adjustment time responsive to each detected positive shift of the data eye and adjusting the previously determined final delay time of each digital signal by a negative delay adjustment time responsive to each detected negative shift of the data eye.

18. The method of claim 11 wherein determining a final delay time for each digital signal in a packet word comprises:
evaluating each of the stored digital signals to determine if the stored digital signal has expected values;
identifying each delay time of the respective digital signal that caused the digital signal having the expected values to be stored; and
selecting the final delay time for each digital signal from one of the delay times that caused the digital signal having the expected values to be stored.

19. The method of claim 18 wherein applying packet words on the respective busses of the packetized memory device comprises applying a repeating 15 bit pseudo-random bit sequence "111101011001000" on respective bus lines, the sequence being complemented on adjacent bus lines.

20. A bus capture circuit for capturing digital signals applied on respective lines of a bus, comprising:
a plurality of latches, each latch having an input terminal, an output terminal, and a clock terminal adapted to receive a clock signal, the latch being operable to latch a digital signal applied at the input terminal responsive to the clock signal applied to the clock terminal;

a plurality of signal delay circuits, each signal delay circuit coupled between a respective bus line and the input terminal of a respective latch, and each signal delay circuit operable to develop a delayed digital signal having a delay time relative to the digital signal applied on the corresponding bus line, the signal delay circuit applying the delayed digital signal to the input terminal of the corresponding latch; and a control circuit coupled to the signal delay circuits and to the output terminals of the latches, the control circuit operable to independently adjust the respective delay times of each signal delay circuit as a function of a data eye of the digital signal applied on the input of the signal delay circuit to enable each of the latches to latch the corresponding delayed digital signal responsive to an applied internal clock signal, the control circuit further comprising a monitoring circuit comprising:

a delay ring circuit having an input adapted to receive a clock signal, and having a plurality of outputs, the delay ring circuit generating a respective output signal on each output, each output signal having a corresponding adjustable delay time relative to the input signal, the values of the respective delay times being determined responsive to applied control signals;

a plurality of latches, each latch having an input coupled to a respective output from the delay ring circuit, an output, and a clock terminal, the latch latching the output signal applied on its input responsive to a transition of a clock signal applied on the clock terminal; and a logic control circuit coupled to the outputs of the latches, the logic control circuit operable in a monitoring mode of operation to detect shifts in the data eye of the clock signal, and, when each such shift is detected, to apply control signals to adjust the respective delay times of all digital signals by a delay adjustment time and to adjust the respective delay times of each of the output signals from the delay ring circuit by the delay adjustment time.

21. A bus capture circuit for capturing digital signals applied on respective lines of a bus, comprising:

a plurality of latches, each latch having an input terminal, an output terminal, and a clock terminal adapted to receive a clock signal, the latch being operable to latch a digital signal applied at the input terminal responsive to the clock signal applied to the clock terminal;

a plurality of signal delay circuits, each signal delay circuit coupled between a respective bus line and the input terminal of a respective latch, each signal delay circuit being operable to develop a delayed digital signal having a delay time relative to the digital signal applied on the corresponding bus line, the signal delay circuit applying the delayed digital signal to the input terminal of the corresponding latch; each signal delay circuit comprises a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages and a control circuit coupled to the signal delay circuits and to the output terminals of the latches, the control circuit operable to independently adjust the respective delay times of each signal delay circuit as a function of a data eye of the digital signal applied on the input of the signal delay circuit to enable each of the latches to latch the corresponding delayed digital signal responsive to an applied internal clock signal.

22. A bus capture circuit for capturing digital signals applied on respective lines of a bus, comprising:

a clock delay circuit having an input adapted to receive an external clock signal and having an output, the clock delay circuit operable to generate an internal clock signal on its output responsive to the external clock signal, the internal clock delay having a fixed delay relative to the external clock signal;

a plurality of latches, each latch having an input terminal, an output terminal, and a clock terminal coupled to the output of the clock delay circuit to receive the internal clock signal, the latch being operable to latch a digital signal applied at the input terminal responsive to the internal clock signal applied to the clock terminal;

a plurality of signal delay circuits, each signal delay circuit coupled between a respective bus line and the input terminal of a respective latch, and each signal delay circuit operable to develop a delayed digital signal having a delay time relative to the digital signal applied on the corresponding bus line, the signal delay circuit applying the delayed digital signal to the input terminal of the corresponding latch; and a control circuit coupled to the signal delay circuits and to the output terminals of the latches, the control circuit operable to adjust the delay time of each signal delay circuit as a function of a data eye of the digital signal applied on the input of the signal delay circuit, the control circuit further including a monitoring circuit comprising:

a delay ring circuit having an input adapted to receive a clock signal, and having a plurality of outputs, the delay ring circuit generating a respective output signal on each output, each output signal having a corresponding adjustable delay time relative to the input signal, the values of the respective delay times being determined responsive to applied control signals;

a plurality of latches, each latch having an input coupled to a respective output from the delay ring circuit, an output, and a clock terminal, the latch latching the output signal applied on its input responsive to a transition of a clock signal applied on the clock terminal; and a logic control circuit coupled to the outputs of the latches, the logic control circuit operable in a monitoring mode of operation to detect shifts in the data eye of the clock signal, and, when each such shift is detected, to apply control signals to adjust the respective delay times of all digital signals by a delay adjustment time and to adjust the respective delay times of each of the output signals from the delay ring circuit by the delay adjustment time.

23. A bus capture circuit for capturing digital signals applied on respective lines of a bus, comprising:

a clock delay circuit having an input adapted to receive an external clock signal and having an output, the clock delay circuit operable to generate an internal clock signal on its output responsive to the external clock signal, the internal clock delay having a fixed delay relative to the external clock signal;

a plurality of latches, each latch having an input terminal, an output terminal, and a clock terminal coupled to the output of the clock delay circuit to receive the internal clock signal, the latch being operable to latch a digital signal applied at the input terminal responsive to the internal clock signal applied to the clock terminal;

a plurality of signal delay circuits, each signal delay circuit coupled between a respective bus line and the input terminal of a respective latch, each signal delay circuit being operable to develop a delayed digital signal having a delay time relative to the digital signal applied on the corresponding bus line, the signal delay circuit applying the delayed digital signal to the input terminal of the corresponding latch, each signal delay circuit comprising a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages and a control circuit coupled to the signal delay circuits and to the output terminals of the latches, the control circuit operable to adjust the delay time of each signal delay circuit as a function of the data eye of the digital signal applied on the input of the signal delay circuit.

24. A bus capture circuit for capturing digital signals applied on respective lines of a bus, comprising:

a clock delay circuit having an input adapted to receive an external clock signal and having an output, the clock delay circuit operable to generate an internal clock signal on its output responsive to the external clock signal, the internal clock delay having a fixed delay relative to the external clock signal;

a plurality of latches, each latch having an input terminal, an output terminal, and a clock terminal coupled to the output of the clock delay circuit to receive the internal clock signal, the latch being operable to latch a digital signal applied at the input terminal responsive to the internal clock signal applied to the clock terminal;

a plurality of signal delay circuits, each signal delay circuit coupled between a respective bus line and the input terminal of a respective latch, and each signal delay circuit operable to develop a delayed digital signal having a delay time relative to the digital signal applied on the corresponding bus line, the signal delay circuit applying the delayed digital signal to the input terminal of the corresponding latch; and a control circuit coupled to the signal delay circuits and to the output terminals of the latches, the control circuit operable in a synchronization mode to adjust the delay time of each signal delay circuit as a function of a data eye of the digital signal applied on the input of the signal delay circuit, and operable in a monitoring mode of operation to detect shifts in the data eye of the external clock signal, and, further adjust the delay time of all digital signals by a delay adjustment time when each such shift is detected, the control circuit further including a monitoring circuit comprising:

a delay ring circuit having an input adapted to receive a clock signal, and having a plurality of outputs, the delay ring circuit generating a respective output signal on each output, each output signal having a corresponding adjustable delay time relative to the input signal, the values of the respective delay times being determined responsive to applied control signals;

a plurality of latches, each latch having an input coupled to a respective output from the delay ring circuit, an output, and a clock terminal, the latch latching the output signal applied on its input responsive to a transition of a clock signal applied on the clock terminal; and a logic control circuit coupled to the outputs of the latches, the logic control circuit operable in a monitoring mode of operation to detect shifts in the data eye of the clock signal, and, when each such shift is detected, to apply control signals to adjust the respective delay times of all digital signals by a delay adjustment time and to adjust the respective delay times of each of the output signals from the delay ring circuit by the delay adjustment time.

25. A bus capture circuit for capturing digital signals applied on respective lines of a bus, comprising:

a clock delay circuit having an input adapted to receive an external clock signal and having an output, the clock delay circuit operable to generate an internal clock signal on its output responsive to the external clock signal, the internal clock delay having a fixed delay relative to the external clock signal;

a plurality of latches, each latch having an input terminal, an output terminal, and a clock terminal coupled to the output of the clock delay circuit to receive the internal clock signal, the latch being operable to latch a digital signal applied at the input terminal responsive to the internal clock signal applied to the clock terminal;

a plurality of signal delay circuits, each signal delay circuit being coupled between a respective bus line and the input terminal of a respective latch, each signal delay circuit being operable to develop a delayed digital signal having a delay time relative to the digital signal applied on the corresponding bus line, the signal delay circuit applying the delayed digital signal to the input terminal of the corresponding latch, each signal delay circuit comprising a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages and a control circuit coupled to the signal delay circuits and to the output terminals of the latches, the control circuit operable in a synchronization mode to adjust the delay time of each signal delay circuit as a function of a data eye of the digital signal applied on the input of the signal delay circuit, and operable in a monitoring mode of operation to detect shifts in the data eye of the external clock signal, and, further adjust the delay time of all digital signals by a delay adjustment time when each such shift is detected.

26. A bus capture circuit for capturing digital signals applied on respective lines of a bus, comprising:

a clock delay circuit having an input adapted to receive an external clock signal and having an output, the clock delay circuit operable to generate an internal clock signal on its output responsive to the external clock signal, the internal clock delay having a fixed delay relative to the external clock signal;

a plurality of latches, each latch having an input terminal, an output terminal, and a clock terminal coupled to the output of the clock delay circuit to receive the internal clock signal, the latch being operable to latch a digital signal applied at the input terminal responsive to the internal clock signal applied to the clock terminal; and a plurality of signal delay circuits, each signal delay circuit having an input coupled to a respective bus line and an output coupled to the input terminal of a respective latch, each signal delay circuit operable to delay the digital signal applied on its input by a delay time and apply the delayed digital signal to the input terminal of the corresponding latch, the signal delay circuit determining the delay time as a function of a data eye of the digital signal applied on its input, each signal delay circuit further comprising a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages.

27. A packetized dynamic random access memory, comprising:

a clock generator circuit generating a plurality of internal clock signals on respective outputs responsive to an external clock signal, each internal clock signal having a corresponding phase relative to the external clock signal;

at least one array of memory cells adapted to store data at a location determined by a row address and a column address;

a row address circuit adapted to receive and decode the row address, and select a row of memory cells corresponding to the row address responsive to a first set of command signals;

a column address circuit adapted to receive or apply data to one of the memory cells in the selected row corresponding to the column address responsive to a second set of command signals;

a data path circuit adapted to couple data packets between an external data bus and the column address circuit responsive to a third set of command signals;

a command buffer receiving command packets and initialization packets having expected values, each packet including at least one packet word, and the command buffer including a plurality of latches that store respective bits of the received packets responsive to transitions of respective internal clock signals, the command buffer further generating respective command words and initialization words corresponding to each received command packet and initialization packet, respectively; and a timing correction circuit for capturing applied command, initialization, and data packets, the timing correction including a bus capture circuit for capturing digital signals applied on respective lines of the busses, comprising:

a plurality of latches, each latch having an input terminal, an output terminal, and a clock terminal adapted to receive a clock signal, the latch being operable to latch a digital signal applied at the input terminal responsive to the clock signal applied to the clock terminal;

a plurality of signal delay circuits, each signal delay circuit coupled between a respective bus line and the input terminal of a respective latch, and each signal delay circuit operable to develop a delayed digital signal having a delay time relative to the digital signal applied on the corresponding bus line, the signal delay circuit applying the delayed digital signal to the input terminal of the corresponding latch; and a control circuit coupled to the signal delay circuits and to the output terminals of the latches, the control circuit operable to independently adjust the respective delay times of each signal delay circuit as a function of the data eye of the digital signal applied on the input of the signal delay circuit to enable each of the latches to latch the corresponding delayed digital signal responsive to an applied internal clock signal.

28. The packetized memory device of claim 27 wherein the timing correction circuit further comprises a monitoring circuit comprising:

a delay ring circuit having an input adapted to receive a clock signal, and having a plurality of outputs, the delay ring circuit generating a respective output signal on each output, each output signal having a corresponding adjustable delay time relative to the input signal, the values of the respective delay times being determined responsive to applied control signals;

a plurality of latches, each latch having an input coupled to a respective output from the delay ring circuit, an output, and a clock terminal, the latch latching the output signal applied on its input responsive to a transition of a clock signal applied on the clock terminal; and a logic control circuit coupled to the outputs of the latches, the logic control circuit operable in a monitoring mode of operation to detect shifts in the data eye of the clock signal, and, when each such shift is detected, to apply control signals to adjust the respective delay times of all digital signals by a delay adjustment time and to adjust the respective delay times of each of the output signals from the delay ring circuit by the delay adjustment time.

29. The packetized memory device of claim 27 wherein each signal delay circuit comprises a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages.

30. A computer system, comprising:

a processor having a processor bus;

an input device coupled to the processor through the processor bus adapted to allow data to be entered into the computer system;

an output device coupled to the processor through the processor bus adapted to allow data to be output from the computer system; and a packetized dynamic random access memory coupled to the processor bus, comprising, a clock generator circuit generating a plurality of internal clock signals on respective outputs responsive to an external clock signal, each internal clock signal having a corresponding phase relative to the external clock signal;

at least one array of memory cells adapted to store data at a location determined by a row address and a column address;

a row address circuit adapted to receive and decode the row address, and select a row of memory cells corresponding to the row address responsive to a first set of command signals;

a column address circuit adapted to receive or apply data to one of the memory cells in the selected row corresponding to the column address responsive to a second set of command signals;

a data path circuit adapted to couple data packets between an external data bus and the column address circuit responsive to a third set of command signals;

a command buffer receiving command packets and initialization packets having expected values, each packet including at least one packet word, and the command buffer including a plurality of latches that store respective bits of the received packets responsive to transitions of respective internal clock signals, the command buffer further generating respective command words and initialization words corresponding to each received command packet and initialization packet, respectively; and a timing correction circuit for capturing applied command, initialization, and data packets, the timing correction including a bus capture circuit for capturing digital signals applied on respective lines of the busses, comprising:

a plurality of latches, each latch having an input terminal, an output terminal, and a clock terminal adapted to receive a clock signal, the latch being operable to latch a digital signal applied at the input terminal responsive to the clock signal applied to the clock terminal;

a plurality of signal delay circuits, each signal delay circuit coupled between a respective bus line and the input terminal of a respective latch, and each signal delay circuit operable to develop a delayed digital signal having a delay time relative to the digital signal applied on the corresponding bus line, the signal delay circuit applying the delayed digital signal to the input terminal of the corresponding latch; and a control circuit coupled to the signal delay circuits and to the output terminals of the latches, the control circuit operable to independently adjust the respective delay times of each signal delay circuit as a function of the data eye of the digital signal applied on the input of the signal delay circuit to enable each of the latches to latch the corresponding delayed digital signal responsive to an applied internal clock signal.

31. The computer system of claim 30 wherein the packetized dynamic random access memory is coupled directly to the processor bus.

32. The computer system of claim 30 the timing correction circuit further comprises a monitoring circuit comprising:

a delay ring circuit having an input adapted to receive a clock signal, and having a plurality of outputs, the delay ring circuit generating a respective output signal on each output, each output signal having a corresponding adjustable delay time relative to the input signal, the values of the respective delay times being determined responsive to applied control signals;

a plurality of latches, each latch having an input coupled to a respective output from the delay ring circuit, an output, and a clock terminal, the latch latching the output signal applied on its input responsive to a transition of a clock signal applied on the clock terminal; and a logic control circuit coupled to the outputs of the latches, the logic control circuit operable in a monitoring mode of operation to detect shifts in the data eye of the clock signal, and, when each such shift is detected, to apply control signals to adjust the respective delay times of all digital signals by a delay adjustment time and to adjust the respective delay times of each of the output signals from the delay ring circuit by the delay adjustment time.

33. The computer system of claim 30 wherein each signal delay circuit comprises a plurality of ring delay stages coupled in series to form a ring delay loop, the digital signal applied on the bus line being selectively input to a respective one of the ring delay stages to adjust the delay time between the digital signal and the delayed digital signal developed at a fixed output tap from one of the ring delay stages.

* * * * *